United States Patent [19]
Kabemoto et al.

[11] Patent Number: 5,890,217
[45] Date of Patent: Mar. 30, 1999

[54] COHERENCE APPARATUS FOR CACHE OF MULTIPROCESSOR

[75] Inventors: Akira Kabemoto; Naohiro Shibata; Toshiyuki Muta; Takayuki Shimamura; Hirohide Sugahara; Junji Nishioka; Takatsugu Sasaki; Satoshi Shinohara, all of Kawasaki; Yozo Nakayama, Aza Unoke-machi; Jun Sakurai, Sendai; Hiroaki Ishihata, Kawasaki; Takeshi Horie, Kawasaki; Toshiyuki Shimizu, Kawasaki, all of Japan

[73] Assignees: Fujitsu Limited, Kawasaki; PFU Limited, Kahoku, both of Japan

[21] Appl. No.: 598,243

[22] Filed: Feb. 7, 1996

[30] Foreign Application Priority Data

Mar. 20, 1995 [JP] Japan .................................. 7-060500
Sep. 28, 1995 [JP] Japan .................................. 7-250527

[51] Int. Cl.⁶ .................................................. G06F 13/00
[52] U.S. Cl. ........................... 711/141; 711/120; 711/147
[58] Field of Search ................................ 395/468, 471, 395/472, 447, 474, 475; 711/141, 144, 145, 120, 147, 148

[56] References Cited

U.S. PATENT DOCUMENTS

| | | | |
|---|---|---|---|
| 4,136,386 | 1/1979 | Annunziata et al. | 711/119 |
| 4,503,497 | 3/1985 | Krygowski et al. | 711/124 |
| 4,622,631 | 11/1986 | Frank et al. | 707/201 |
| 5,291,442 | 3/1994 | Emma et al. | 711/120 |
| 5,522,058 | 5/1996 | Iwasa et al. | 711/145 |
| 5,537,569 | 7/1996 | Masubuchi | 711/121 |
| 5,568,633 | 10/1996 | Boudou et al. | 711/141 |
| 5,606,686 | 2/1997 | Tarui et al. | 711/121 |

FOREIGN PATENT DOCUMENTS

| | | |
|---|---|---|
| 0049387 | 4/1982 | European Pat. Off. . |
| 0095598 | 12/1983 | European Pat. Off. . |
| 0301354-A2 | 2/1989 | European Pat. Off. . |
| 0397994-A2 | 11/1990 | European Pat. Off. . |
| 0489556 | 6/1992 | European Pat. Off. . |
| 0669578-A2 | 8/1995 | European Pat. Off. . |
| 60-215272 | 10/1985 | Japan . |
| 62-282358 | 12/1987 | Japan . |
| 4-305746 | 10/1992 | Japan . |
| 6-110844 | 4/1994 | Japan . |
| 7-6092 | 1/1995 | Japan . |
| WO 82/03480 | 10/1982 | WIPO . |
| WO 90/00283 | 1/1990 | WIPO . |
| WO-95/24678-A2 | 9/1995 | WIPO . |

*Primary Examiner*—Tod R. Swann
*Assistant Examiner*—Conley B. King, Jr.
*Attorney, Agent, or Firm*—Staas & Halsey

[57] ABSTRACT

A plurality of processors, each with caches provided for a plurality of processor modules and a local storage in which a main storage is distributed and arranged are mutually connected through an internal snoop bus. The processor modules are mutually connected through a second system bus. By using two separate buses, cache coherence operations within a processor group is kept separate from cache coherence operations outside the processor group.

60 Claims, 61 Drawing Sheets

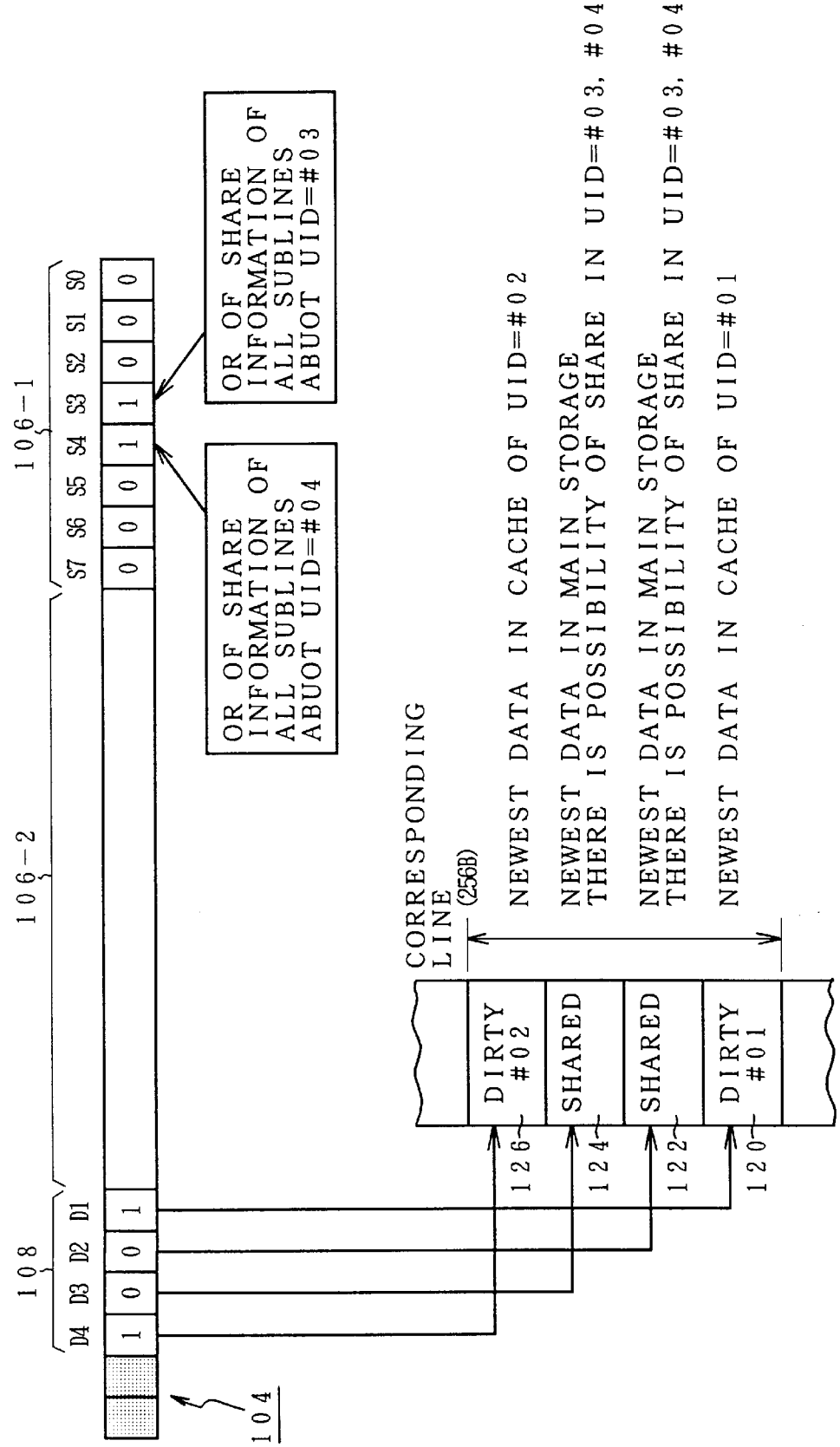

FIG. 13

| GENERATING SOURCE | COMMAND NAME | MEANING |
|---|---|---|
| PROCESSOR 16 | P-RD<br>P-WT<br>P-RP | PROCESSOR READ<br>PROCESSOR WRITE<br>REPLACE |
| SNOOP UNIT 20 | T-CR<br>T-CRI<br>T-CI<br>T-EX | T BUS COHERENT READ<br>T BUS COHERENT READ & INVALIDATE<br>T BUS COHERENT INVALID<br>T BUS EXCLUSIVE |
| | T-CB<br>T-RP | T BUS COPY BACK<br>T BUS REPLACE |
| | T-R<br>T-W | T BUS READ<br>T BUS WRITE |
| | T-RPL<br>T-DT | T BUS REPLY<br>T BUS DATA TRANSFER |
| MEMORY MANAGEMENT UNIT 26 | H-CR<br>H-CRI<br>H-RLD<br>H-CI<br>H-LD | HRD COHERENT READ<br>HRD COHERENT READ & INVALIDATE<br>HDC REMOTE LOAD DATA<br>HDC COHERENT INVALIDATE<br>HDC LOAD DATA |
| | H-ASK | HDC ASK CACHE STATUS |
| | H-R<br>H-W | HDC READ<br>HDC WRITE |
| | H-PRL<br>H-DT | HDC REPLY<br>HDC DATA TRANSFER |

FIG. 14

| ABBREBIATION | STATE NAME | MEANING |
|---|---|---|
| INV | INVALID | NON-CACHE STATE. |
| SH&C | SHARED & CLEAN | DATA OF SAME CONTENTS AS THOSE IN HOME IS HELD. |
| SH&M | SHARED & MODIFIED | NO NEWEST DATA EXISTS IN HOME. SH&D EXISTS IN CACHE GROUP OF SELF PM. |
| EX&D | EXCLUSIVE & DIRTY | ONLY ONE NEWEST DATA IS HELD IN SYSTEM. WRITE RIGHT IS IN POSSESSION (OWNER). |
| SH&D | SHARED & DIRTY | NO NEWEST DATA EXISTS IN HOME. NEWEST DATA IS HELD IN CACHE GROUP OF SELF PM. SH&M EXISTS IN CACHE GROUP OF SELF PM AND WRITE RIGHT IS IN POSSESSION BY ITSELF (OWNER). |

COMMAND THAT IS GENERATED TO A T-BUS BY THE OPERATION OF THE PROCESSOR IS SHOWN IN ( ). H-LD DENOTES H-LD AND H-RLD.

| REPLACED CACHE UNIT | PRIORITY | | |
|---|---|---|---|
| | HIGH | MIDDLE | LOW |
| #0 | #1 → | #2 → | #3 |
| #1 | #2 → | #3 → | #4 |
| #2 | #3 → | #0 → | #1 |
| #3 | #0 → | #1 → | #2 |

FIG. 41

| TB CODE | | ABBREBIATION | NAME | MEANING |
|---|---|---|---|---|
| HEX | 210 | | | |
| 0 | 000 | CE&C | COMMAND-END & CONTINUE | END OF COMMAND & CONTINUE OF BUS USE RIGHT |
| 1 | 001 | CE&E | COMMAND-END & END | END OF COMMAND & END OF BUS USE RIGHT |
| 2 | 010 | CC | COMMAND CONTINUE | CONTINUE OF COMMAND (& CONTINUE OF BUS USE RIGHT) |
| 3 | 011 | RETRY | RETRY (CANCEL) & END | RETRY (CANCEL) & END OF BUS USE RIGHT |
| 4 | 100 | SC&C | SINGLE-WORD-COMMAND & CONTINUE | SINGLE-WORD COMMAND & CONTINUE OF BUS USE RIGHT |
| 5 | 101 | SC&E | SINGLE-WORD-COMMAND & END | SINGLE-WORD COMMAND & END OF BUS USE RIGHT |
| 6 | 110 | MC&S | MULTI-WORD-COMMAND & START | START OF MULTI-WORD COMMAND (& CONTINUE OF BUS USE RIGHT) |
| 7 | 111 | IDLE | IDLE CYCLE | IDLE CYCLE (BUS UNUSED STATE) |

FIG. 42

| +BRQ | +BRE | MEANING | EXPLANATION |
|---|---|---|---|
| L | L | UNIT INOPERATIVE | INDICATES THAT THE UNIT OF RELEVANT #n SLOT IS IN INOPERATIVE STATE. |
| L | H | NO BUS REQUEST | ASSERTING ONLY BRE IN CASE OF OTHER THAN BUS REQUEST. |
| H | L | ORDINARY BUS REQUEST | ORDINARY BUS REQUEST OTHAR THAN EMERGENCY. |
| H | H | EMERGENCY BUS REQUEST | EXECUTE THIS REQUEST FOR ERROR REPLY WHEN BUS SLAVE DETECTS ERROR. |

FIG. 43

| +BLT | +MFC | MEANING | EXPLANATION |
|---|---|---|---|
| H | L | ARBITER UNINSTALLED | NOTIFIES STATE IN WHICH BUS ARBITER IS NOT INSTALLED. |
| H | H | ARBITER HALT | NOTIFIES THAT ERROR OCCURRED BY SELF DIAGNOSIS OR THE LIKE OF BUS ARBITER AND THAT BUS ARBITER IS IN STOP STATE. |
| L | L | BGR ORDINARY SWITCHING | BGR SWITCHING TIMING IN THE CASE WHERE END OF BUS CYCLE IS DETECTED WHEN BUS ARBITER HOLDS REQUEST. |
| L | H | BGR FORCED SWITCHING | BGR SWITCHING TIMING IN THE CASE WHERE BUS ARBITER HOLDS REQUEST AND BUS IS UNUSED. |

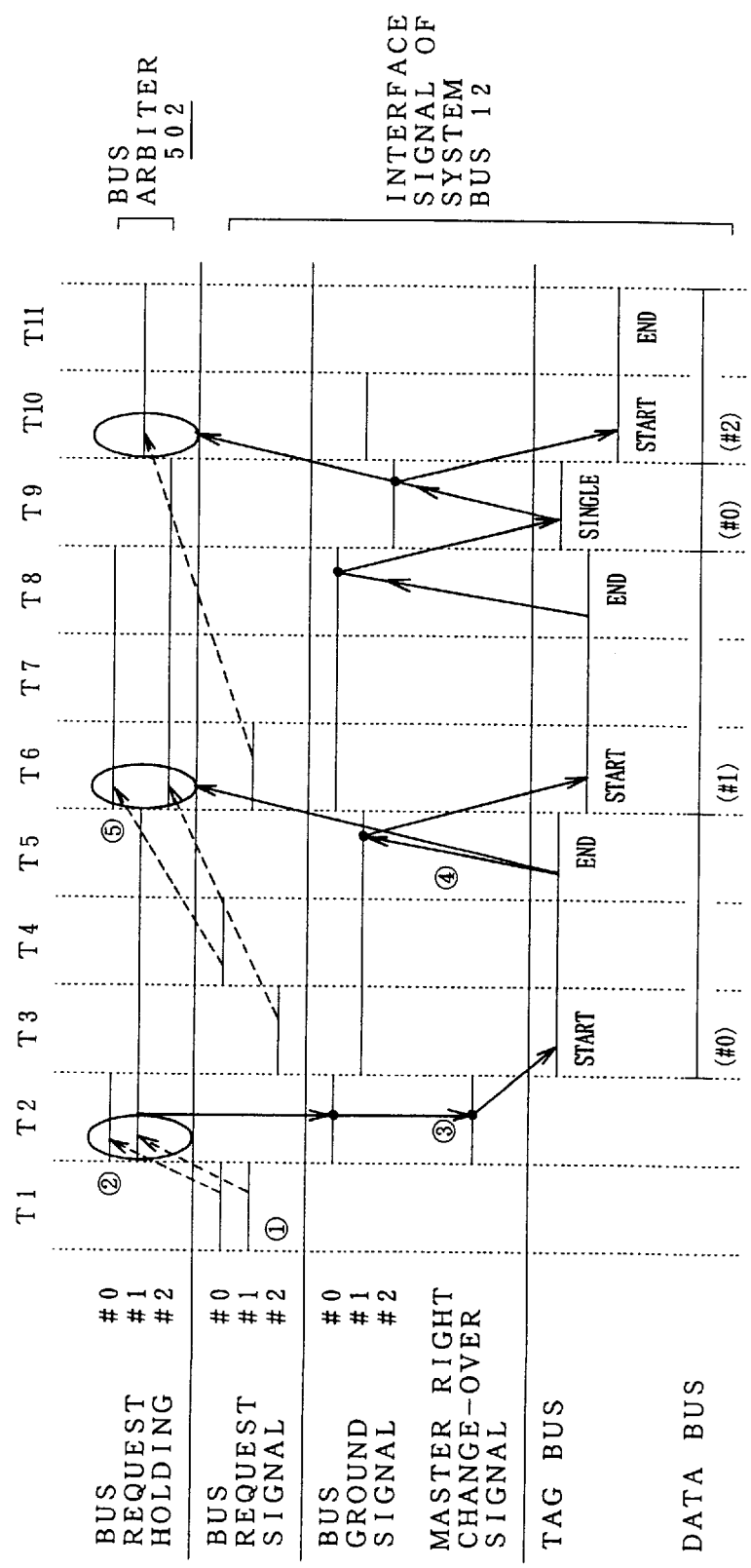

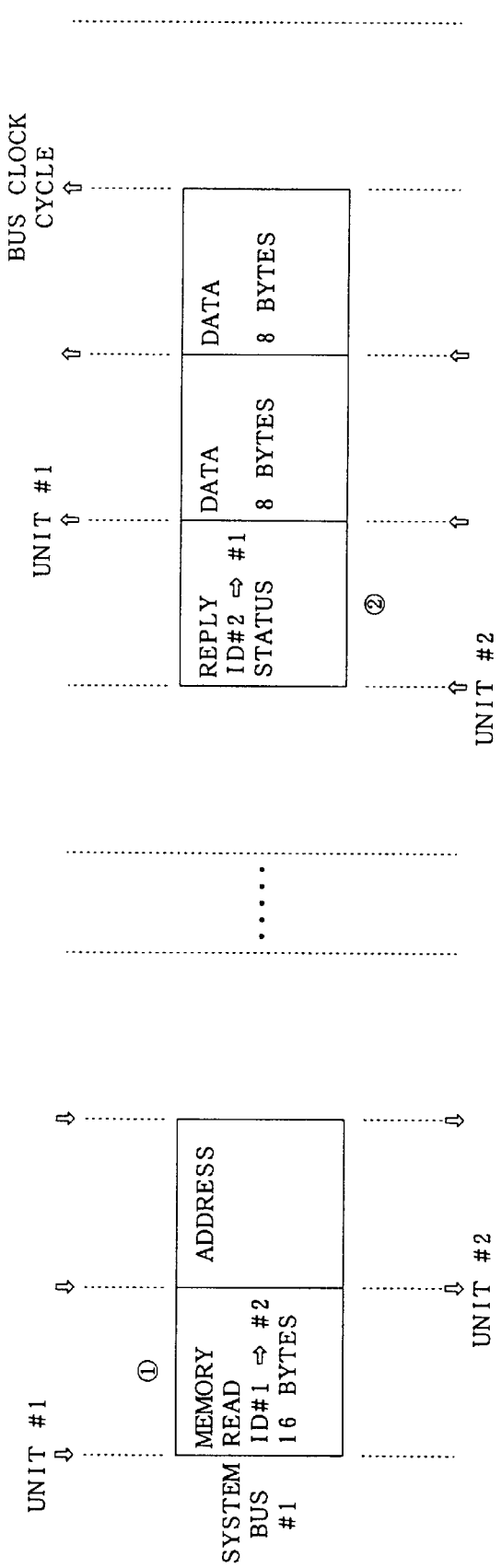
F I G. 5 3

FIG. 59

| TYPE | MEANING |
|---|---|
| 00 | ERROR OF SOFTWARE |
| 01 | ERROR REGARDING SYSTEM CONSTRUCTION |
| 10 | ERROR OF HARDWARE |
| 11 | ERROR OF BUS |

FIG. 60

| TYPE | LEVEL | | CLASSIFICATION |
|---|---|---|---|
| 00 | 000 | 000 | NORMAL END |
|  | 000 | nnn | FAULT OF SOFTWARE |
|  | 001 | rxx | FAULT OF SOFTWARE |
| 01 | 001 | rxx | CHANGE OF CONSTRUCTION STATE |
| 10 | 001 | rxx | FAILURE OF HARDWARE |
| 11 | 000 | rxx | CHANGE OF SCBUS STATE |
|  | 001 | rxx | CONCENTRATION OF SCBUS LOAD |
|  | 010 | rxx | FAILURE OF BUS (COMPLETION GUARANTEE) |
|  | 011 | rxx | FAILURE OF BUS (COMPLETION NON-GUARANTEE) |

F I G. 6 1

| CST#n | | | STATE | MEANIMG |
|---|---|---|---|---|
| 2 | 1 | 0 | | |
| 0 | 0 | 0 | INVALID | NON-CACHE STATE |
| 0 | : | : | (RESERVED) | — |
| 1 | 0 | 0 | INVALID HOLD | OWNER'S OR INVALID STATE |
| 1 | 0 | 1 | CLEAN | SHARED STATE |
| 1 | 1 | 0 | GRAY | OWNER'S OR SHARED STATE |
| 1 | 1 | 1 | DIRTY | OWNER'S STATE |

COHERENCE APPARATUS FOR CACHE OF MULTIPROCESSOR

BACKGROUND OF THE INVENTION

The invention relates to a cache coherence apparatus for a multiprocessor system in which a plurality of processor modules are connected through a system bus and, more particularly, to a coherence apparatus for a cache of a multiprocessor system in which a plurality of processor elements with caches are connected in a processor module through a main storage and an internal common bus.

In recent years, since it is expected that the processing performance of computer systems will remarkably improved and the development of a multiprocessor system in which a plurality of processors are connected through a common bus is progressing. In the multiprocessor system, by using a superscalar type or a VLIW (Very Long Instruction Word) type as a processor, the processing performance of a sole processor is improving. The use of a cache mechanism largely contributes to the improvement of the performance. In such a cache mechanism, a primary cache is built in the processor and a secondary cache is provided between the processor and an external main storage. Using this configuration the hit ratio of the second cache is raised, thereby reducing accesses to the main storage and improving the performance. Further, as a common memory for a plurality of processors, a sole memory is not provided but local memories which function as a main storage are distributed and arranged on a unit basis for a predetermined number of processors. Common memory areas are distributed and arranged for a plurality of local memories and the common memories can be flexibly constructed in dependence on the number of local memory units according to a system scale.

FIG. 1 shows a conventional typical multiprocessor system. The system has two processor modules 1000-1 and 1000-2. The processor modules 1000-1 and 1000-2 have the same construction. For example, when considering the processor module 1000-1, it is constructed by processor elements 1100-1 and 1100-2, cache units 1200-1 and 1200-2, a common bus 1300-1, and a local storage unit 1400-1. The processor elements 1100-1 and 1100-2 have therein primary caches and are also provided with the cache units 1200-1 and 1200-2 as secondary caches on the outside. The local storage unit 1400-1 functions as each main storage by allocating particular physical spaces to the processor elements 1100-1 and 1100-2. At the same time, the local storage unit 1400-1 allocates a common memory space which is shared by all of processor elements, 1100-1 to 1100-4, of the processor modules 1000-1 and on the cache of the accessing source is updated to a 1000-2. In a manner similar to the above, the processor module 1000-2 side is also constructed by processor elements 1100-3 and 1100-4, cache units 1200-3 and 1200-4, a common bus 1300-2, and a local storage unit 1400-2. The common buses, 1300-1 and 1300-2, of the processor modules 1000-1 and 1000-2 operate as one bus connected via a back panel of a module casing. As for a cache control of the cache units 1200-1 to 1200-4 associated with a plurality of processor elements, 1100-1 to 1100- 4, when there is a read access in one of the processor elements and there is a mishit, a copy value of a read address is transferred to the cache by the access to the corresponding local storage. When the cache causes a mishit by a write access of the processor, a copy value of the corresponding local storage is transferred to the cache and is overwritten. In this instance, the value in the main storage and the overwritten copy value in the cache are different. Therefore, a cache coherence is maintained by a copy back which transfers the newest value in the cache to the main storage and updating the old value. on the other hand, in the case where the value of a certain local storage has been copied into a plurality of caches, the copy values in the caches other than the cache to which the write access was performed are invalidated. After that, the copy value in the cache of the accessing source is updated to a newest value and, subsequently, the newest value is copied back to the local storage, thereby maintaining the cache coherence.

However, since the multiprocessor system of FIG. 1 uses a construction such that all of the processor elements, cache units, and local storages are connected to one bus, there are the following problems. First, in order to maintain cache coherence, commands and data are transferred between the cache unit of the processor element which generated the read or write access and the local storage unit having the access address. Therefore, bus transfer requests to maintain coherence compete among a plurality of processor elements and the load of the common bus increases in accordance with the number of processors and high speed processing cannot be performed. Although the load on the bus can be reduced by providing a plurality of common buses, when the number of processors increases to ten or twenty processors, the system cannot cope effectively with it.

Each of the processor modules 1000-1 and 1000-2 is constructed on a module casing unit basis. Therefore, the common buses 1300-1 and 1300-2 are connected by a cable using connectors via a back panel of the casing. Thus, the line length of the bus is increased and the clock frequency of the bus cannot be raised due to electrical characteristics. For example, although the clock frequency can be set to 60 MHz in case of only one bus in the module, it is reduced to 40 MHz in case of the bus connection which shares the back panel.

In the multiprocessor system, a system bus particularly exerts a large influence on the performance. In the system bus, the data transfer speed and the bus usage efficiency as a ratio of cycles which are used for data transfer over the total bus cycles have to be raised. Otherwise, the system bus becomes a bottleneck and even if the number of processors is increased, the performance is not improved. To improve the data transfer speed, generally, the width of data bus is widened or an interface of a small signal amplitude is used, thereby raising an operating frequency of the bus. To raise the bus usage efficiency, it is possible to use a split type transfer system to yield a usage privilege to another bus unit for a period of time until a response is received after a request such as a memory access or the like was generated.

SUMMARY OF THE INVENTION

According to the present invention, there is provided a cache coherence apparatus in which by using a common bus structure of two hierarchies such that common buses are provided in a processor module and outside thereof, a cache coherence is efficiently maintained between caches of a plurality of processors built in each processor module and a local storage which functions as one distributed main storage provided for each module, thereby raising the processing performance.

According to the present invention, in a multiprocessor system of a distributed common memory type, there is provided a common bus of a cache coherence apparatus in which a cache coherence is efficiently maintained and an augmentability of the system is not lost.

First, the invention has a processor group having a plurality of processors. The processor group is divided into, for example, three processor modules having at least one or more processors therein. A main storage which is shared by the processor group is provided. The main storage is divided into a plurality of local storages. Each local storage is arranged on the processor module. Hereinafter, each local storage is referred to as a distributed main storage. A cache unit, to maintain the accessing speed of the distributed main storage high, is provided for each processor. A registration state of data of the distributed main storage to the cache unit is stored in a directory memory on a cache line unit basis. The distributed main storage and the cache unit are connected by a snoop bus (internal common bus). The processor modules are connected by a system bus (external common bus).

A memory control module is provided for the distributed main storage of the processor module and the directory memory. In the case where access data is not registered in any one of a plurality of cache units for an access request of any one of a plurality of processors in the module, the memory control module recognizes the distributed main storage in which the access data exists. When the access data exists in the distributed main storage, the memory control module accesses it and responds. When it is recognized that the access data exists in the distributed main storage of another processor module, an access command is transmitted to an external common bus. When receiving the access command from another processor module by the external common bus, the memory control module refers to the directory memory. When the access data is not registered yet, the memory control module accesses the distributed main storage and responds to the transmitting source. When the access data has already been registered in the directory memory, the cache unit on the registration destination is accessed and a response is made. As for a cache unit on the registering destination, there exists a case where it is in the module and a case where it is another processor module out of the module. After completion of the response of the access data, the memory control module updates a cache state in the directory memory in accordance with the access result.

The cache unit divides the cache line into a plurality of sublines and manages the same. A cache state in a "dirty" state in which the data on the cache unit has a newest value and the data on the distributed in storage has an old value is stored in the directory memory on a subline unit basis. A "share" state in the case where the data on the cache unit and the data in the distributed main storage are identical is stored in the directory memory on a cache line unit basis. The storage of the cache state in the directory memory is executed on a processor module unit basis. Specifically, the processor module has a memory management unit to store a correspondence state with a plurality of processor modules into the directory memory and designates the registration into the directory memory on a unit basis of a plurality of processor modules.

A memory control module of the processor module comprises: a memory management unit to manage the distributed main storage and the directory memory; a protocol management unit to manage a protocol conversion of the snoop bus and the system bus; and a module connection unit to couple the processor modules by the system bus.

The cache unit divides the cache line of, for example, 256 bytes into sublines each consisting of 64 bytes for management purposes. In correspondence to it, a dirty state in which the data on the cache is the newest value and the data on the distributed main storage is the old data is registered in the directory memory on a subline unit basis. The share state in which the data on the cache and the data on the distributed main storage have the same value is registered on a cache line unit basis. A directory entry registered in the directory memory on a cache line unit basis has, for example, a plurality of subline bits D3 to D0 indicative of the presence or absence of the dirty state, and shared map bits S7 to S0 indicative of the shared state of each of the plurality of processor modules. Further, a construction register to register a correspondence relation between the bit positions of the shared map bits S7 to S0 and the processor modules is provided. The share state of a plurality of processor modules can be registered into the same map bit by the construction register. Further, in the case where the subline bits D3 to D0 of the directory entry are set, information (PM-ID) of the processor module in which the cache unit having the newest value, corresponding to the bit set, is stored into a specific area of the distributed main storage. In the case where the subline bits D3 to D0 are reset, in correspondence to the reset bits, information (PM-ID) of the processor module in which the newest value exists is stored into a specific area of the distributed main storage. The processor executes a read access or write access of the cache line on a subline unit basis. The system bus, as an external common bus, and the snoop bus, as an internal common bus, transfer the information by a split form in which a command transfer and a response transfer are separated. The cache coherence for the read access of the processor has reading modes 1 to 3.

Reading Mode 1

The reading mode 1 relates to a case where in response to the read access of an arbitrary processor in the first processor module, a mishits occurs in the its cache unit and all of the other cache units connected by the snoop bus, the read address exists in the distributed main storage in the first processor module, and further the data of the read address exists in the dirty state in which the cache unit in the second processor module as a remote has the newest value. In this case, the first processor module which generated the read access generates a command to the system bus and accesses the second processor module and obtains the newest value from the cache unit in the dirty state through the its snoop bus. After that, the newest value is transmitted to the first processor module by the system bus. The first processor module stores the newest value obtained by the above response into the cache unit of the accessing source and allows the cache unit to respond to the read access and, at the same time, writes the newest value into the distributed main storage, thereby maintaining the cache coherence. When the newest value is written into the first processor module and the distributed main storage, the directory entry in the directory memory is updated from the dirty state to the share state and the cache unit of the accessing source updates an invalidation state of a tag memory to a share state.

Reading Mode 2

The reading mode 2 relates to the case where for the read access of an arbitrary processor in the first processor module, mishits occur in the its cache unit and all of the other cache units connected by the snoop bus, the read address exists in the distributed main storage in the second processor module, and further the data in the read address exists in the dirty state in which the cache unit in the third processor module has the newest value. In this case, the first processor module generates a command to the system bus and accesses the second processor module. The second processor module generates a command to the system bus on the basis of the command received from the system bus and accesses the third processor module. The third processor module obtains the newest value from the cache unit in the dirty state by the its snoop bus and, after that, transmits the newest value to the first and second processor modules by the system bus. The second processor module writes the newest value obtained by the response received into the distributed main storage. The first processor module stores the newest value obtained by response received into the cache unit of the accessing source and allows the cache unit to respond to the read access. When the newest value is written into the distributed main storage, the second processor module updates the directory entry of the directory memory from the "dirty" state to the "share" state. The cache unit of the accessing source of the first processor module updates the "invalid" state of the tag memory to the "share" state.

Reading Mode 3

Reading mode 3 maintains cache coherence between the caches in a certain processor module. Namely, reading mode 3 relates to the case where although a mishit occurs in the a processor's cache unit for the read access of an arbitrary processor in an arbitrary processor module, the newest value exists in the cache unit of another processor connected by the snoop bus. In this case, the transfer of the newest value is executed between both of the cache units through the snoop bus and the newest value is stored into the cache unit 18 of the accessing source, thereby allowing the cache unit 18 to respond to the read access. The transfer of the newest value using the snoop bus in this case is executed on a cache subline unit basis. Subsequently, the cache coherence for a write access of the processor has writing modes 1 to 5.

Writing Mode 1

The writing mode 1 relates to the case where for the write access of an arbitrary processor in the first processor module, the copy value is not stored in the its cache unit and the other cache units connected by the snoop bus in a state in which the write privilege is possessed and mishits occur, the write address exists in the distributed main storage in the first processor module, and further the copy value in the write address of the distributed main storage exists in the cache units of the other plurality of processor modules other than the first processor module in the share state. In this case, the first processor module generates an invalidating command to all of the processor modules in the share state by using the system bus. All of the processor modules in the share state simultaneously receive the invalidating command and independently respond to the first processor module by using the system bus when the invalidation is successful. The first processor module recognizes the success in invalidation by receiving all responses from the system bus and stores the copy value in the write address of the distributed main storage into the cache unit of the accessing source, thereby allowing the copy value to be overwritten by the write access. When the first processor module recognizes the success in invalidation and copies back to the cache unit of the accessing source, the share state in the directory entry of the directory memory is updated to the dirty state.

Writing Mode 2

Writing mode 2 relates to the case involving the write access of an arbitrary processor in the first processor module, the copy value is not registered in its cache unit and the other cache units connected by the snoop bus in a state in which the write privilege is possessed and mishits occur. The write address exists in the distributed main storage in the first processor module, and further the copy value in the write address of the distributed main storage exists in the cache units of a plurality of processor modules including the first processor module in the share state. In this case, simultaneous invalidating commands are generated to all of the processor modules in the share state by using the system bus, and the first processor module generates the invalidating command to the cache unit in the first processor module by using the snoop bus. All of the processor modules in the share state simultaneously receive the invalidating command and independently respond with an indication of success in invalidation to the first processor module by using the system bus. Simultaneously, the cache unit in the first processor module responds indicating the success in invalidation by using the snoop bus. The first processor module recognizes the success in invalidation by receiving all of the responses from the system bus and the response from the its snoop bus and stores the copy value in the write address of the distributed main storage into the cache unit, thereby allowing the copy value to be overwritten by the write access of the processor. In a manner similar to the writing mode 1, when the first processor module recognizes the success in invalidation and copies to the cache unit of the accessing source, the share state in the directory entry of the directory memory is updated to the dirty state.

Writing Mode 3

The writing mode 3 relates to the case of the write access of the processor in the first processor module, the copy value is not registered in the its cache unit and the other cache units connected through the snoop bus in a state in which the write privilege is possessed and mishits occur, the write address exists in the distributed main storage in the second processor module, and further the copy value in the write address of the distributed main storage exists in the cache units of a plurality of processor modules other than the second processor module in the share state. In this case, the first processor module generates a request command (home command) of the write privilege to the second processor module by using the system bus. The second processor module which received the request command of the write privilege generates the invalidating command (purge command) to all of the other processor modules in the share state by using the system bus. All of the processor modules in the share state simultaneously receive the invalidating command and independently respond to the second processor module by using the system bus to indicate that the invalidation was successful. When the success in invalidation is recognized by receiving all of the responses of the invalidation, the second processor module transmits the write privilege including the copy value in the access address of the its distributed main storage to the first processor module by using the system bus. The first processor module stores the copy value obtained by the reception of the response of the write privilege into the cache unit of the accessing source, thereby allowing the copy value to be overwritten by the write access of the processor. When success in invalidation is recognized and the write privilege is moved, the second processor module updates the share state in the directory entry of the self directory memory to the dirty state.

Writing Mode 4

The writing mode 4 relates to the case where for the write access of an arbitrary processor in the first processor module, the copy value is not registered in its cache unit and the other cache units connected through the snoop bus in a state in which the write privilege is possessed and mishits occur, and the write address exists in the distributed main storage in the second processor module. Further, the copy value in the write address of the distributed main storage exists in the cache units of a plurality of processor modules including the second processor module in the share state. In this case, the first processor module generates a request command (home command) for the write privilege to the second processor module. The second processor module which received the request command of the write privilege generates the invalidating command (purge command) to all of the processor modules in the share state by using the system bus. In parallel with it, the second processor module generates the invalidating command to the its cache unit in the share state by using the snoop bus. All of the processor modules in the share state simultaneously receive the invalidating command and independently responds indicating success in invalidation to the second processor module by using the system bus. In parallel with it, the cache unit of the second processor module responds indicating success in invalidation by using the snoop bus. The second processor module recognizes the success in invalidation by receiving all of the responses of the indication of success in invalidation from the system bus and the indication of the success in invalidation from the snoop bus and transmits the write privilege including the copy value in the write address of its distributed main storage to the first processor module by using the system bus. The first processor module stores the copy value derived by the reception of the response of the write privilege into the cache unit of the accessing source, thereby allowing the copy value to be overwritten by the write access of the processor. When the second processor module recognizes the success in invalidation and responds transmitting of the write privilege, the share state in the directory entry of the directory memory is updated to the dirty state. The invalidating command in the writing mode is generated on a cache subline unit basis. Further, at the time of response to the invalidating command, the state of the other sublines of the cache lines including the subline which performed the invalidation is returned.

Writing Mode 5

Writing mode 5 relates to the case of the write access of an arbitrary processor in the first processor module, the copy value is not registered in the its cache unit and the other cache units connected by the snoop bus in a state in which the write privilege is possessed and mishits occur, the write address exists in the distributed main storage of the first processor module, and the newest value in the write address of the distributed main storage exists in the cache unit of the second processor module in the dirty state in which the write privilege is possessed. In this case, the first processor module generates a request command (remote command) of the write privilege to the second processor module in the dirty state by using the system bus. The second memory module receives the request command of the write privilege and responds by transmitting the write privilege including the newest value of the cache unit to the first processor module by using the system bus. The first processor module stores the newest value obtained in response to the write privilege, into the cache unit of the accessing source, thereby allowing the newest value to be overwritten by the write access of the processor. When the write privilege is transmitted, the cache unit of the second processor module updates the dirty state of the tag memory to the invalidation state. When the write privilege is received, the first processor module updates the dirty state in the directory entry of the directory memory to the dirty state indicating that the newest value exists on the cache.

Writing Mode 6

Writing mode 6 relates to the case where the write access of the processor in the first processor module and the copy value is not registered in the its cache unit and the other cache units connected through the snoop bus in a state in which the write privilege is possessed and mishits occur. The write address exists in the distributed main storage in the second processor module, and the newest value in the write address of the distributed main storage exists in the cache unit of the third processor module in the dirty state in which the write privilege is possessed. In this case, the first processor module generates the request command of the write privilege to the second processor module by using the system bus. The second processor module which received the request command of the write privilege generates the request command of the write privilege to the third processor module by using the system bus. The third processor module which received the request command of the write privilege transmits the write privilege, including the newest value of the cache unit, to the first and second processor modules by using the system bus. The second processor module receives the response of the write privilege and recognizes the transmission of the write privilege. The first processor module stores the newest value obtained by the reception of the write privilege into the cache unit of the accessing source, thereby allowing the newest value to be overwritten by the write access of the processor. When the write privilege is transmitted, the cache unit of the third processor module updates the dirty state of the tag memory to the invalidation state. When the movement of the write privilege is recognized, the second processor module updates the dirty state in the directory entry of the its directory memory to the dirty state indicating that the newest value exists. Further, when the newest value is stored, the cache unit of the accessing source of the first processor module updates the invalidation state of the tag memory to the dirty state in which the write privilege exists.

Writing Mode 7

Writing mode 7 relates to the case of accessing among a plurality of caches in the processor module. Writing mode 7 relates to the case where although a mishit occurs in the its cache unit for the write access of an arbitrary processor in the first processor module, the newest value in the write address exists in the other cache units connected through the snoop bus in the dirty state in which the write privilege is possessed. In this case, the data transfer and the movement of the write privilege are executed between the cache units through the snoop bus and the cache unit of the accessing source is overwritten by the transferred data. After that, it is overwritten by the write access of the processor. After the write privilege was transmitted, the cache unit of an accessing destination updates the dirty state of the tag memory to the invalidation state. After the write privilege was obtained, the cache unit of the accessing source updates the tag memory from the invalidation state to the dirty state in which the write privilege exists.

Competition of Cache Access

According to the present invention, in the case where the access from inside of the module and the access from outside of the module compete, the following competing process is executed to the cache unit of the processor module. First, the first module is allowed to get the cache unit, thereby allowing the subsequent module to retry. Further, the first module is allowed to store the partner destination module which competes and the access address.

After completion of its access, in the case where an access command from the module other than the competed partner destination module is received, the retry is instructed. The access command by the retry of the competed partner destination is preferentially accepted. Specifically, the above situation relates to access from a certain processor in the module and access from the processor module from outside, competing for the cache unit. The processor that started first gets the cache unit. In this case, the processor allows the processor module to instruct the retry and, further, stores the competed processor module and the access address. After completion of the its access, when the access command from the processor module other than the competed processor module is received, the processor instructs a retry and preferentially accepts the access command by the retry of the competed second processor module. Thus, it is possible to prevent the external processor module from losing in competition with accesses with a plurality of processors built in the processor module that repeats the retry when a time error of the system bus occurs. High efficiency of the cache coherence via the system bus can be realized and a high reliability can be seen. After completion of the its access, in the case where the access from the module of the competition partner destination is not generated for a predetermined time, the module which obtained the cache unit initializes the competition partner destination and the memory contents of the access address and cancels the preferential acceptance of the competition partner destination.

Write Privilege of the Copy Back

In the processor module of the invention, in the case where the newest data doesn't exist in the distributed main storage but exists in a plurality of cache units, one of a plurality of cache units possesses the write privilege to copy back the newest data to the distributed main storage. In this state, when a replacement of the newest data by the processor occurs in the cache unit having the write privilege, the write privilege is transmitted to the cache unit having the newest data and the copy back of the newest data to the distributed main storage is suppressed and is not performed until the number of cache units having the newest data reaches one. Thus, the burden of the snoop bus which couples a plurality of cache units and the memory management unit (on the directory side) on the distributed main storage side is reduced. Since a plurality of cache units have individual ID numbers, #0 to #3, the write privilege is transmitted in accordance with a predetermined order on the basis of the ID numbers of the cache units which replaced the newest data. The memory management unit to manage the distributed main storage has the write privilege indicating that the newest data exists in the cache unit and the data of the distributed main storage is in the dirty state. However, even when the write privilege is moved between the cache units, the write privilege of the memory management unit is not moved to another processor module but is maintained as it is.

Common Bus System

According to the present invention, in a multiprocessor system of a distributed common memory type, there is provided a common system bus of a cache coherence apparatus which can efficiently maintain a cache coherence and in which augmentability of the system is not lost. Further, a common system bus of high reliability in consideration of the use to a basic system in which the use of a large scale multiprocessor is expected is provided. Moreover, a common bus which can effectively use existing bus resources in consideration of the connection with a different bus is provided.

Accordingly, a system bus (second common bus) which functions as a common system bus of the invention, a bus connection unit of a plurality of processor modules and a bus arbiter are connected and a bus command is transferred among a plurality of processor modules by a split type packet transfer. A bus command to be transferred by the system bus is characterized by having three fields such as source field indicative of an access requesting source (source ID), first destination field indicative of a first access requesting destination (first destination ID), and second destination field indicative of a second access requesting destination (second destination ID). The bus command of the invention having the three fields such as source field, a first destination field, and a second destination field is used as a read bus command. In the case where target data of its read request exists in the distributed main storage of the second processor module, the first processor module as a read requesting source transmits a first bus command in which its unit ID #1 is designated for the source field and the unit ID #2 of the second processor module is designated for the first destination field. In this case, the second destination field is not used. In the case where the newest data of the read request doesn't exist in the distributed main storage but exists in the cache unit of the third processor module, the second processor module which received the first bus command transmits a second bus command in which its unit ID #2 is designated for the source field and the unit ID #3 of the third processor module having the newest data is designated for the first destination field and, further, the unit ID #1 of the first processor module of the access requesting source is designated for the second destination field. The third processor module which received the second bus command transmits a reply command in which its unit ID #3 is designated for the source field, the unit ID #2 of the second processor module of the distributed main storage is designated for the first destination field and, further, the unit ID #1 of the first processor module of the read requesting source is designated for the second destination field. The third processor module subsequently, simultaneously transmits the read data to the first and second processor modules. In this case, when the second bus command is transmitted from the second processor module to the third processor module, since it takes a longer time than the ordinary bus transfer, the first processor module changes a set time of a timer for monitoring a time-out of the bus transfer from a first time to a second time which is longer than the first time. Further, the bus command to be used by the system bus expresses each of the source field, first destination field, and second destination field by two identifiers such as a bus identifier (bus ID) indicative of the second common bus and a unit identifier (unit ID) indicative of the unit such as a processor module or the like. In the case where a plurality of second common buses are mutually connected through an inter-bus connection unit, therefore, a unit in another second common bus can be designated. A subsystem is constructed by a plurality of processor modules by a system bus. It is possible to form an extended system in which a plurality of subsystems are connected through a subsystem connection unit. In this case, a subsystem extension identifier indicative of the transfer between the subsystems is provided for the bus command. When the subsystem extension identifier is valid, it is possible to have a command field for every subsystem of the bus command, to designate each of the source field, the first destination field, and the second destination field, and to designate units of different subsystems. Further, a subsystem having a heterosystem bus can be connected through a heterobus connection unit to the system bus in which a plurality of processor modules are connected. In this case, for the bus command, a command to emulate the heterosystem bus is provided for a part of the command field and the unit on the heterosystem bus can be designated.

When an abnormality is detected by the second processor module during the transfer of the bus command from the first processor module serving as a bus master to the second processor module serving as a bus slave, the second processor module transmits an error reply bus command and notifies of an error to the first processor module. The bus arbiter monitors for a bus abnormality until the second processor module, as a bus slave, is decided by the bus transfer of the bus command from the first processor module, as a bus master, to the second processor module. When the bus arbiter detects an abnormality, a reply bus command is transmitted and an error is reported to the first processor module. The error reply bus command has a classification field of causes of the detected abnormality including a field indicating on which access path the abnormality occurred in the case where a plurality of access paths exist, and a field indicative of the kind of the detected abnormality.

Regarding a bus command which is used in the system bus, an access identifier field storing an operation identifier (access ID) of the source unit is provided for each of the first and second destination fields. The bus command is modified by the operation identifier of the access identifier field, and the operating mode of the bus command is changed. For example, for the purpose of the cache coherence, a first bus command is transmitted to the second processor module having a distributed main storage of the accessing destination from the first processor module serving as an access requesting source. A second bus command is transmitted from the second processor module to the third processor module in which the newest data is possessed in the cache unit. In the case where a reply bus command is finally transmitted from the third processor module, the access identifier is designated in the following manner. First, the first processor module designates its operation identifier to the access identifier field of the first destination field in the second bus command. The second processor module designates the same operation identifier as that of the second bus command to each of the access identifier fields of the first and second destination fields in the second bus command. The third processor module designates the same operation identifier as that of the second bus command to each of the access identifier fields of the first and second destination fields in the reply bus command. Each of the first and second processor modules judges the coincidence of the operation identifier of the its destination field of the reply bus command and the operation identifier which was stored and held at the time of the transmission of the bus command, thereby judging that the operation is the reply for its bus command. Therefore, in the first processor module of the access requesting source, the first bus command is transmitted and becomes an opportunity for transmission of the second bus command by the second processor module. Thus, the reply command for the second bus command is transmitted from the third processor module. However, the first processor module is not aware of the second bus command but can receive it as if the operation were the reply for its first bus command.

Regarding the hardware of the second common bus, there is provided a data bus line for transferring data, a parity line in parallel, and a tag information line to specify the operation of the bus sequence independently of the data bus line. A plurality of bus cycles are continued by one acquisition of the bus by the designation of tag information by the tag information line. By the designation of a retry by the tag information line, the invalidation of the bus sequence that is being executed can be instructed at an arbitrary timing of the bus cycle. Regarding a bus connection unit of a plurality of processor modules which are mutually connected by the tag control line and a bus arbiter, in the case where any one of a plurality of bus connection units doesn't start the bus cycle, a specific bus connection unit which simultaneously received a bus use permission signal (bus grant signal) which is individually output from the bus arbiter to each bus connection unit and a bus use start instruction signal (tag bus signal) is commonly output from the bus arbiter to all of the bus connection units at a start of a bus cycle. In the case where the other bus connection unit has already started the bus sequence, the bus connection unit which received the bus use permission signal detects an end signal of the bus cycle which is generated from the other bus connection unit and starts the bus cycle. Until all of the bus use requests from the bus connection units which were received at specific timings are processed, the bus arbiter reserves the subsequent bus use requesting process. The tag information line has a first bus use request line which is used for the ordinary bus use request signal and a second bus use request line which is used for an emergency bus use request signal such as an abnormality report or the like. The bus arbiter gives a bus use permission preferentially to the bus connection unit which generated the emergency request signal among the bus use request signals received at special timings. Further, the ordinary bus use request, emergency bus use request, absence of the bus use request, and an inoperative state of the bus connection unit itself are notified by a combination of the signals in the first and second bus use request lines.

Second Directory Memory

Another aspect of the present invention is characterized in that in addition to the directory memory of the memory management unit, a second directory memory is provided for the bus connection unit. A state in which the apparatus is in a response waiting state by the access request to the other processor module is registered into the second directory memory on a cache line unit basis. Therefore, for the access from the other processor module, in the case where the access of the same cache line is recognized by the reference to the second directory memory, a busy signal is transmitted. Specifically, in the case where the second processor module, as a home which received the write access from the first processor module as a remote, requests, the invalidation of the same cache line to the third processor module as a remote, a waiting state of the completion of the invalidating request to the remote is registered into the second directory memory. For the access request of the same cache line from the other processor module, a busy signal is transmitted to the system bus. The busy response is transferred to the cache unit in the processor module of the requesting source, thereby performing a retry. In the invalidation completion waiting state, in the case where a buffer full state of the bus connection unit occurs by the access request of the other processor module to the second processor module as a home, a busy signal is transmitted to the bus connection unit of the processor module of the access requesting source and is not transferred to the cache unit but a retry on the system bus is allowed to be executed by the second directory memory on the system bus side as mentioned above. There is no need to transfer the access request of the other processor module to the memory management unit side and the busy response speed can be increased. When considering the cache coherence apparatus of the invention as a whole, it has a common bus construction of two hierarchies. Namely, the plurality of processors with caches provided for the plurality of processor modules and the distributed main storage are mutually connected through the snoop bus (first common bus). The processor modules are mutually connected through the system bus (second common bus). By the common bus construction of two hierarchies, the bus operation of the cache coherence in the processor module and the bus operation of the cache coherence between the processor modules can be separated. It is sufficient that the internal snoop bus has only a bus load in which one processor to be accessed from the outside is added to the processors in the module. It is sufficient that the external system bus has only a bus load as much as the number of processor modules. Therefore, even when the number of processors increases, the loads of the internal and external common buses can be lowered. The processing performance can be improved by maintaining a high speed cache coherence. Since the internal snoop bus doesn't need to be connected to the outside of the processor module, the line length can be reduced and good electrical characteristics can be maintained. Thus, the clock frequency of the bus can be set to a high frequency and the cache coherence among the caches of the processors provided in the apparatus can be realized by a high speed process. In the cache coherence which is executed among the processor modules using the external system bus, at the time of the write access, although the newest value is transferred to the cache of the accessing source, the writing (copy back) to the distributed main storage having the write address is not performed but only the cache state of the directory memory is updated to the dirty state (state in which the newest value exists on the cache and the old value exists in the distributed main storage) and the processes finish. Therefore, the cache coherence at the time of the write access can be finished at a high speed by since the time spent writing (copy back) to the distributed main storage is not performed. At the time of the read access of the same address, when transferring from the processor module of the cache having the newest value to the processor module in which the cache of the accessing source exists, the transfer and writing (copy back) to the distributed main storage in the dirty state is simultaneously executed to the distributed main storage which entered the dirty state due to the write access. The read access and the updating of the distributed main storage by the copy back are executed in parallel, so that the cache coherence of the read access of a higher speed can be realized.

The above and other objects, features, and advantages of the present invention will become more apparent from the following detailed description with reference to the drawings.

BRIEF DESCRIPTION OF THE DRAWINGS

FIG. 12 is an explanatory diagram of the directory entry register of the present invention;

FIG. 13 is a command explanatory diagram for a snoop bus in FIG. 4;

FIG. 14 is an explanatory diagram of a cache state of a cache unit in FIG. 4;

FIG. 41 is an explanatory diagram of a tag bus code by a tag bus line in FIG. 40;

FIG. 42 is an explanatory diagram of control contents according to a combination of a request line and an emergency request line in FIG. 40;

FIG. 43 is an explanatory diagram of control contents according to a combination of a halt line and a master right change-over line in FIG. 40;

FIG. 44 is a time chart for a bus arbitration in a fast mode of the system bus in FIG. 40;

FIG. 53 is a time chart for a transfer sequence in the case where the system bus in FIG. 39 is an 8-byte bus;

FIG. 59 is an explanatory diagram of an error type which is designated by the error bus command in FIG. 57;

FIG. 60 is an explanatory diagram of an error level and an error type which are designated by the error bus command in FIG. 57;

FIG. 61 is an explanatory diagram of a cache status which is designated by the cache status bus command in FIG. 58;

DETAILED DESCRIPTION OF THE PREFERRED EMBODIMENTS

System Construction

Figure 1:
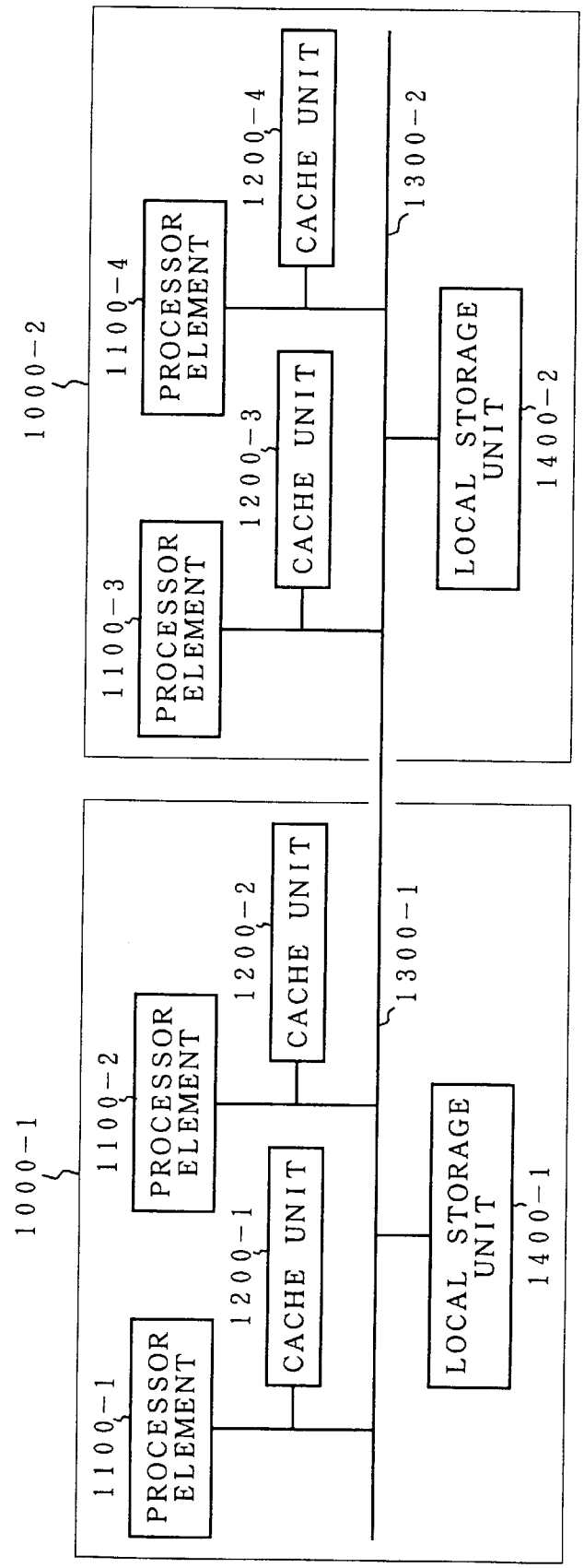
FIG. 1 is a block diagram of a conventional multiprocessor system.
Figure 2:
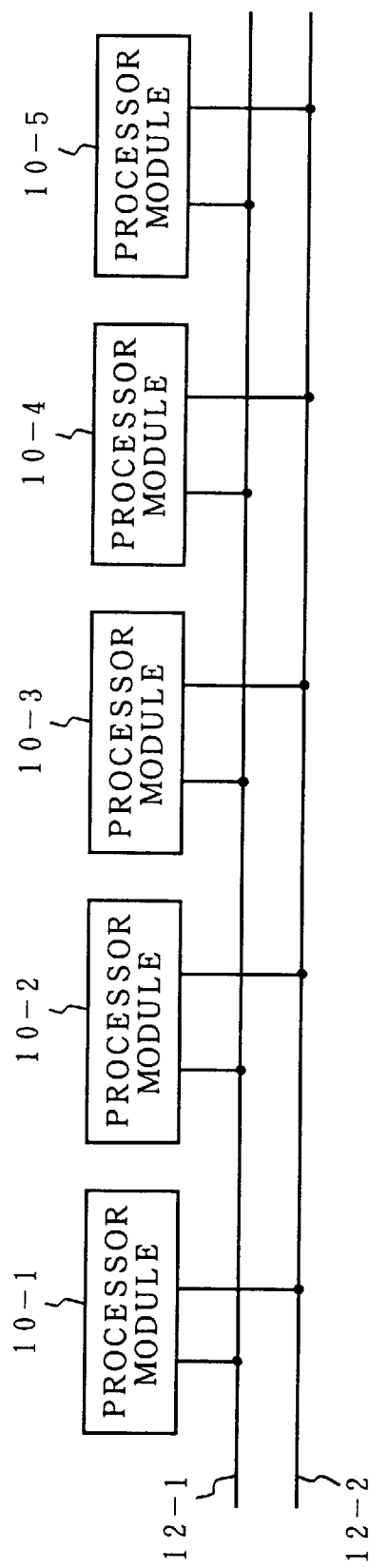
FIG. 2 is a block diagram of a multiprocessor module construction of the present invention.

FIG. 2 is a block diagram of a multiprocessor system to which a cache coherence apparatus of the present invention is applied. The system has, for example, five processor modules 10-1 to 10-5 as processor groups each having at least one processor element. The processor modules 10-1 to 10-5 are mutually connected through system buses 12-1 and 12-2 as external common buses. As shown in the processor module 10-1 in FIG. 3 as an example, each of the processor modules 10-1 to 10-5 has, for example, four processor elements 14-1 to 14-4 which are mutually connected through a snoop bus 22 as an internal common bus. The processor elements 14-1 to 14-4 comprise processors 16-1 to 16-4, cache units 18-1 to 18-4, and snoop units 20-1 to 20 respectively.

A memory control module 25 is connected to the snoop bus 22 and is also connected to the system buses 12-1 and 12-2 by another port. In the case where access data is not registered in any one of the cache units 18-1 to 18-4 for an access request of any one of the processors 14-1 to 14-4, the memory control unit 25 recognizes the processor module in which the access data exists including itself. When the access data exists in another processor module, an access command is transmitted by the system bus 12-1. This means that there is a case where an access command is received from another processor module by the system bus 12-1. When the access command is received from another processor module, the memory control module 25 refers to a directory memory 30 and accesses a local storage 28 as its distributed main storage and responds to a transmitting source if the access data is not registered yet. When the access data has already been registered in the directory memory 30, the memory control module 25 accesses the cache unit of the registration destination and responds. As a cache unit to be accessed in this case, there is a case where it is any one of the cache units 18-1 to 18-4 in the processor module or there is also a case where it is a cache unit of another processor module. After the access data is transmitted, the memory control module 25 updates a state of the directory memory 30 in accordance with the access result.

The memory control module 25 has a protocol management unit 24, a memory management unit 26, and a bus connection unit 32. The protocol management unit 24 executes a protocol conversion between the system buses 12-1 and 12-2 and the internal snoop bus 22 The bus connection unit 32 executes a bus access between the memory control module 25 and the system buses 12-1 and 12-2. The local storage 28 which functions as a distributed main storage and the directory memory 30 which is used to maintain a cache coherence between the processor modules are connected to the memory management unit 26. The snoop units 22-1 to 22-4 maintain the cache coherence between the local storage 28 and the cache units 18-1 to 18-4 in accordance with a snoop protocol for snooping a plurality of cache units 18-1 to 18-4 synchronized with a specific machine cycle by the snoop bus 22 A cache coherence with another processor module is performed by a cache conversion unit 80 provided in the memory management unit 26. The cache conversion unit 80 maintaining the cache coherence between the processor modules on the basis of the reference to the directory memory 30 through the transmission and reception with the other processor modules using the system buses 12-1 and 12-2.

Figure 3:
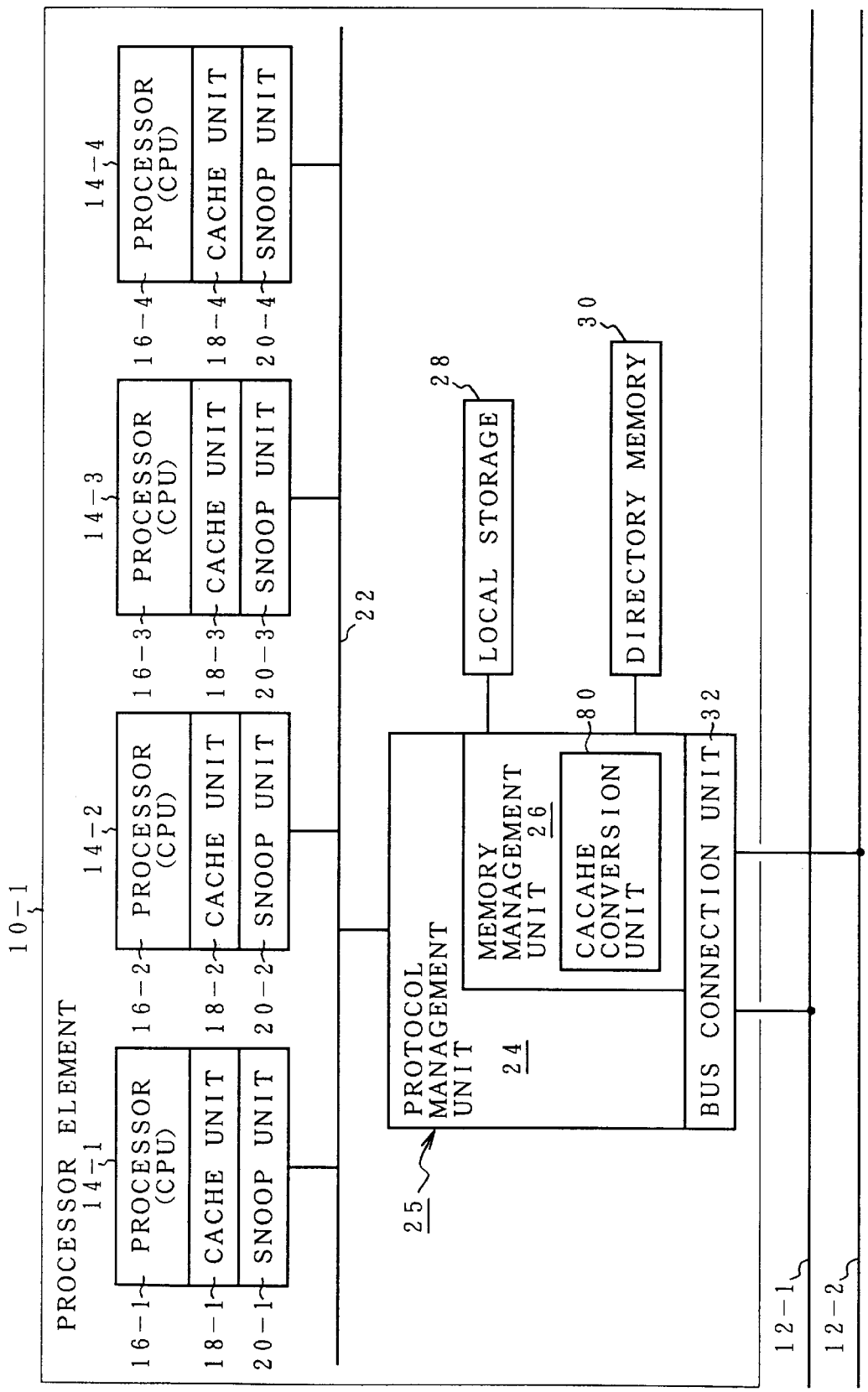
FIG. 3 is a block diagram of an internal construction of the processor module of FIG. 2.
Figure 4:
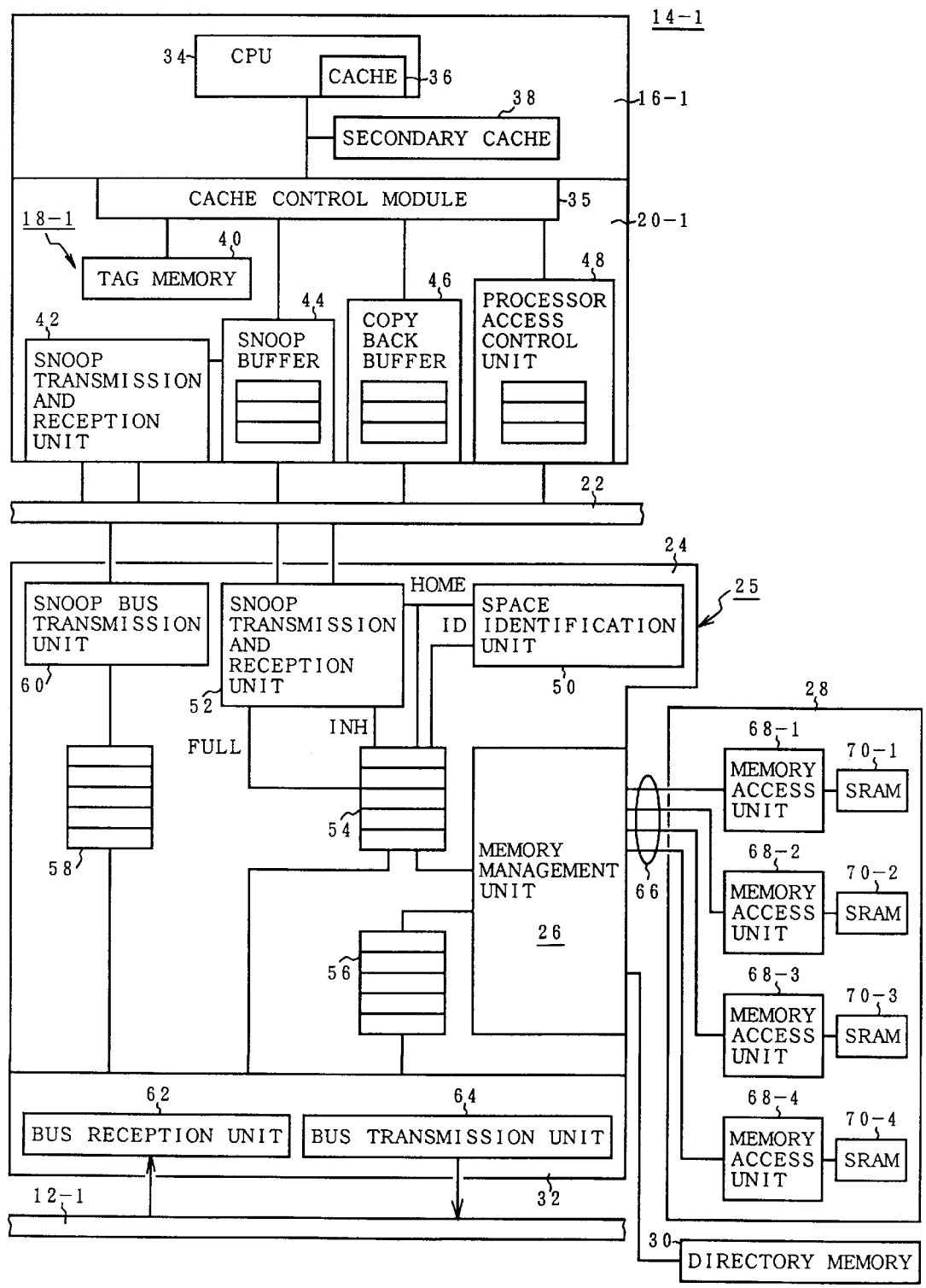
FIG. 4 is a block diagram of an internal construction of the processor module of FIG. 3.
Figure 5:
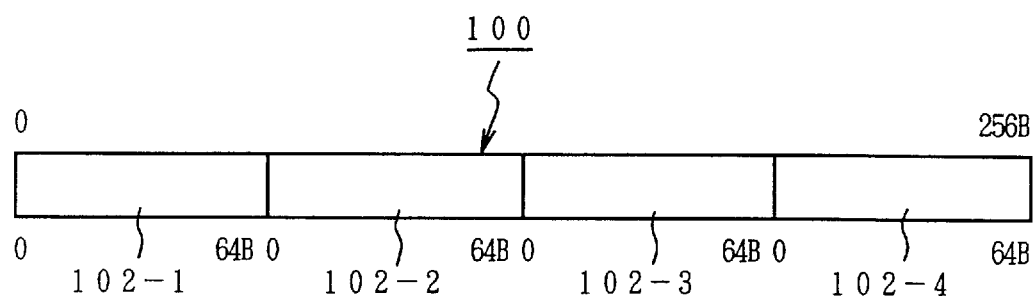
FIG. 5 is an explanatory diagram of a cache line of the present invention.

As for the processor elements 14-1 to 14-4, the processor element 14-1 is shown in FIG. 4 as a representative. A CPU 34 having a primary cache 36 is provided for the processor 16-1. A secondary cache 38 is connected to the outside of the CPU 34. A secondary cache control module 35 is provided as a controller of the secondary cache 38. A tag memory 40 is connected to the secondary cache control module 35. The primary cache 36 of the CPU 34 is controlled by a write through. The secondary cache 38 is controlled by a copy back. In the secondary cache control module 35, an address of data in the secondary cache 38 and information indicative of a cache state of its entry have been registered in the tag memory 40. As shown in FIG. 5, cache data has been registered in the secondary cache 38 as data of a 256-byte unit. Therefore, the cache control module 35 manages the cache registration on an address unit basis of 256 bytes. The data of a 256-byte unit on the secondary cache 38 is called a cache line 100. Therefore, an address of the cache line 100 of the 256-byte unit is held in the tag memory 40. Further, according to the present invention, the cache line 100 of 256 bytes is divided into sublines 102-1 to 102-4 of a 64-byte unit. A cache state is held for every sublines 102-1 to 102-4 The secondary cache 38 is controlled so as to always include the primary cache 36 of the CPU 34. To guarantee a coherence of data among the cache units 18-1 to 18-4 of, for example, the four processor elements 14-1 to 14-4 in FIG. 3 connected by the snoop bus 22, the secondary cache 38 is snooped by the snoop bus 22 The snoop bus 22 is a bus by a packet protocol and has a snoop transmission and reception unit 42, a snoop buffer 44, a copy back buffer 46, and a processor access unit 48 as a snoop mechanism of the secondary cache 38. various kinds of snoop commands are prepared for the snoop bus 22 Since the snoop bus is based on the packet protocol, a plurality of accesses can be simultaneously processed. The snoop of the secondary cache 38 is simultaneously executed by the secondary cache control module 35 of the processor elements 14-1 to 14-4 connected to the snoop bus 22 The results are simultaneously reflected to a cache state signal that is unique to the processor element on the snoop bus 22 The cache state signal is referred by all of the processor elements 14-1 to 14-4 and the memory control module 25 which are connected to the snoop bus. Regarding the units for the snoop bus 22 on the memory control module 25 side, a space identification unit 50, a snoop transmission and reception unit 52, and a snoop bus transmission unit 60 are provided. The secondary cache control module 35 of the processor element 14-1 displays the cache state by the cache state signal. In a similar manner, the memory management unit 26 provided for the memory control module 25 also has a memory state signal to display a state of the local storage 28 in which the main storage is divisionally arranged. The memory state signal is also supplied to all of the secondary cache control modules 35 in the snoop bus 22 Each of the secondary cache control modules 35 provided for the processor elements 14-1 to 14-4 judges the processor element which responds to the access of the CPU 34, determines what an owner having the newest value of the cache data as a target of the access in a possessing state of the write privilege, and judges whether various snoop commands are proper or not on the basis of the contents of the cache state signal regarding the secondary cache 38 on the snoop bus 22 and the memory state signal of the local storage 28 connected to the memory control module 25. Further, the cache state of the secondary cache 38 held in the tag memory 40 is changed as necessary. Further, there is also a case where the invalidation of the primary cache 36 or the response of the data from the secondary cache 38 is associated. Such a series of operations by the snoop bus 22 are controlled in a pipeline manner.

Regarding display contents of the cache state signal of the secondary cache 38, there are displays of "busy", "mis", "clean", "dirty", and "error". The busy display is performed when the reception command cannot be processed because of a lack of processing resources or at a timing when a contradiction on the protocol occurs. The "mis", "clean", and "dirty" displays correspond to the snoop result of the tag memory 40 of the secondary cache 38. Namely, as a result of the secondary cache 38 being snooped by the address of the snoop command, when a mishit in which the data in the address is not held in the secondary cache 38 is detected, the "mis" display is performed. As a result of the secondary cache 38 being snooped, in the case where the same data as the contents in the local storage 28 is held in the secondary cache 38 and in the case where the data in which the contents of the local storage 28 were changed is held in the secondary cache 38, the "clean" display is executed. Further, as a result of the secondary cache 38 being snooped, in the case where the newest data in which the contents of the local storage 28 were changed is held in the secondary cache 38, the "dirty" display is executed. Since there is a responsibility to respond by writing into the local storage 28, such a state is referred to as an owner who possesses the write privilege. As mentioned above, the cache coherence is held among the processor elements 14-1 to 14-4 by the snoop system using the snoop bus 22

The memory control module 25 side in FIG. 4 will now be described. The memory management unit 26 is provided for the memory control module 25. The local storage 28 is connected to the memory management unit 26 through memory buses 66. The directory memory 30 is also connected to the memory management unit 26 through an exclusive-use line. In local storage 28, memory access units 68-1 to 68-4 and SRAMs 70-1 to 70-4 as main storage elements are connected for every four memory buses 66. Each of the memory buses 66 has a width of 32 bits. By simultaneously accessing two memory buses, data of one word which coincides with the width of 64 bits of the subline in the cache line is accessed. The local storage 28 is divided into four groups by the four memory buses 66. For example, the access can be executed by an interleave system such that the access of one word is performed by two groups of the memory access units 68-1 and 68-2 and the access of one word is performed by the memory access units 68-3 and 68-4. The memory control module 25 enables the space identification unit 50 to map the memory space in the local storage 28 connected by the memory management unit 26 into a physical space that can be referenced from all of the processor modules 10-1 to 10-5.

Figure 6:
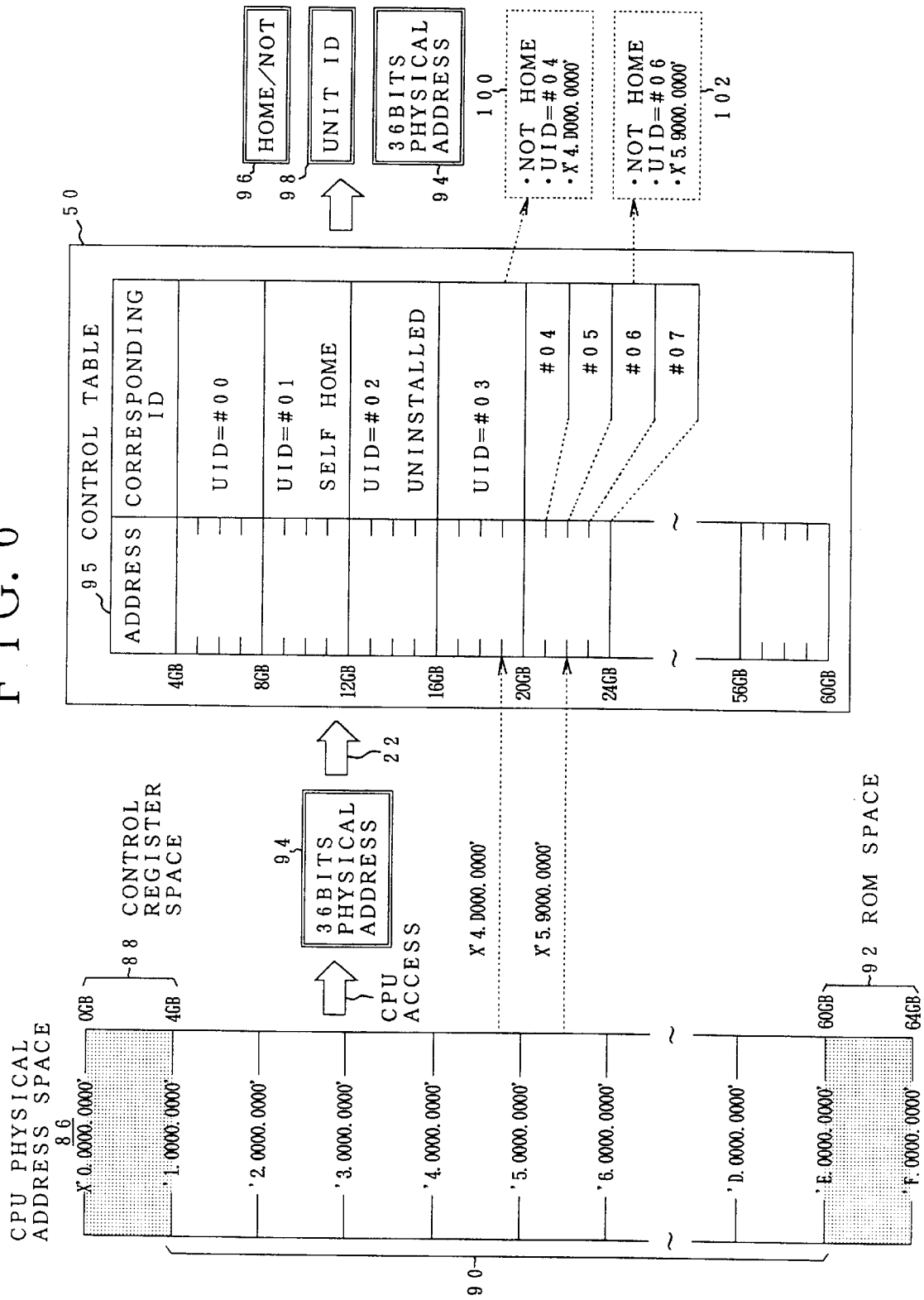
FIG. 6 is a functional explanatory diagram of a space identification unit in FIG. 3.

FIG. 6 shows a mapping function of the space identification unit 50 in FIG. 4.

First, a CPU physical address space 86 of the CPU 34 provided for the processor element 14-1 has an address space of, for example, 64 GB (gigabytes). Among them, the area of 0 to 4 GB at the head is allocated to a control register space 88 that is used by the CPU. The last area of 60 to 64 GB is allocated to a ROM space 92 of the CPU. The area of a width of 56 GB of the remaining 4 to 60 GB is set as shared space 90 which can be accessed by all of the CPUs 34 provided for processor modules 10-1 to 10-5. When a CPU access (read access or write access) in which an arbitrary 36-bit physical address 94 is designated by the CPU is generated, the 36-bit physical address 94 is transmitted to the space identification unit 50 of the memory control module 25 via the snoop bus 22 by a snoop command. The physical address 94 is transmitted to space identification unit 50 through the snoop bus 22 in the case where a cache line of physical address 94 as an access target doesn't exist on the caches of the processor elements 14-1 to 14-4 connected by the snoop bus 22 The space identification unit 50 holds a control table 95. Entries of addresses of 4 to 60 GB of the shared space 90 are provided in the control table 95. An ID area is provided in correspondence to the entry by the address. A unit ID is registered in the corresponding ID area as information indicative of the processor module to which the address in the shared space 90 is allocated. The unit ID physically shows a slot number at which the processor module can be connected to the system buses 12-1 and 12-2 in FIG. 2. In this example, the unit IDs #00 to #07 are registered in correspondence to the addresses of 4 to 24 GB. In addition to the unit ID, information indicative of the installation and uninstallation of the 30 processor module is also registered in the corresponding ID area. In the example, it will be understood that the processor module of the unit ID=#02 having the physical addresses of 12 to 16 GB is not installed. With respect to the four unit IDs=#00 to #03, although the address area of a width of 4 GB is allocated, addresses of a width of 1 GB are allocated to the four processor modules of the unit IDs #04 to #03. Further, its home information has also been stored in the corresponding ID area in the control table 95. Home information denotes that the 36-bit physical address 94 generated by the CPU access exists in the address space of the local storage built in the processor module itself. Home information 96, a unit ID 98, and the 36-bit physical address 94 are formed as formation information by the access to the space identification unit 50 by the 36-bit physical address 94 from the snoop bus 22 The home information 96 indicates whether the accessed physical address 94 corresponds to the home or not, namely, whether the physical address 94 exists in the processor module itself which caused the access or not. The unit ID 98 indicates the processor module in which the physical address 94 exists. A specific example will now be described as follows. It is now assumed that X'4. DOOO. 0000' as a hexadecimal notation display was generated as a 36-bit physical address 94 by the CPU access. In this case, the unit ID =#03 is formed from the corresponding ID area by the entry of the control table 95 of the space identification unit 50. As shown in a frame of a broken line on the right side, "not Home" indicating that the PM itself is not the home, the unit ID=#03, and X,4. DOOO. 00001' as a physical address 94 are formed as home information 96.

Referring again to FIG. 4, the memory control module 25 is accessed from the CPU 34 of the processor element 14-1 through the snoop bus 22 and is also accessed from the CPUs 34 provided for the other processor modules 10-2 to 10-5 through the system bus 12-1 (including 12-2). Although the cache coherence between the caches provided in the processor module 10-1 is maintained by using the snoop bus 22, the cache coherence is held among the processor modules 10-1 to 10-5 by a directory method using the system buses 12-1 and 12-2. To maintain cache coherence by the directory method, the entries have been stored in the directory memory 32 on a cache line unit basis of 256 bytes. The directory entry is selected by the 36-bit physical address generated by the CPU access and displays the state of the cache line. As state display contents of the cache line in the directory entry, there are displays of "dirty", "share", and "invalid". The term "dirty" denotes that a certain cache line on the secondary cache 38 has been rewritten and has become the newest data and only old data exists on the local storage 28 as a copying source of the cache line and the rewritten processor element possesses the newest data. The term "share" denotes that the data of the cache line was referenced by the processor module and indicates a possibility that the same data as the data on the local storage 28 simultaneously exists in the secondary cache 38. Further, The term "invalid" indicates a state in which the cache line is not referenced from any one of the processor modules and is not rewritten. Further, when a certain cache line is "dirty", the identification (ID) information of the processor module having the rewritten newest data is held in the memory management unit 26. Also in the case where the cache line is share, the ID information of the processor module having the copy of the data of the local storage 28 is held in the memory management unit 26.

Figure 7:
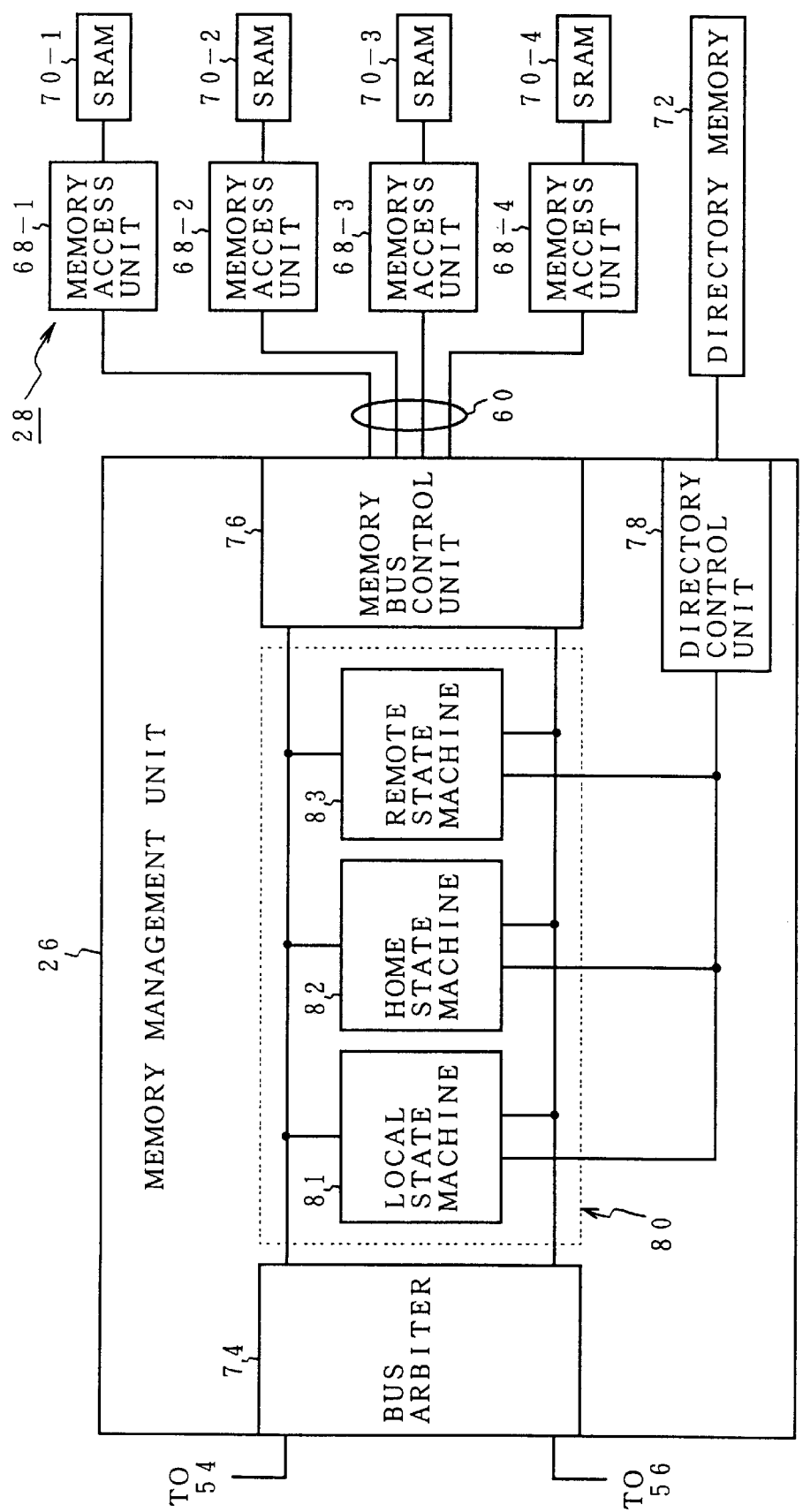
FIG. 7 is a block diagram of a memory management unit in FIG. 4.

FIG. 7 shows the details of the memory management unit 26 provided for the memory control module 25 in FIG. 4. A bus arbiter 74, a memory bus control unit 76 to which the local storage 28 is connected through the memory buses 66, and a directory control unit 78 to which the directory memory 30 is connected by an exclusive-use line are provided for the memory management unit 26. To hold the cache coherence among the processor modules in accordance with the directory method, the cache conversion unit 80 is provided for the memory management unit 26. The cache conversion unit 80 has a local state machine 81, a home state machine 82, and a remote state machine 83. In the cache coherence among the processor modules using the directory method of the present invention, the processor module which activated the access is called a local and the processor module in which the accessed address is possessed in the local storage is called a home. The processor module in which the address of the accessed local storage is in a "dirty" state, namely, only the old data exists in the address of the local storage, and to which the processor element in which the newest data is possessed in the caches of the other processor modules belongs is called a remote. The local state, home state, and remote state of the processor module are maintained by processing operations of the local state machine 81, home state machine 82, and remote state machine 83 provided for the cache conversion unit 80, respectively. In correspondence to the three state machines 81, 82, and 83, buffer queues to hold commands and data as processing targets of the respective state machines are provided for the memory control module 25 in FIG. 4 via the bus arbiter 74. Namely, a local access buffer queue 54 is provided in correspondence to the local state machine 81. Home information Home as a formation information in FIG. 6 formed by the space identification unit 50, the unit ID, and the 36-bit physical address are stored into the local access buffer queue 54. Further, a response interruption INT is given to the local access buffer queue 54 from the snoop transmission and reception unit 52. When the local access buffer queue 54 is full, information is a variable called full indicative of the full state is returned to the snoop transmission and reception unit 52. In correspondence to the home state machine 82, a home access buffer queue 56 is provided for the memory control module 25. An access command from the processor module as a local which was generated by using the system buses 12-1 and 12-2, namely, what is called a home command is stored in the home access buffer queue 56. In correspondence to the remote state machine 83, a remote access buffer queue 58 is provided. An access command generated from the processor module as a home by using the system buses 12-1 and 12-2, namely, what is called a remote command is stored in the remote access buffer queue 58. With respect to the local command which is stored into the local access buffer queue 54 and the home command which is stored in the home access buffer queue 56, the access of the local storage 28 is associated with each of the local state machine 81 and home state machine 82 provided for the memory management unit 26. However, since the remote command of the remote access buffer queue 58 relates to the access for the cache line on the secondary cache 38 of the processor element 14-1 as a target, it is directly connected to the snoop bus 22 by the snoop bus transmission unit 60.

Figure 8:
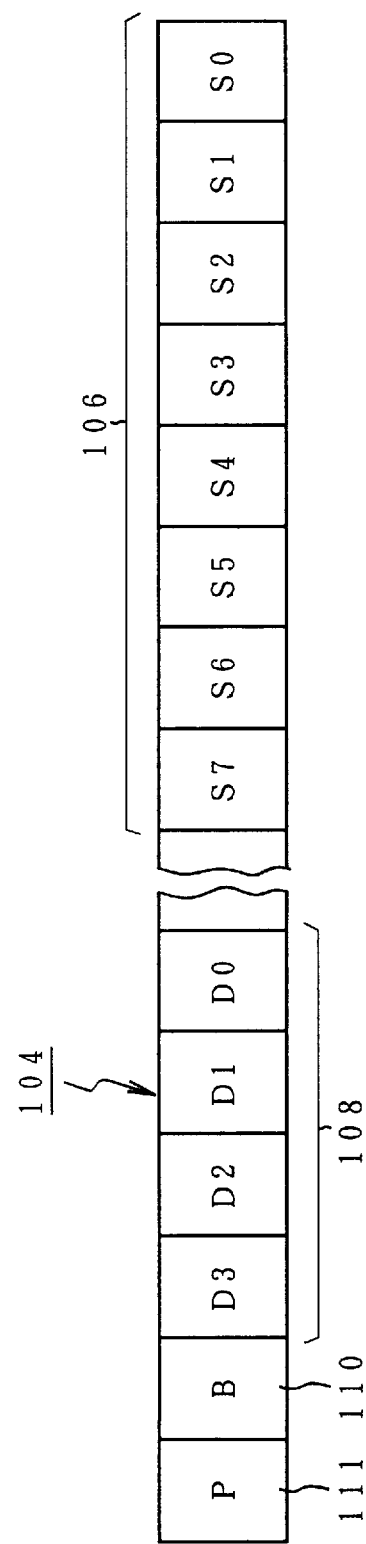
FIG. 8 is an explanatory diagram of a directory entry register of the present invention.

The contents of the directory control unit 78 provided for the memory management unit 26 in FIG. 7 and the directory memory 30 connected by the exclusive-use line will now be described. FIG. 8 shows a directory entry register 104 provided for the directory control unit 78 provided for the memory management unit 26. The contents of the directory entry register 104 show the read result of the directory entry for every cache line stored in the directory memory 30. Therefore, the contents of the directory entry register 104 are nothing but the read result, namely, the directory entry data itself stored in the directory memory 30. The directory entry register 104 allocates a shared map bit area 106 to lower eight bits. The shared map bit area 106 relates to bits indicating that the data exists on the secondary cache of which processor module by referring to the data corresponding to the cache line of the local storage 28 as a distributed main storage in the processor module. Reference numeral 110 denotes a busy bit and 111 indicates a parity bit.

Figure 9:
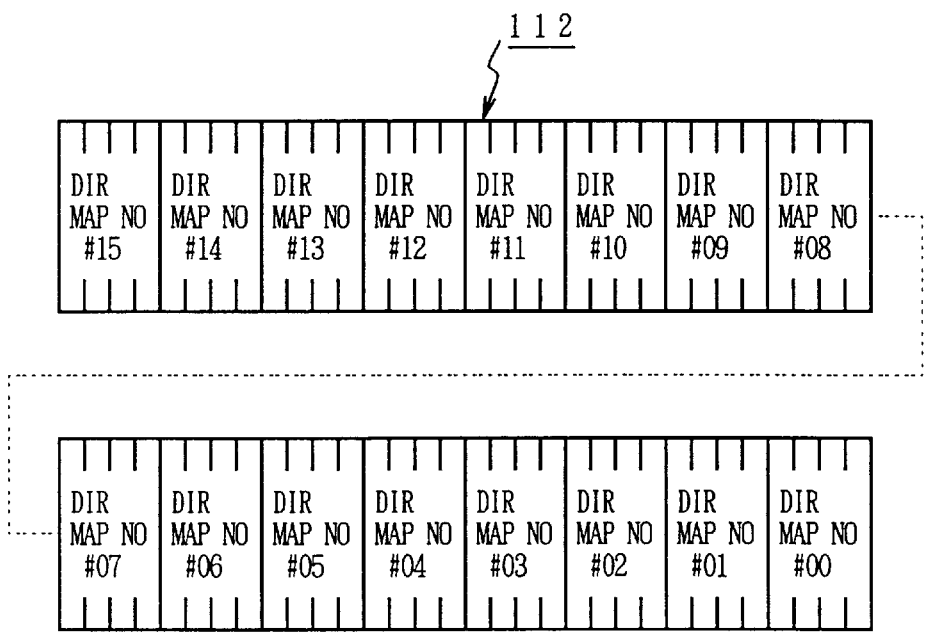
FIG. 9 is an explanatory diagram of a shared map 37 bit correspondence register.
Figure 10:
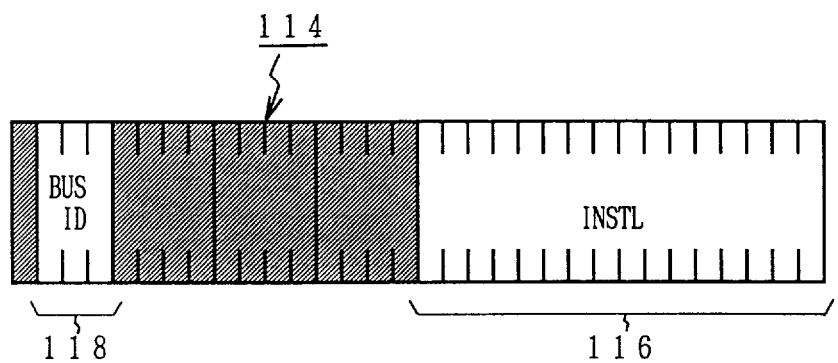
FIG. 10 is an explanatory diagram of a processor module construction register of the present invention.

A shared map bit correspondence register 112 in FIG. 9 is combined to the shared map bit area 106. Further, a processor module construction register 114 in FIG. 10 is combined to the shared map bit correspondence register 112 in FIG. 9. The shared map bit area 106 of the directory entry register 104 has bits S0 to S7. By setting the bits S0 to S7 to 1, it indicates that the data of the cache line exists as a share state on the processor module shown by the shared map bit correspondence register 112. The shared map bit correspondence register 112 in FIG. 9 has map bit correspondence areas corresponding to the unit IDs=#00 to #15 of, for example, sixteen processor modules. On the other hand, the shared map bit area 106 in FIG. 8 has eight bits of S0 to S7, whose number is only the half of the number of 16 bits. Therefore, by overlappingly storing the shared map bits in the shared map bit area 106 into the shared map bit correspondence register 112, the shared map bits can be expressed with respect to a plurality of processor modules, thereby realizing a reduction of the number of bits of the directory entry register 104. Further, the shared map bits S0 to S7 to be stored in the shared map bit area 106 are held for every cache subline of 64 bytes which are obtained by dividing the cache line of 256 bytes into four sublines on the secondary cache. On the other hand, since the shared map bit is only one bit, the share states of the four cache sublines are expressed by the OR. According to the expression of the shared map bits by the OR of the four sublines, since the cache coherence of the secondary cache is realized by the snoop method, the processor element in which the cache line in the share state exists can be accessed without being aware of it. The OR expression of a plurality of sublines can be performed.

Processor module installation bit area 116 and a bus ID bit area 118 are provided for the processor module construction register 114 in FIG. 10 provided in correspondence to the shared map bit correspondence register 112 in FIG. 9. Bus IDs divided into the system buses 12-1 and 12-2 are stored in the bus ID bit area 118. Each of the system buses 12-1 and 12-2 has sixteen slots. Therefore, up to sixteen processor modules can be installed. The processor module installation bit area 116 has bit areas corresponding to the same slot numbers #00 to #15 as those of the unit IDs in a one-to-one corresponding relation. Bit 1 is set in the installation state and is reset to bit 0 in the uninstallation state.

Figure 11:
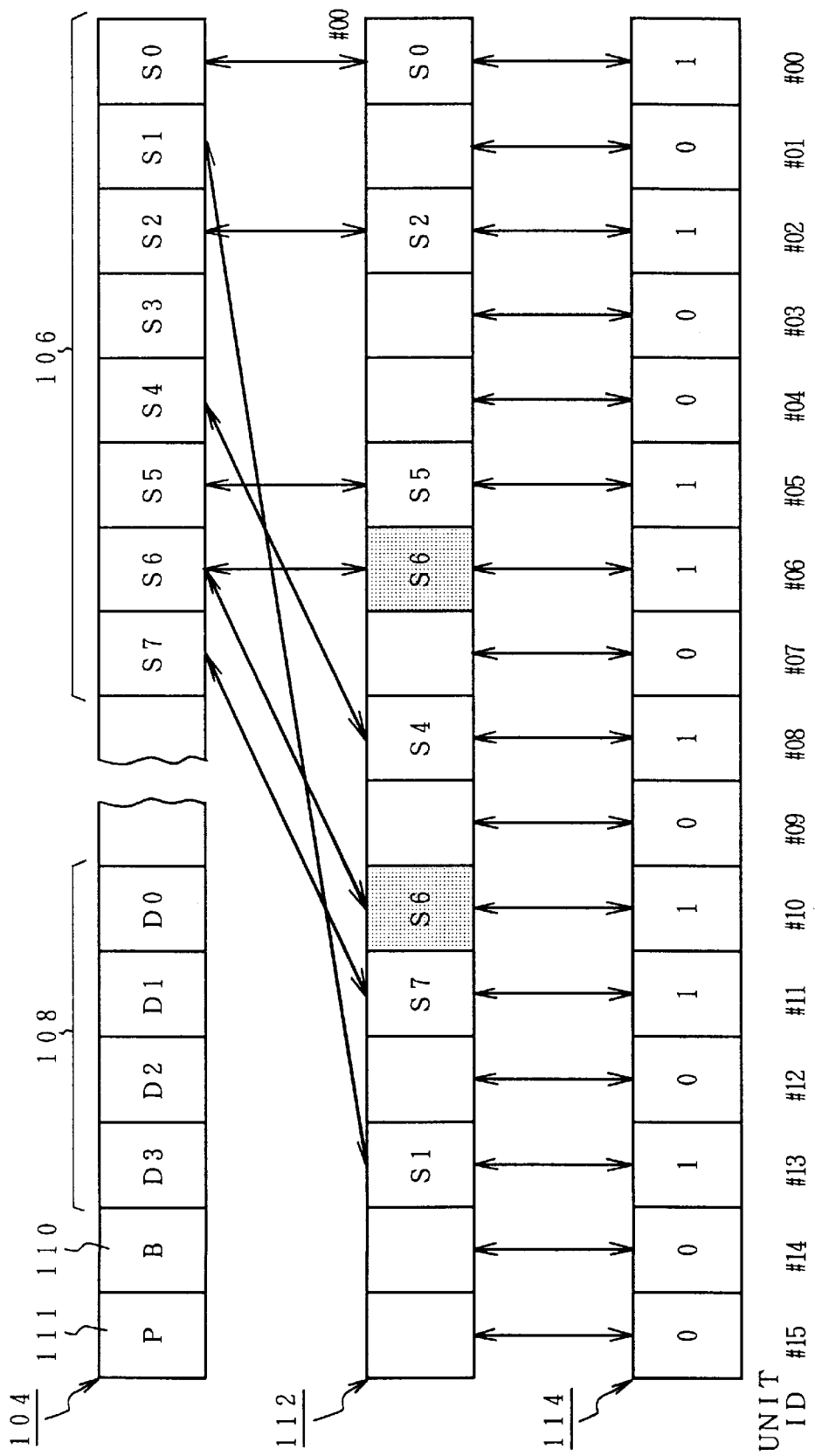
FIG. 11 is an explanatory diagram of the directory entry register, shared map bit correspondence register, and processor module construction register of the present invention.

FIG. 11 shows the specific correspondence relations among the directory entry register 104, shared map bit correspondence register 112, and processor module construction register 114. First, in the processor module construction register 114, only the processor module installation bit area 116 is shown and the processor module in which the unit ID set to bit 1 is installed is shown. In the example, the processor modules are installed in the units of the unit IDs=#00, #02, #05, #06, #08, #10, #11, and #13 and the processor modules are not installed in the other units. The bits of the processor module construction register 114 correspond to the bits of the shared map bit correspondence register 112 in a one-to-one relation. when the cache line of the local storage serving as a main storage of a certain processor module is referred by the CPU access of a certain processor module and a share state in which the copy exists on the cache occurs, empty bits in the shared map bit area 106 of the directory entry data of the cache line are set to 1. At the same time, index information indicative of bit 1 of the register area and shared map bit area 106 of the processor module in which the copy data of the shared map bit correspondence register 112 exists as a share state is stored. For example, the shared map bit S6 is stored in the areas corresponding to the unit IDs=#06 and #10 of the shared map bit correspondence register 112, respectively. Thus, the shared map bit S6 is referred by the two processor modules of the unit IDS=#06 and #10 and indicates the share state on the caches, respectively.

Referring again to FIG. 8, after the shared map bit area 106 of the directory entry register 104, a "dirty" subline bit area 108 is provided. In correspondence to the four sublines obtained by dividing the cache line of 256 bytes, bits D0 to D3 are allocated to the "dirty" subline bit area 108. By setting the "dirty" subline bits D0 to D3 to bit 1, it is shown that the rewritten newest data exists on the cache of any one of the processor modules in the system for the old data of the local storage 28 as a distributed main storage. In the case where the "dirty" subline bit area 108 is reset to bit 0, this means a "non-dirty" state. In the "non-dirty" state, it means that the newest data exists in the local storage 28 as a distributed main storage and the copy data exists as a share state on the cache of any one of the processor modules that is designated by the shared map bits S0 to S7. The identification information of the processor modules regarding the data subline bits D0 to D3 is stored in a specific area on the local storage 28 as a main storage, for example, in the control register space 88 in the CPU physical address space 86 in FIG. 6.

FIG. 12 shows the specific contents of the directory entry register 104. First, the shared map bit area is divided into shared map bit areas 106-1 and 106-2 in correspondence to the system buses 12-1 and 12-2. In the case where the processor modules are installed with respect to only the system bus 12-1 side and the processor modules are not installed with regard to the system bus 12-2 side, the shared map bit area 106-1 side is used for the installed processor modules. In the shared map bit area 106-1, bit 1 is set in the shared map bits S3 and S4. In this case, by the correspondence by the shared map bit correspondence register 112 in FIG. 9, for example, the shared map bit S3 denotes the OR of the share information of all of the sublines of the data of the cache line of the processor module of the unit ID=#03. By the designation of the correspondence relation by the shared map bit correspondence register 112 in FIG. 9, the shared map bit 54 similarly denotes the OR of the share states of all of the sublines on the cache of the processor element on the processor module of the unit ID=#04. On the other hand, with regard to the "dirty" subline bit area 108, for example, the "dirty" subline bits DI and D4 are set to bit 1 and the bits D2 and D3 are reset to bit 0. In correspondence to the "dirty" subline bits D1 to D4, processor module information storage areas 120, 122, 124, and 126 are provided for the local storage 28. For example, it is shown that in the processor module information storage area 120 of the "dirty" subline bit D1, the newest data exists as a "dirty" state on the cache existing in the processor module of the unit ID=#01. Similarly, with respect to the "dirty" subline bit D4 which was set to bit 1, in the processor module information storage area 126, it is shown that the newest data exists as a "dirty" state on the cache existing in the processor module of the unit ID=#02. With respect to the processor module information storage areas 122 and 124 of the "dirty" subline bits D2 and D3 which were reset to bit 0, it is shown that the newest data exists in the local storage as a distributed main storage in which the physical address of the cache line exists and that the copy data by the reference of the newest data of the main storage exists as a share state on the cache of any one of the processor modules. With respect to the unit ID of the processor module in which the copy data exists as a share state, information indicative of a possibility such that the copy data exists as a share state on the processor modules of, for example, the unit IDs=#03 and #04 which is obtained by reference to the shared map bit correspondence register 112 in FIG. 9 for the shared map bits S3 and S4 which were set to bit 1 in the shared map bit area 106-1 is stored. As for the contents of the processor module information storage areas 122 and 124 of the "dirty" subline bits D2 and D3 which were set to bit 0, there is also a case where on-shared other than shared is stored. In this case, it is shown that the newest data exists in only the local storage as a corresponding main storage.

A packet of the snoop bus 22 will now be described. The packet is classified into an activation command and a response command. The activation command and the response command are fundamentally constructed as a pair. The packet comprises a command phase and a data phase. The command phase has a length of one clock. The data phase can have a length within a range from 0 to 8 clocks in accordance with a command and a size. The command phase of the activation command is constructed by: a destination field indicative of a destination of the packet; a flag field including an auxiliary instruction with respect to a packet process; a size field indicative of a data size as a processing target; a type field indicative of the type of command; and an address field indicative of an address as a processing target of the command. The activation command and the response command are distinguished by the type field. on the other hand, the response command is also constructed by a command phase and a data phase. The command phase can have a length of one clock. The data phase can have a length within a range from 0 to 8 clocks depending on the command and size. The command phase of the response command is constructed by: a destination field indicative of a destination of the packet; a reply code field indicative of a permission or inhibition of the access, and error factors and a retry instruction; a reply field indicative of the type of reply; a command field (kind information indicative of the reply is stored) indicative of the kind of command; and an address field indicative of an address of a processing target of the command. With respect to the system buses 12-1 and 12-2 for connecting a plurality of processor modules, the packet is fundamentally the same as that of the snoop bus 22 but the bus clock differs. Namely, since the snoop bus is short because a line length of the bus lies within a module casing and electric characteristics are good, for example, a clock frequency can be set to 60 MHz. On the other hand, in case of the system buses 12-1 and 12-2, since a line length is long because they are connected among a plurality of processor modules through a back panel and a clock frequency is limited to, for example, 40 MHz from the limitation of the electric characteristics. The timings due to a difference between the clock frequencies of the snoop bus 22 and the system buses 12-1 and 12-2 are adjusted by a protocol converting function of the protocol management unit 24 shown in the memory control module 25 in FIG. 3. FIG. 13 separately shows the kinds of commands which are used by the snoop bus 22 with regard to the processor 16, snoop unit 20, and memory management unit 26.

A transition of the cache state on the secondary cache control module 35 side provided for the processor element 14-1 in FIG. 4 will now be described. First, the cache states are held in the tag memory 40 of the secondary cache control module 35 on a cache subline unit basis. There are five kinds of cache states such as "invalid", "shared & clean", "shared & modified", "exclusive & dirty", and "shared & dirty" as shown in FIG. 14. The "invalid" state is a non-cache state in which no data exists on the secondary cache 38. The "shared & clean" state indicates the data of the same contents as those of the local storage as a distributed main storage of the processor module serving as a home is held. The "shared & modified" state indicates although the data on the main storage serving as a home is not the newest data, it is the old data and its copy data exists in the secondary cache itself and, further, the newest data that is unique in the system exists on another secondary cache its processor module by "exclusive & dirty". The "exclusive & dirty" state indicates the newest data that is unique in the system is reserved. In this case, the cache control module is what is called an owner who possesses the write privilege. Further, "shared & dirty" is a state in which no newest data exists on the main storage serving as a home, the newest data is reserved in the secondary cache group in its processor module, further, "shared & modified" having the copy of the data in the main storage as a home exists in the secondary cache group in the processor module, and the cache control module which reserves the newest data possesses the write privilege and becomes an owner.

Figure 15:
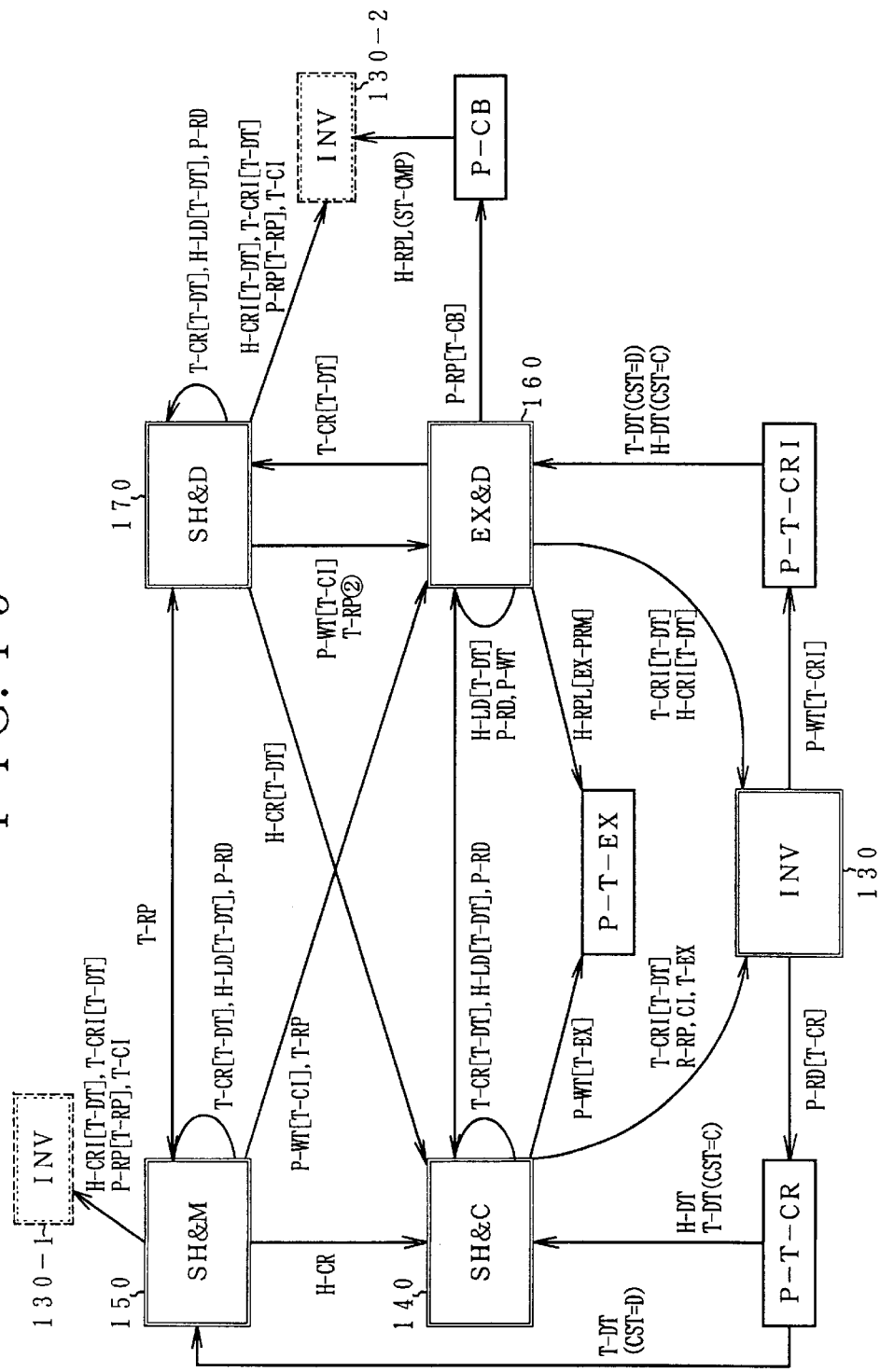
FIG. 15 is an explanatory diagram of a cache transition state of the cache unit in FIG. 4.

FIG. 15 shows a transition of the cache state in the secondary cache control module 35 in FIG. 4. First, the initial state is the invalidation of block 130. In this state, when a mishit occurs in the primary cache 36 by the read access of the processor, an access request is generated to the secondary cache control module 35. In this instance, when the relevant cache subline of the secondary cache 38 is "invalid", a command to request the data is transmitted to the snoop bus 22 In this case, as transition states, there are two cases such as case 1 of shifting to "shared & modified" of a block 150 and case 2 of shifting to "shared & clean" of a block 140. In the case 1, "shared & modified" of the block 150 relates to the case where the other processor elements are in the "exclusive & dirty" state or "shared & dirty" state and the subline as an accessing target is possessed on the cache. The "dirty" is displayed by a cache state signal of any one of the processor elements. Therefore, the cache control module 35 of the processor element in which "dirty" is displayed accesses the secondary cache 38 and generates a data response to the snoop bus 22 In this instance, in the processor element which made a response, when the cache state is "exclusive & dirty" of a block 160, the state is shifted to "shared & dirty" of a block 170. The processor element which received the response shifts the cache state to "shared & modified, of the block 150. In the case 2, in response to the access request for the mishit in the primary cache of the read access of the processor, the other processor elements are "shared & clean" of the block 140 or "invalid" of the block 130, so that "clean" or "mis" is displayed as a cache state signal and a memory state signal on the memory control module 25 side. The cache control module 35 which displayed "clean" refers to the cache state signal and judges whether a response should be formed or not. Similarly, the memory control module 25 which referred to the memory state signal, namely, the memory management unit 26 provided for the memory control module 25 also refers to the memory state signal and judges whether a response should be formed. When the module which detected that the response should be made is the secondary cache control module 35, it accesses to the secondary cache memory 38 and generates the transmission of the data to the snoop bus 22 When the module which detected that the response should be made is the memory management unit 26 of the memory control module 25, it activates the access to the local storage 28 serving as a main storage and generates response data to the snoop bus 22 The secondary cache control module 35 of the accessing source which received the response data from the snoop bus 22 is shifted from "invalid" of the block 130 to "shared & clean" of the block 140.

Cache Coherence of Read Access

Processes of the cache coherence in the case where a read access occurs in the CPU of any one of the processor modules 10-1 to 10-5 in FIG. 2 will be separately described with respect to the reading modes 1 to 3.

Reading Mode 1

Figure 16:
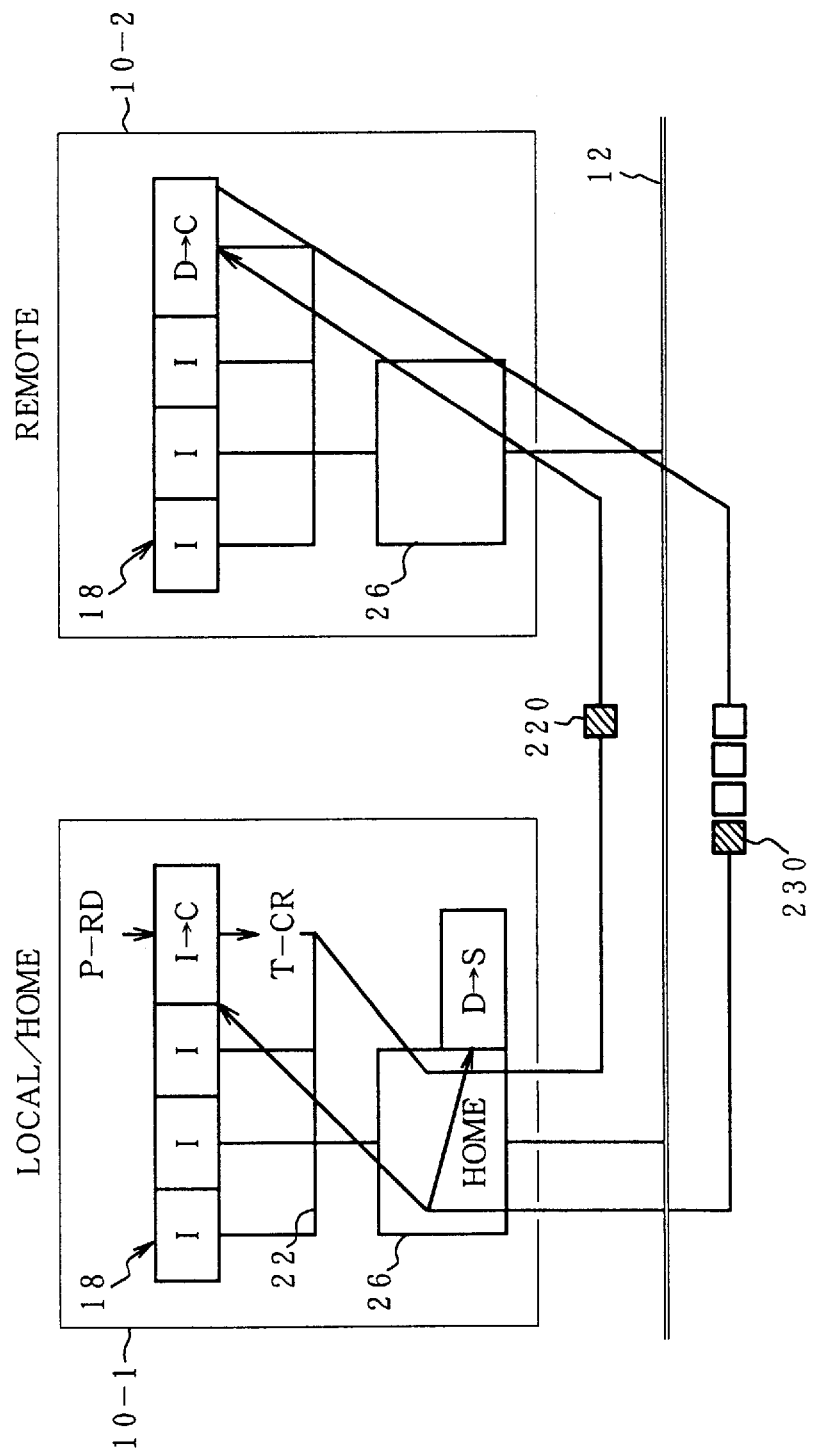
FIG. 16 is an explanatory diagram of the processing operation in a reading mode 1 of the present invention.

FIG. 16 shows a protocol of the cache coherence in the reading mode 1. The reading mode 1 relates to the case where for a read access P-RD of an arbitrary CPU in the processor module 10-1, a mishit occurs in the cache unit in a cache unit group 18 and a mishit occurs in all of the other cache units 18 connected by the snoop bus 22 In this case, since the local storage 28 as a distributed main storage is accessed to the memory management unit 26, a remote command T-CR is generated. Since the read address exists in the local storage 28 of the processor module 10-1, it is assumed that the processor module 10-1 becomes a home and, further, the data of the local storage 28 exists as a "dirty" state in which the newest data is possessed in any one of the group of cache units in the processor module 10-2 serving as a remote. In such a case, the memory management unit 26 of the processor module 10-1 which generated the read access generates a remote command 220 to a system bus 12 and accesses to the processor module 10-2. The memory management unit 26 of the processor module 10-2 which received the remote command 220 obtains the newest data from the cache unit in the "dirty" state D through the snoop bus 22 After that, the memory management unit 26 transmits the newest data as reply data 230 by using the system bus 12 to the processor module 10-1 which is local and a home. The processor module 10-1 stores the reply data 230 derived as a response of the system bus 12 into the cache unit of the accessing source through the snoop bus 22, thereby responding as read data for the read access of the CPU. At the same time, by writing the newest data into the local storage 28 as a main storage, the cache coherence is maintained. The cache unit of the processor module 10-2 which responded by receiving the remote command 220 updates "dirty" to "clean". With respect to the directory memory which manages the cache data of the local storage 28 of the processor module 10-1, "dirty D" of the cache line as an accessing target is updated to "share S". Further, with regard to the cache unit of the accessing source, "invalid I" is updated to "clean C".

Reading Mode 2

Figure 17:
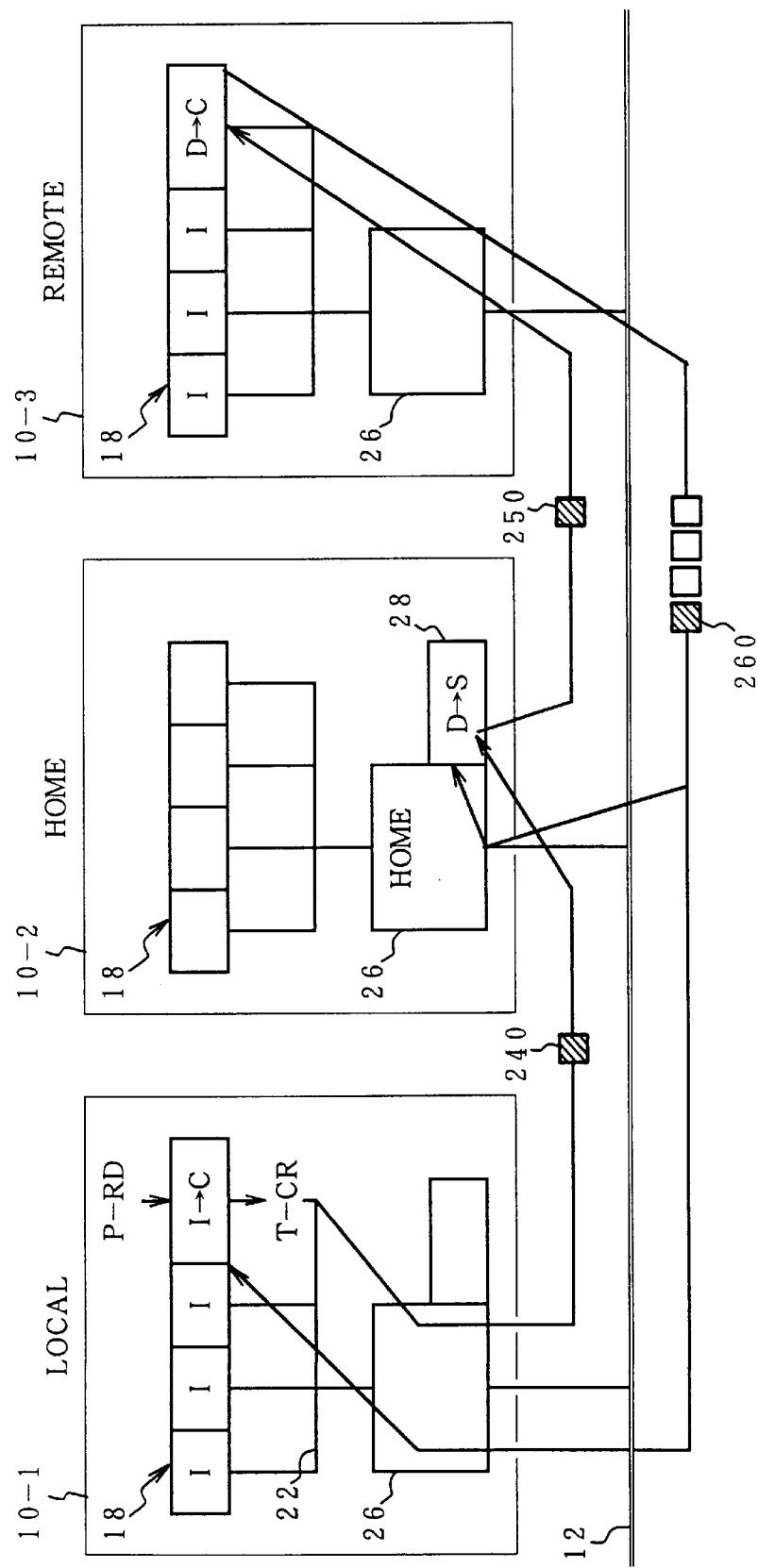
FIG. 17 is an explanatory diagram of the processing operation in a reading mode 2 of the present invention.

FIG. 17 shows a protocol for the cache coherence in the reading mode 2. The reading mode 2 relates to the case where for the read access P-RD of an arbitrary CPU, a mishit occurs in its cache unit, a mishit occurs in all of the other cache units connected by the snoop bus 22, and further, the read address exists in the local storage 28 of the other processor module 10-2, and the data in the read address of the local storage 28 exists in "dirty D" state in which the newest data is possessed on any one of the cache units of the other processor module 10-3. In this case, the memory management unit 26 of the processor module 10-2 in which the read access occurred operates as a local, generates a home command 240 to the system bus 12, and accesses to the processor module 10-2. On the basis of the home command 240 received from the system bus 12, the processor module 10-2 recognizes that the newest data exists as "dirty D" on the cache of the processor module 10-3 by referring to the directory memory by the read address, generates a remote command 250 to the system bus 12, and accesses to the processor module 10-3. On the basis of the remote command 250 received from the system bus 12, the memory management unit 26 operates as a remote and the processor module 10-3 accesses to the cache unit in "dirty D" by the snoop bus 22, thereby obtaining the newest data. After that, the processor module 10-3 responds reply data 260 to each of the processor module 10-2 as a home and the processor module 10-1 as a local by using the system bus 12. The processor module 10-2 as a home writes the corresponding data of the local storage 28 by the reply data 260 derived by the response of the system bus 12 and updates to the newest data. Simultaneously, the processor module 10-1 as a local transfers the reply data 260 received by the response from the system bus 12 to the cache unit of the accessing source through the snoop bus 22 and stores onto the secondary cache, thereby responding as read data for the read access of the CPU. The cache unit which transmitted the newest data by the processor module 10-3 as a remote, updates the cache state from "dirty D" to "clean C". The processor module 10-2 as a home updates the state of the cache line as an accessing target from "dirty D" to "share S". Specifically, the corresponding subline bits in the "dirty" subline bit area 108 of the directory entry register 104 in FIG. 8 are reset from 1 to 0. Since the processor module 10-3 as a remote and the processor module 10-1 as a local have share, in which the same data as the data of the local storage 28 as a home exists, the corresponding shared map bits in the shared map bit area 106 are set to 1. Further, in the cache unit in which the access of the processor module 10-1 as a local occurred, the "invalid" state I is shifted to the "clean" state C.

Reading Mode 3

Figure 18A:
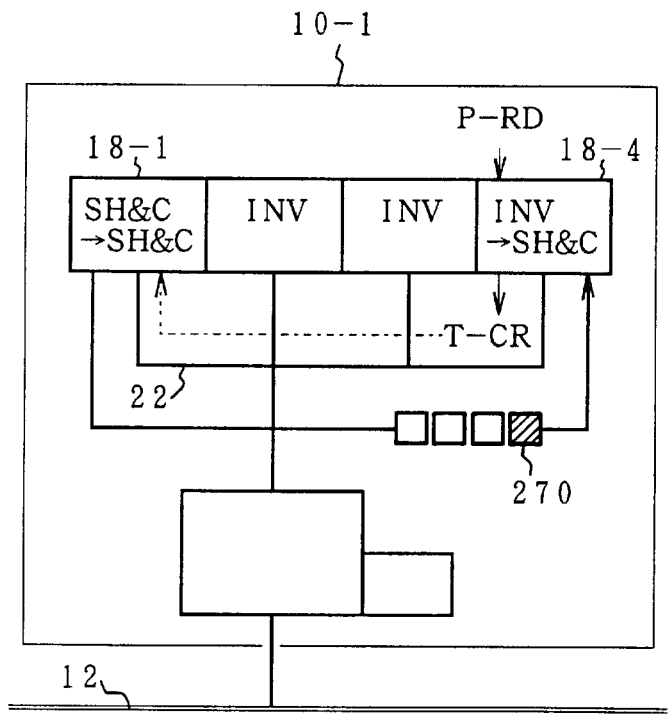
FIGS. 18A and 18B are explanatory diagrams of the processing operation in a reading mode 3 of the present invention.
Figure 18B:
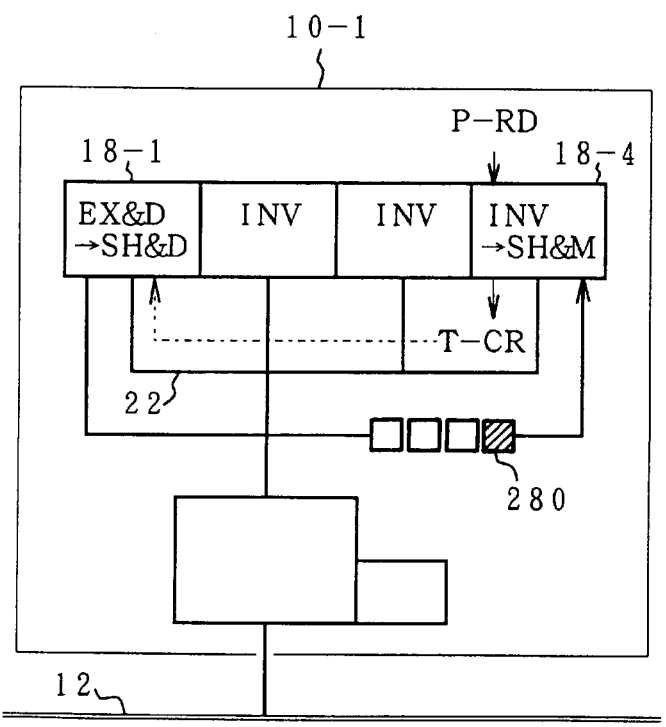

FIGS. 18A and 18B show a protocol of the cache coherence in the reading mode 3. In the reading mode 3, the cache coherence using the snoop bus 22 among the cache units in the module in which the access occurred is executed. In the reading mode, there are two cases of FIGS. 18A and 18B.

FIG. 18A shows the case where although the cache unit 18-4 in which the read access P-RD of the CPU occurred is invalid, and a mishit occurred, the newest data exists as shared & clean, in the other cache unit 18-1 connected by the snoop bus 22 In this case, the cache unit 18-4 generates the command T-CR by using the snoop bus 22, reply data 270 including the relevant subline is received from the cache unit 18-1, and the reply data 270 is stored onto the cache unit 18-4 and transmitted as read data for the read access. In this instance, in the cache unit 18-4 of the accessing & clean SH&C". In the cache unit 18-1 of the accessing destination, the "shared & clean" state is maintained.

FIG. 18B relates to the case where for the read access P-RD from the CPU to the cache unit 18-4 in the "invalid" state, the newest data exists as "exclusive & dirty" in the cache unit 18-1 connected by the snoop bus 22, namely, the case where the newest data exists in a state in which the write privilege is possessed. For the access T-CR from the cache unit 18-4 in this case, the reply data 280 including the subline of the newest data is similarly responded from the cache unit 18-1. In this case, the cache unit 18-4 of the accessing source is shifted from "invalid" to "shared & modified", namely, indicates that the newest data exists as "shared & dirty" in the other cache unit in the processor module. In the cache unit 18-1 of the accessing destination, it is shifted from "exclusive & dirty" to "shared & dirty".

Reading Process of Local

Figure 19:
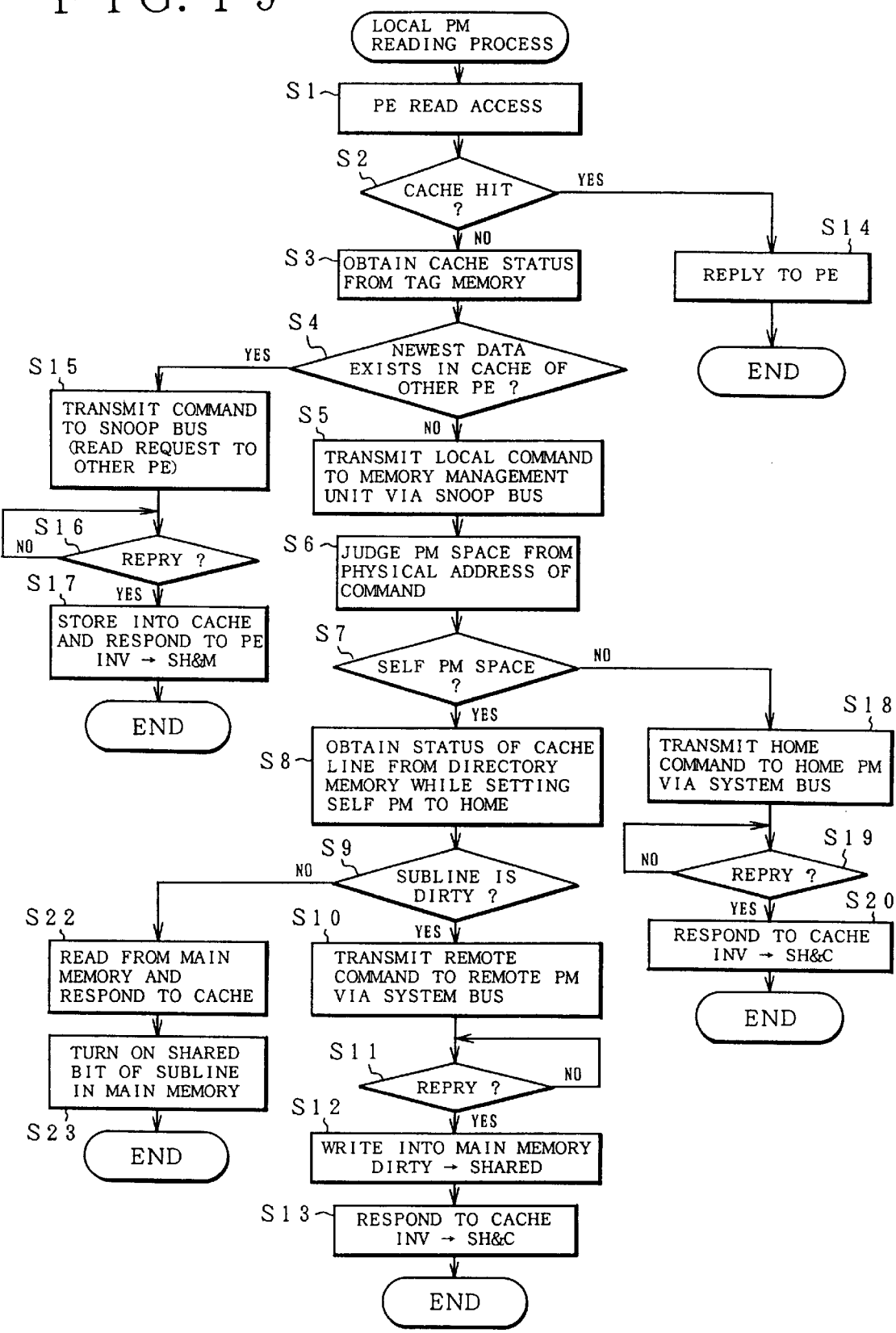
FIG. 19 is a flowchart for a reading process of a local processor module of the present invention.

A flowchart of FIG. 19 shows the reading processes of the processor module serving as a local in the reading modes 1 and 2 in FIGS. 16 and 17. First in step S1, the read access of the processor element is received. In step S2, the presence or absence of the cache hit is judged. When there is a cache hit, in step S14, the data is transmitted to the processor element and the processing routine is finished. In case of a mishit, a cache status is obtained from the tag memory 40 in step S3. A check is made in step S4 to see if the newest data exists on the cache of another processor element. If the newest data exists on the cache of another processor element, step S15 follows and a command is transmitted to the snoop bus 22. In step S16, the reply data is received. In step S13, the reply data is stored into the cache and is responded to the processor element. Steps S15 to S17 relate to the processes in the reading mode 3 in FIG. 18. On the other hand, when the newest data doesn't exist on the cache of the other processor element in step S4, a local command is transmitted to the memory management unit 26 through the snoop bus 22 in step S5. On the memory management unit 26 side, in step S6, a processor module space is determined from a physical address of the command by the space identification unit 50 in FIG. 4. In step S7, when the read address exists in the main storage space of the local storage 28 of the processor module, the self processor module is set to a home and the cache status is obtained from the directory entry in the directory memory 30 in step S8. With respect to the cache status, a check is made in step S9 to see if the subline is "dirty". If it is dirty, a remote command is transmitted to the remote processor module through the system bus in step S10. When there is a response in step S11 for the remote command, the reply data is written into the local storage 28 as a distributed main storage in step S12 and the state is updated from "dirty" to "shared". In step S13, a response is made to the cache unit of the accessing source and the processing routine is finished. When the subline is not "dirty" in step S9, the data is read out from the local storage 28 as a main storage and is transmitted to the cache unit of the accessing source in step S22 In step S23, the shared bit of the subline of the local storage 28 as a main storage is turned on. In step S7, when the accessed physical address exists in the other processor module space, a home command is transmitted to the processor module serving as a home through the system bus in step S18. In response to the transmission of the home command, since there is a reply of the newest data through the system bus, when the reply is determined in step S19, a response is made to the cache every access in step S20 and the processing routine is finished.

Reading Process of Home

Figure 20:
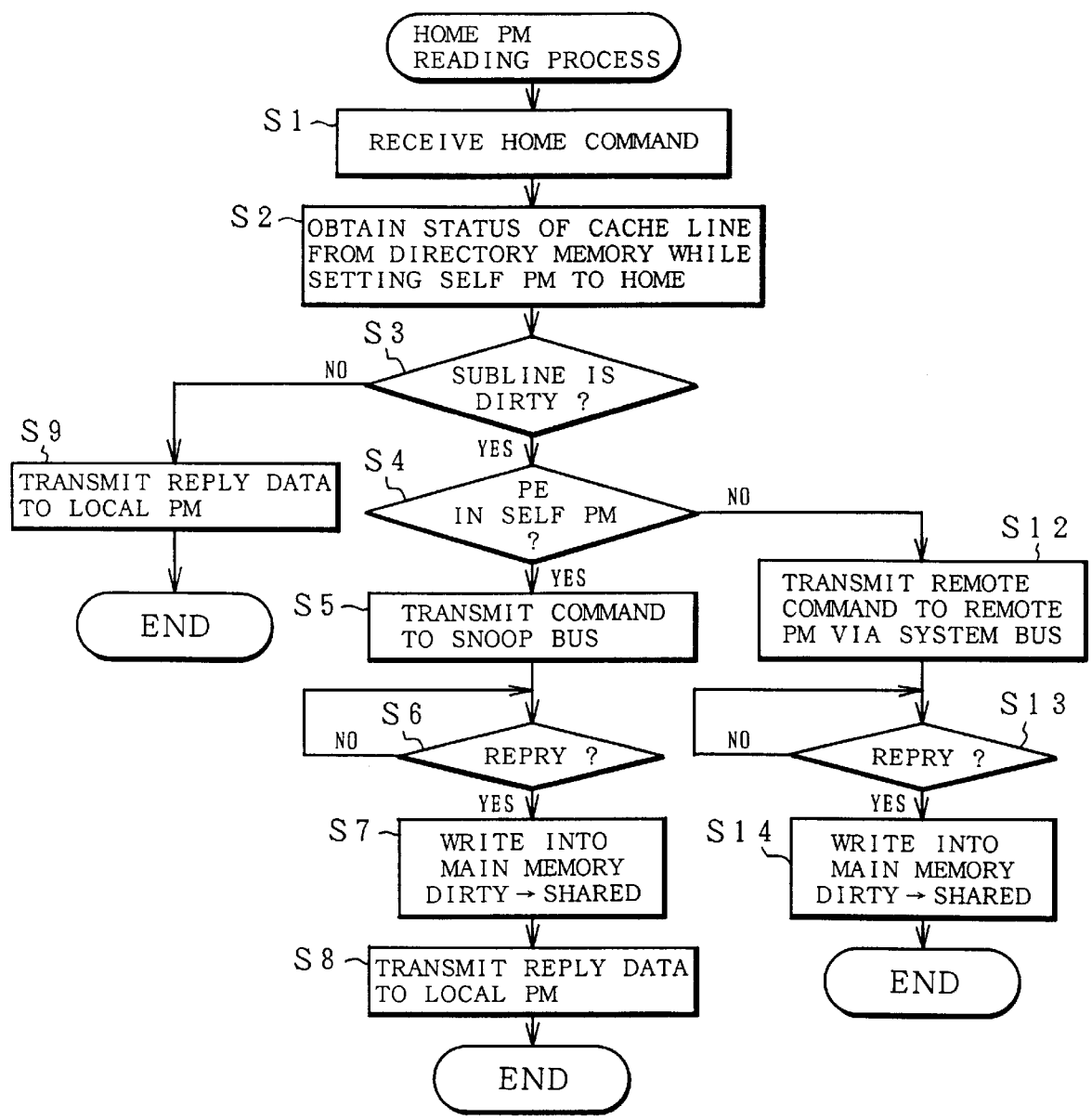
FIG. 20 is a flowchart for a reading process of a home processor module of the present invention.

A flowchart of FIG. 20 relates to the reading processes of the processor module serving as a home in the reading modes 1 and 2 in FIGS. 16 and 17. First in step S1, the home command is received. As a home command, there are a case where it is received via the system bus and a case where when the processor module itself is local and is a home, the home command formed by itself is received. When the home command is received, the processor module itself is set to a home and the status of the cache line is obtained from the directory memory 30 in step S2. A check is made in step S3 to see if the subline is "dirty". When the subline is "dirty", a check is made in step S4 to see if the newest data exists in the cache of the processor element in the its processor module. If this is the case, a command is transmitted to the snoop bus 22 in step S5. The processor module waits for the reply in step S6. In step S7, the reply data is written into the local storage 28 as a distributed main storage and "dirty" of the directory entry is updated to "shared". Subsequently in step S8, the reply data is transmitted to the local processor module by using the system bus. In step S4, when the newest data of a "dirty" state exists on the cache of the processor element in the other processor module, a remote command is transmitted to the remote processor module through the system bus in step S12. The processor module waits for the reply in step S13. In step S14, the newest data is written into the local storage 28 and the "dirty" state of the directory entry is updated to the "shared" state. When the subline is not "dirty" in step S3, the newest data is read out from the local storage 28 and the reply data is transmitted to the local processor module through the system bus. The processing routine is finished.

Reading Process of Remote

Figure 21:
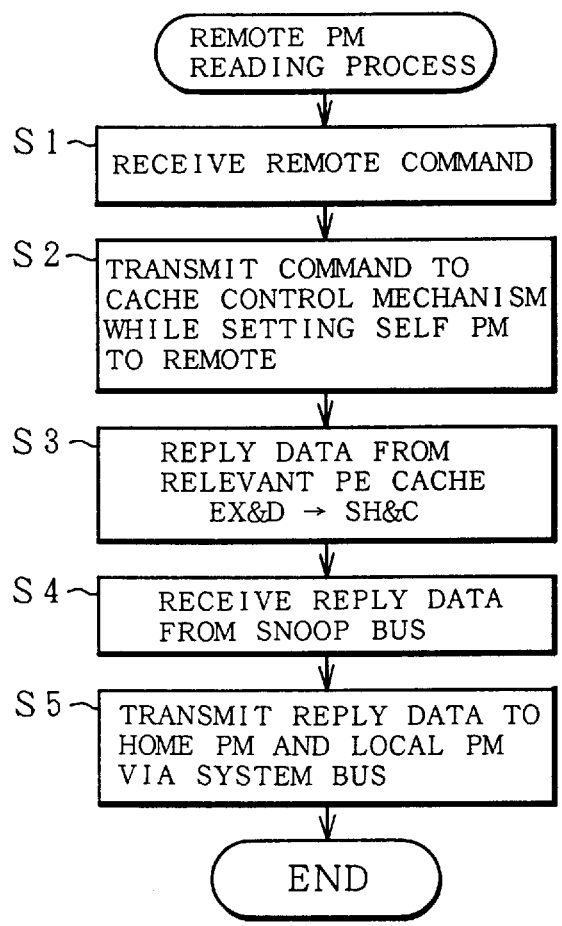
FIG. 21 is a flowchart for a reading process of a remote processor module of the present invention.

A flowchart of FIG. 21 relates to the reading processes of the remote processor module in the reading modes 1 and 2 in FIGS. 16 and 17. First in step S1, when the remote command is received through the system bus, the processor module itself is set to a remote and transmits the remote command to the cache unit through the snoop bus in step S2. When the reply of the data is received from the cache unit of the relevant processor element, the reply data is received from the snoop bus 22 in step S4. In step S5, the reply data is transmitted to the home processor module and local processor module through the system bus.

Reading Process of PM

Figure 22:
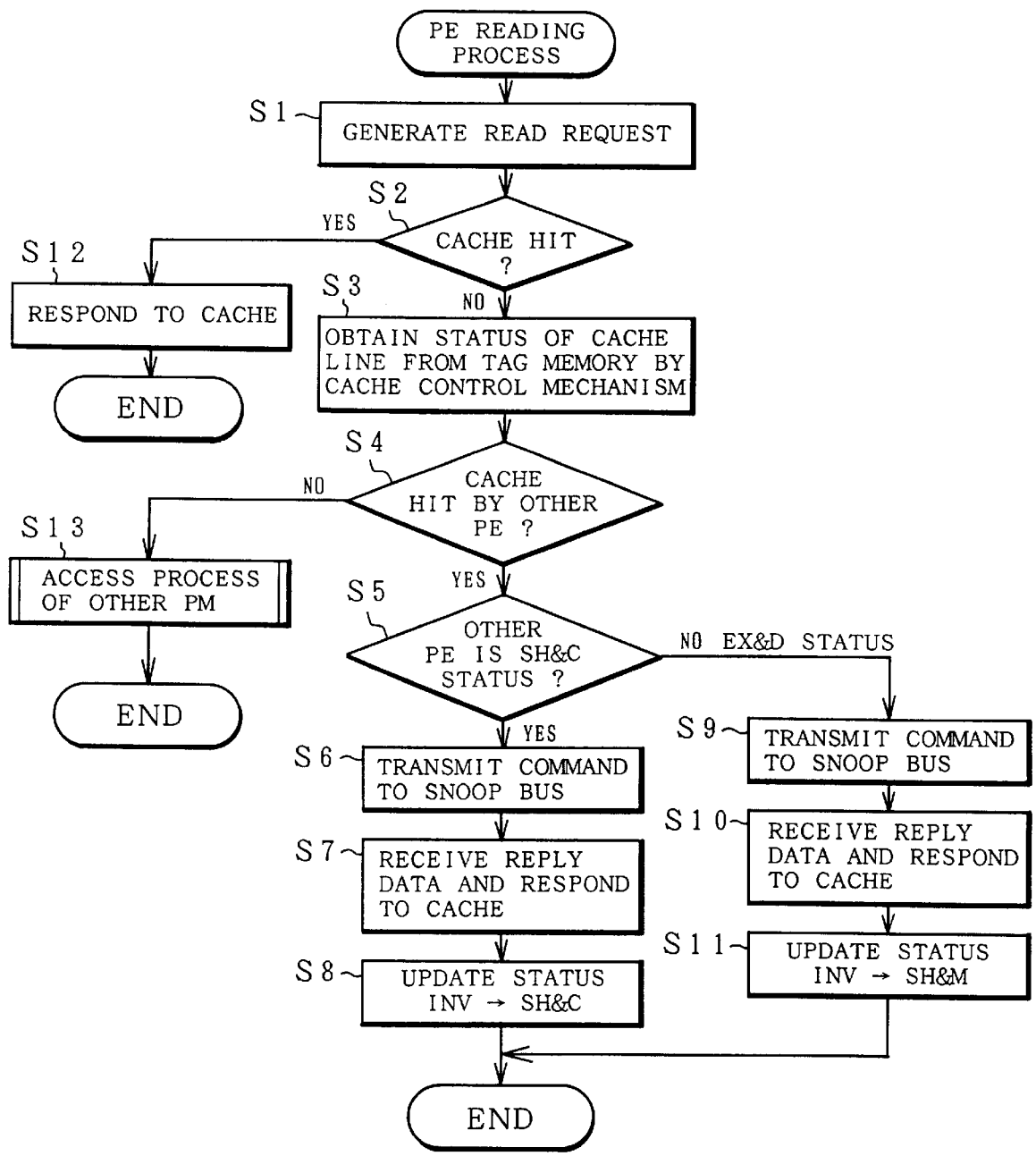
FIG. 22 is a flowchart for a reading process of a processor element of the present invention.

A flowchart of FIG. 22 relates to the reading processes of the processor element itself. First in step S1, when a read request is generated from the CPU, the presence or absence of the cache hit is judged in step S2. If there is a cache hit, the cache data is transmitted for the read access in step S12. When a cache mishit occurs, the status of the cache line is derived from the tag memory 40 by the cache control module 35 in step S3. A check is made in step S4 to see if the hit has occurred on the cache of the other processor element. In this case, when there is a mishit, step S13 follows and the processes for the other processor module are executed by the access to the memory control module 25 side. When there is a cache hit in step S4, a check is made in step S5 to see if the cache state of the other processor element is "shared & clean" or not. If this is the case, a command is transmitted to the snoop bus 22 in step S6. The reply data is received and responded to the cache in step S7. The status is updated from "invalid" to "shared & clean" in step S8. On the other hand, when the other processor is "exclusive & dirty", the command is transmitted to the snoop bus 22 in step S9. After that, the reply data is received and responded to the cache in step S10. In step S11, the status is updated to "shared & modified".

Cache Coherence of Write Access

Processes of the cache coherence in the case where the write access occurs in the CPU of any one of the processor modules 10-1 to 10-5 in FIG. 2 will now be separately described with respect to writing modes 1 to 7.

Writing Mode 1

Figure 23:
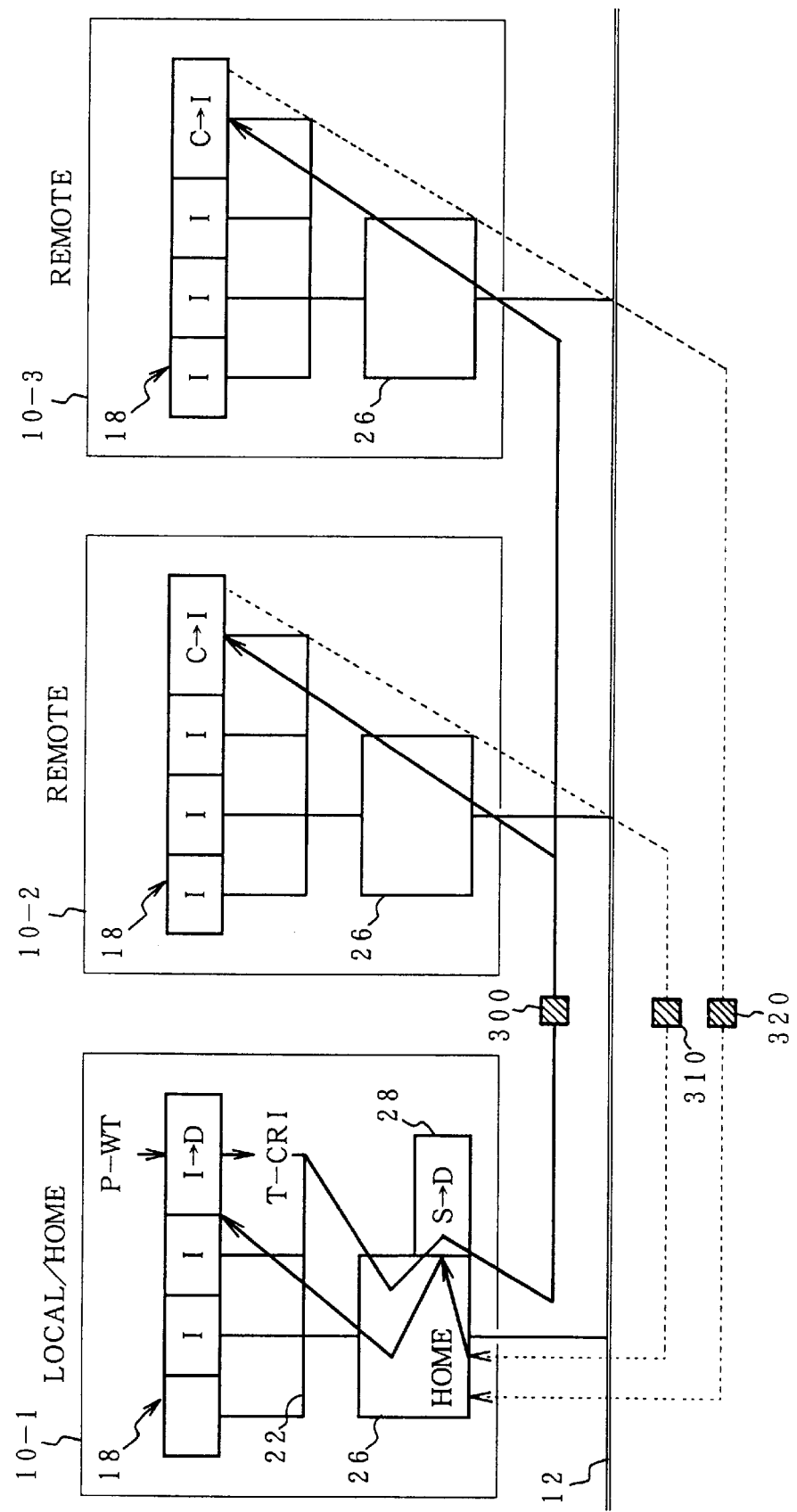
FIG. 23 is an explanatory diagram of the processing operation in a writing mode 1 of the present invention.

FIG. 23 shows a protocol of the cache coherence in the writing mode 1. The writing mode 1 relates to the case where a mishit occurs in the cache unit for a write access P-WT of an arbitrary CPU of the processor module 10-1, a mishit also occurs in the other cache units connected by the snoop bus 22, the write address exists in the local storage 28 as a distributed main storage of the processor module 10-1, and further, the copy data in the write address of the local storage 28 exists as a "share" state on the caches of the other plurality of processor modules 10-2 and 10-3. In this case, the memory management unit 26 of the processor module 10-1 which received a write access T-CRI through the snoop bus 22 sets itself to a local and a home and generates a purge command 300 as an invalidating command to all of the processor modules 10-2 and 10-3 which are in the "share" state by using the system bus 12 with reference to the cache directory. In response to the purge command 300, the processor modules 10-2 and 10-3 operate as a remote and each memory management unit 26 requests the invalidation to the memory units in "share C" through the snoop bus 22 When the invalidation is successful in the cache units in "share C" state, the processor modules 10-2 and 10-3 independently make purge responses 310 and 320 by using the system bus 12. The cache statuses of the cache lines which became the targets in the processor modules 10-2 and 10-3 are included in the purge responses 310 and 320. The processor module 10-1 of the home recognizes the success in invalidation because it received all of the purge responses 310 and 320 from the system bus 12, stores the copy data in the write address of the local storage 28 into the cache unit of the accessing source, and overwrites the copy data by the write access. At this time, the processor module 10-1 as a home updates "share S" of the directory entry of the cache line as an accessing target to "dirty D". In the write access, as mentioned above, the same data as that of the local storage 28 is changed by the overwriting and becomes the newest data on the cache of the accessing source, so that the processes are finished while the data in the local storage 28 is held as old data and the coherence between the old data and the newest data in the local storage 28 is executed through the read access, which has previously been described.

Writing Mode 2

Figure 24:
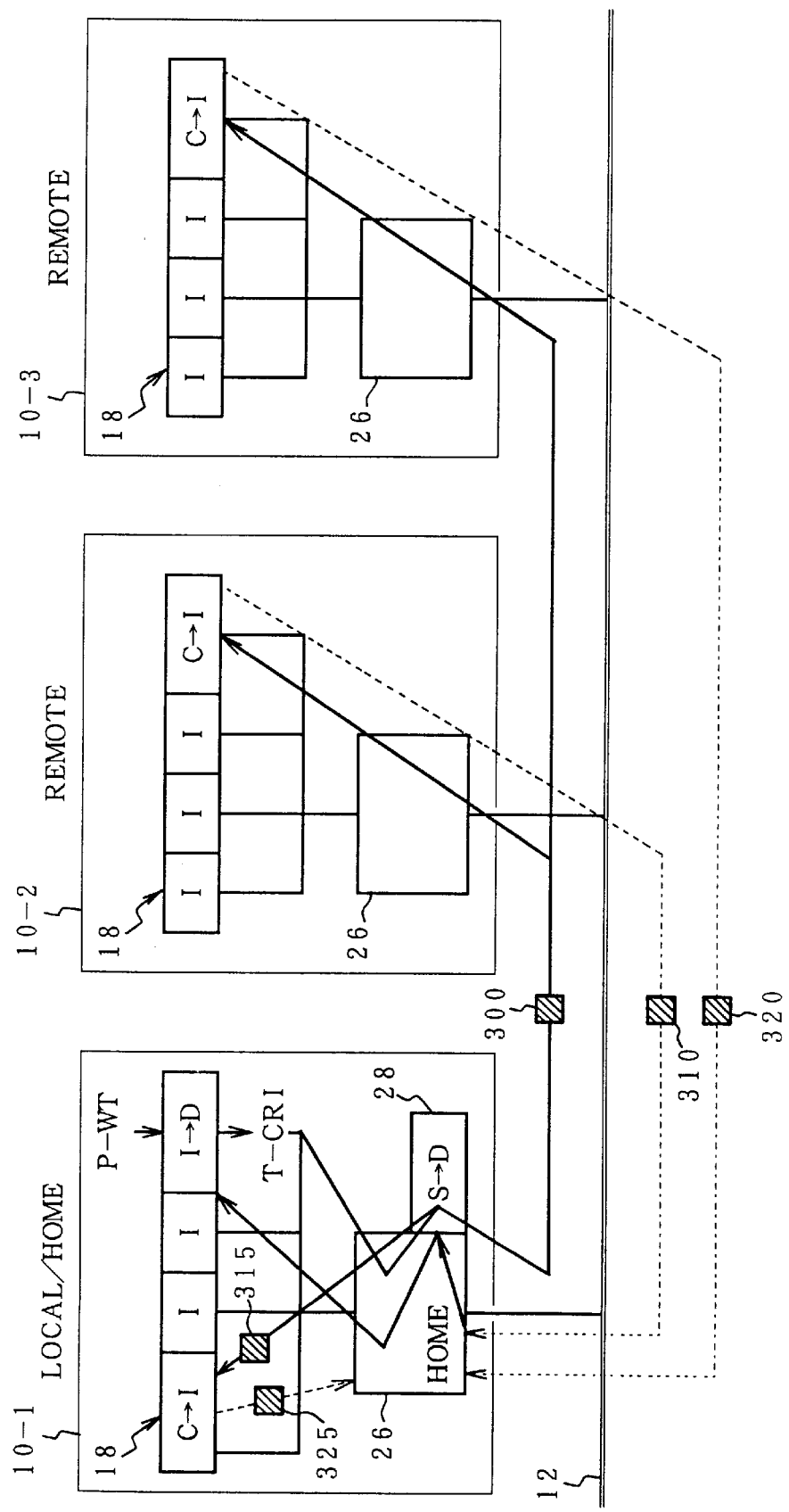
FIG. 24 is an explanatory diagram of the processing operation in a writing mode 2 of the present invention.

FIG. 24 shows a protocol of the cache coherence in writing mode 2. Writing mode 2 relates to the case where the same data as that of the local storage 28 exists in the cache unit of the processor module 10-1 in which the CPU access occurred, and in this case, the data exists in the "share C" state in which the write privilege is not possessed in the other cache units connected by the snoop bus 22 The other states are the same as those in the writing mode 1 in FIG. 23.

In the writing mode 2, on the basis of the write access P-WT of the CPU, the purge command 300 is generated from the memory management unit 26 which operated as a home to the processor modules 10-2 and 10-3 serving as a remote by using the system bus 12. Simultaneously, a purge command 325 is generated to the cache unit group 18 in the same processor module 10. Therefore, the memory management unit 26 of the processor module 10-1 as a home recognizes the success in invalidation by receiving all of the responses of the purge responses 310 and 320 from the processor modules 10-2 and 10-3 as a remote through the system bus 12 and a purge response from the snoop bus 22 The memory management unit 26 stores the copy data of the newest data of the local storage 28 into the cache unit of the accessing source and overwrites by the write access of the CPU. In this case as well, the directory entry is updated from "share S" to "dirty D" state in a manner similar to the case of the writing mode 1.

Writing Mode 3

Figure 25:
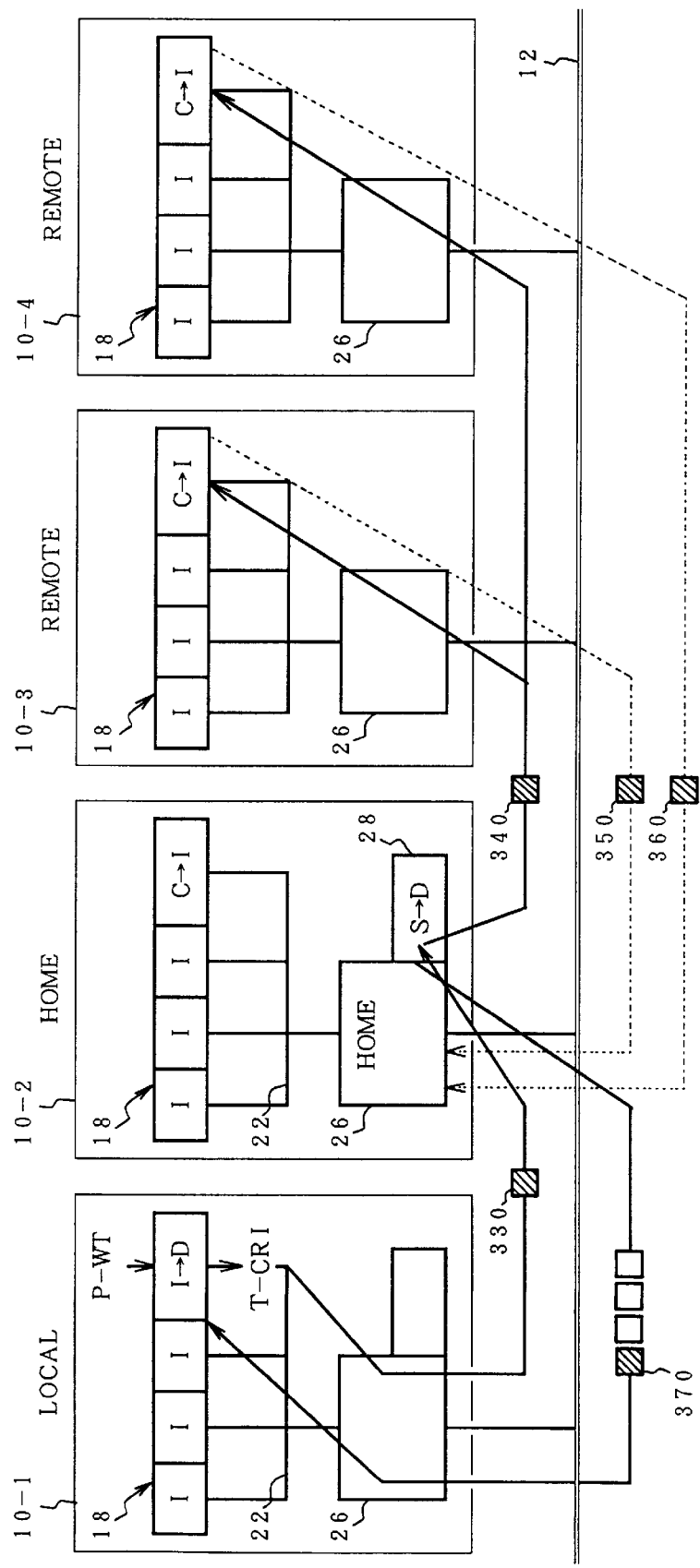
FIG. 25 is an explanatory diagram of the processing operation in a writing mode 3 of the present invention.

FIG. 25 shows a protocol of a cache coherence in the writing mode 3. The writing mode 3 relates to the case where for the write access P-WT of the CPU of the processor module 10-1, the copy data is not registered as a write privilege possessed state in the cache unit and in all of the cache group 18 including the cache units connected through the snoop bus 22, a mishit occurs, the write address exists in the local storage 28 of the processor module 10-2, and further, the copy data of the newest data in the local storage 28 exists as a "share C" state in the plurality of processor modules 10-3 and 10-4 other than the processor module 10-2. In this case, the memory management unit 26 of the processor module 10 as a local generates a home command 330 serving as a request command of the write privilege to the processor module 10-2 as a home by using the system bus 12. The processor module 10-2 which received the home command 330 as a request command of the write privilege generates a purge command 340 serving as an invalidating command to the other processor modules 10-3 and 10-4 in the "share" state by using the system bus 12. When receiving the purge command 340, the processor modules 10-3 and 10-4 instruct the invalidation to the cache units in the cache group 18 in the "share" state through the snoop bus 22 When the invalidation is successful, the processor modules 10-3 and 10-4 independently return purge responses 350 and 360 to the processor module 10-2 as a home by using the system bus 12. When the success in invalidation is recognized by receiving all of the purge responses 350 and 360, the processor module 10-2 as a home responds the movement of the copy data of the newest data in the local storage 28 and the write privilege to the processor module 10-1 as a local by using the system bus 12. The processor module 10-1 as a local receives the write privilege by reply data 370 from the system bus 12, stores the received copy data into the cache unit of the accessing source, and overwrites by the write access of the CPU. The memory management unit of the processor module 10-2 as a home which recognized the success in invalidation and moved the write privilege updates the state from "share S" to "dirty D". The cache unit of the accessing source of the processor module 10-1 updates the cache state to "dirty D" having the write privilege in response to the end of the write access.

Writing Mode 4

Figure 26:
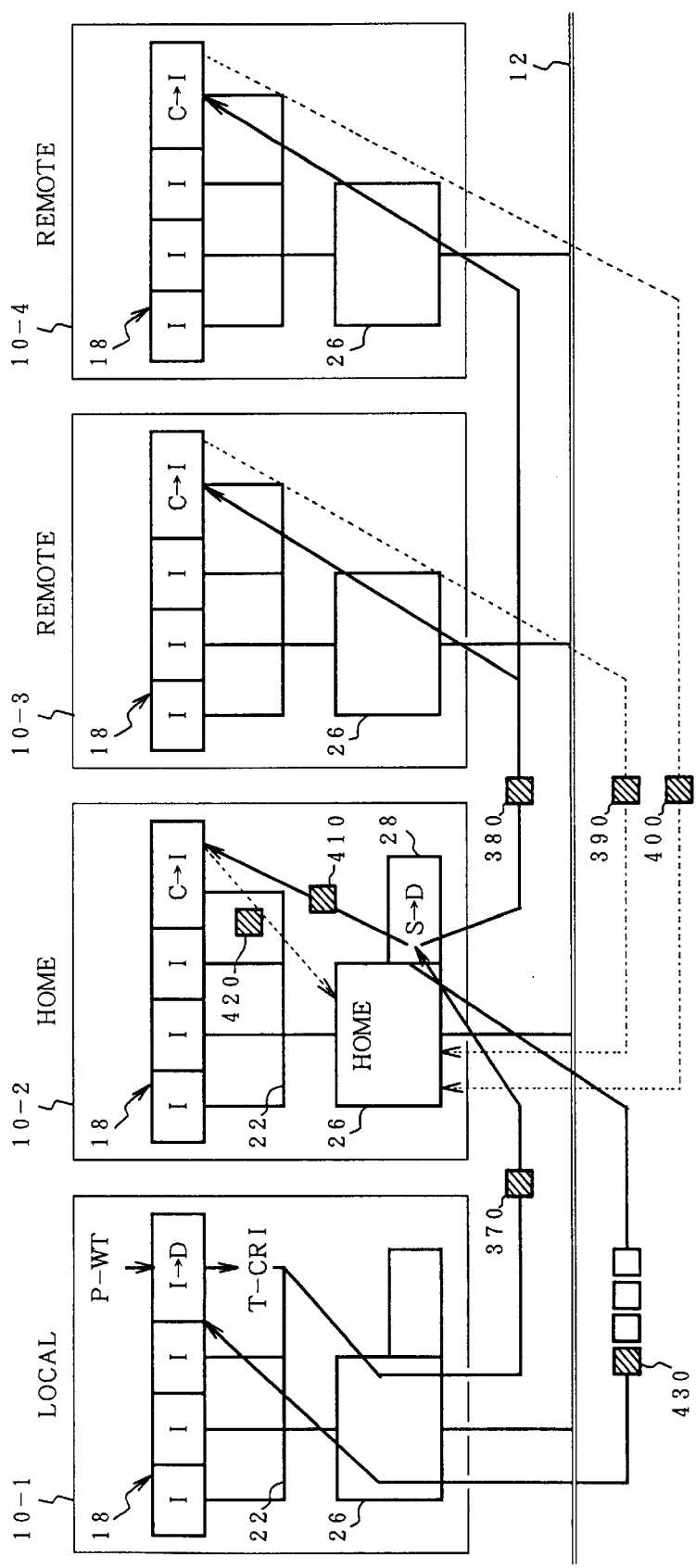
FIG. 26 is an explanatory diagram of the processing operation in a writing mode 4 of the present invention.

FIG. 26 shows a protocol of a cache coherence in writing mode 4. Writing mode 4 relates to the case where a local write access (P-WT) for the CPU in processor module 10-1, a mishit occurs in the its cache unit and the copy data is not registered as a write privilege possessed state in the other cache units as well connected through the snoop bus 22 and a mishit occurs, the write address exists in the local storage 28 of the processor module 10-2 as a home, and further, the copy data of the newest data in the local storage 28 exists as a "share C" state in the cache units of the plurality of processor modules 10-3 and 10-4 including the processor module 10-2. In this case, the memory management unit 26 of the processor module 10-1 as a local which generated the write access generates the home command 370 serving as a request command of the write privilege to the processor module 10-2 as a local by using the system bus 12. The memory management unit 26 of the processor module 10-2 which received the home command 370 as a write privilege request command generates a purge command 380 serving as an invalidating command to all of the processor modules 10-3 and 10-4 in the "share" state by using the system bus 12. In parallel with the generation of the purge command 380, further, the memory management unit 26 generates a purge command 410 serving as an invalidating command to the cache units in the cache group 18 in the its "share" state by using the snoop bus 22 All of the processor modules 10-3 and 10-4 in the "share C" state on the cache operate as a remote and simultaneously receive the purge command 340 and instructs the invalidation to the cache group 18 side through the snoop bus 22 When the invalidation is successful, the processor modules 10-3 and 10-4 independently return the purge responses 350 and 360 to the processor module 10-2 by using the system bus 12. In parallel with it, the success in invalidation is responded from the cache unit in the "share C" state of the processor module 10-2 by using the snoop bus 22 By receiving all of the purge responses 350 and 360 of the success in invalidation from the system bus 12 and the response of the success in invalidation from the snoop bus 22, the processor module 10-2 as a home recognizes the success in invalidation and responds the movement of the copy data of the newest data in the local storage 28 and the write privilege as reply data 430 to the processor module 10-1 as a local by using the system bus 12. The processor module 10-1 receives the reply data 430 from the system bus 12 and gets the write privilege, stores the received copy data into the cache unit of the accessing source, and overwrites by the write access of the CPU. When recognizing the success in invalidation and transmission of the write privilege, the processor module 10-2 updates the state of the directory entry from "share S" to "dirty D".

Writing Mode 5

Figure 27:
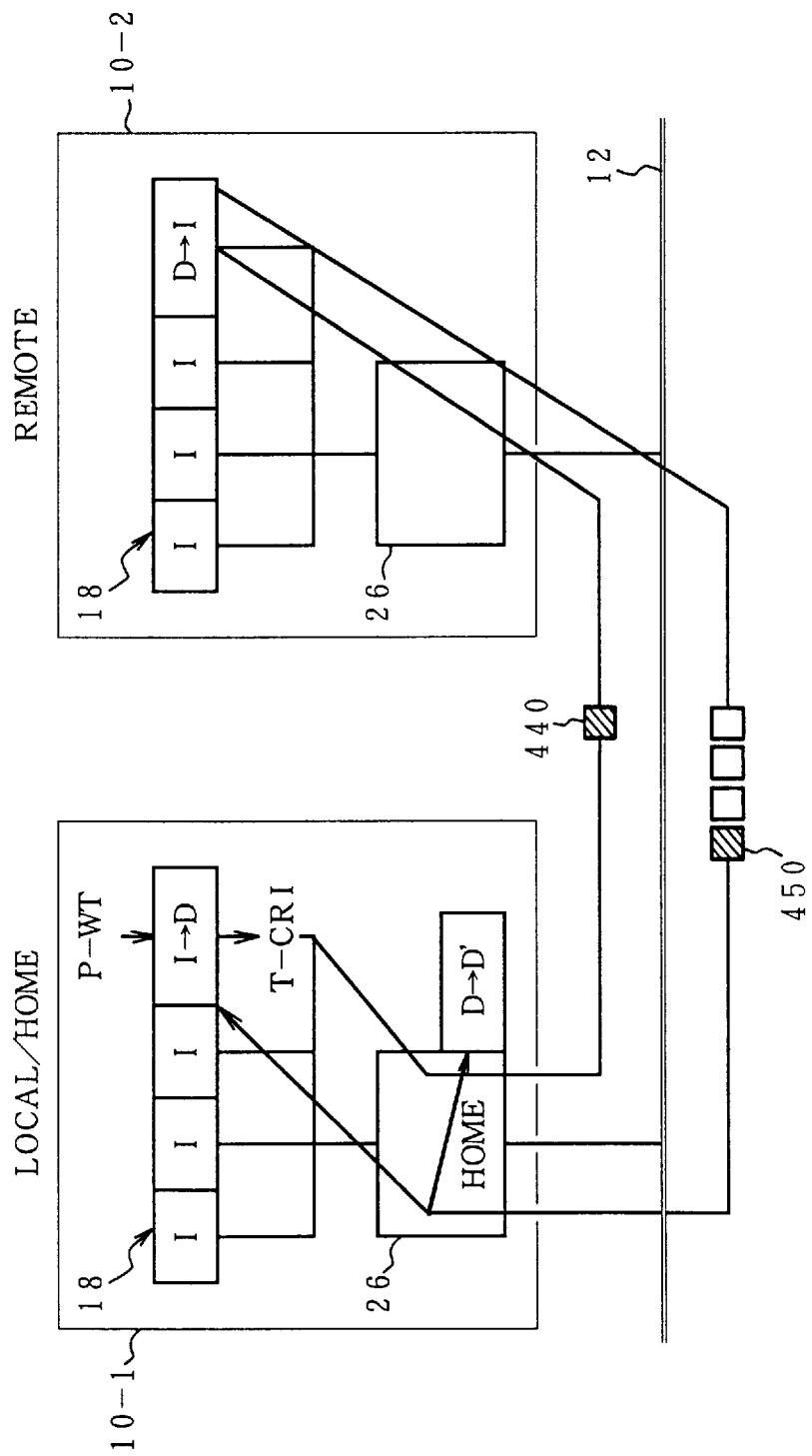
FIG. 27 is an explanatory diagram of the processing operation in a writing mode 5 of the present invention.

FIG. 27 shows a protocol of a cache coherence in the writing mode 5. Writing mode 5 relates to the case where for the write access P-WT of the CPU of the processor module 10-1, the copy data is not registered as a write privilege possessed state in the cache unit and in the cache group 18 of the other cache units connected by the snoop bus 22, a mishit occurs, the write address exists in the local storage 28 of the processor module 10-1, and further, the newest data in the write address of the local storage 28 exists as "dirty D" in which the write privilege is possessed in the cache unit of the processor module 10-2. In this case, the processor module 10-1 as a local and a home generates a remote command 440 serving as a request command of the write privilege to the processor module 10-2 in a "dirty D" state by using the system bus 12. The processor module 10-2 receives the remote command 440 as a request command of the write privilege from the system bus 12 and responds reply data 450 indicative of the movement of the write privilege including the newest data in "share D" state on the cache unit to the processor module 10-1 by using the system bus 12. The processor module 10-1 stores the newest data derived by the response of the write privilege by the reply data 450 into the cache unit of the accessing source and overwrites by the write access by the CPU. The cache unit in which the write privilege of the processor module 10-2 was transferred updates the state from "dirty D" to "invalid I". When receiving the write privilege, the memory management unit 26 of the processor module 10-1 updates "dirty D" of the directory entry into "dirty D" indicating that the newest data exists on the cache.

Writing Mode 6

Figure 28:
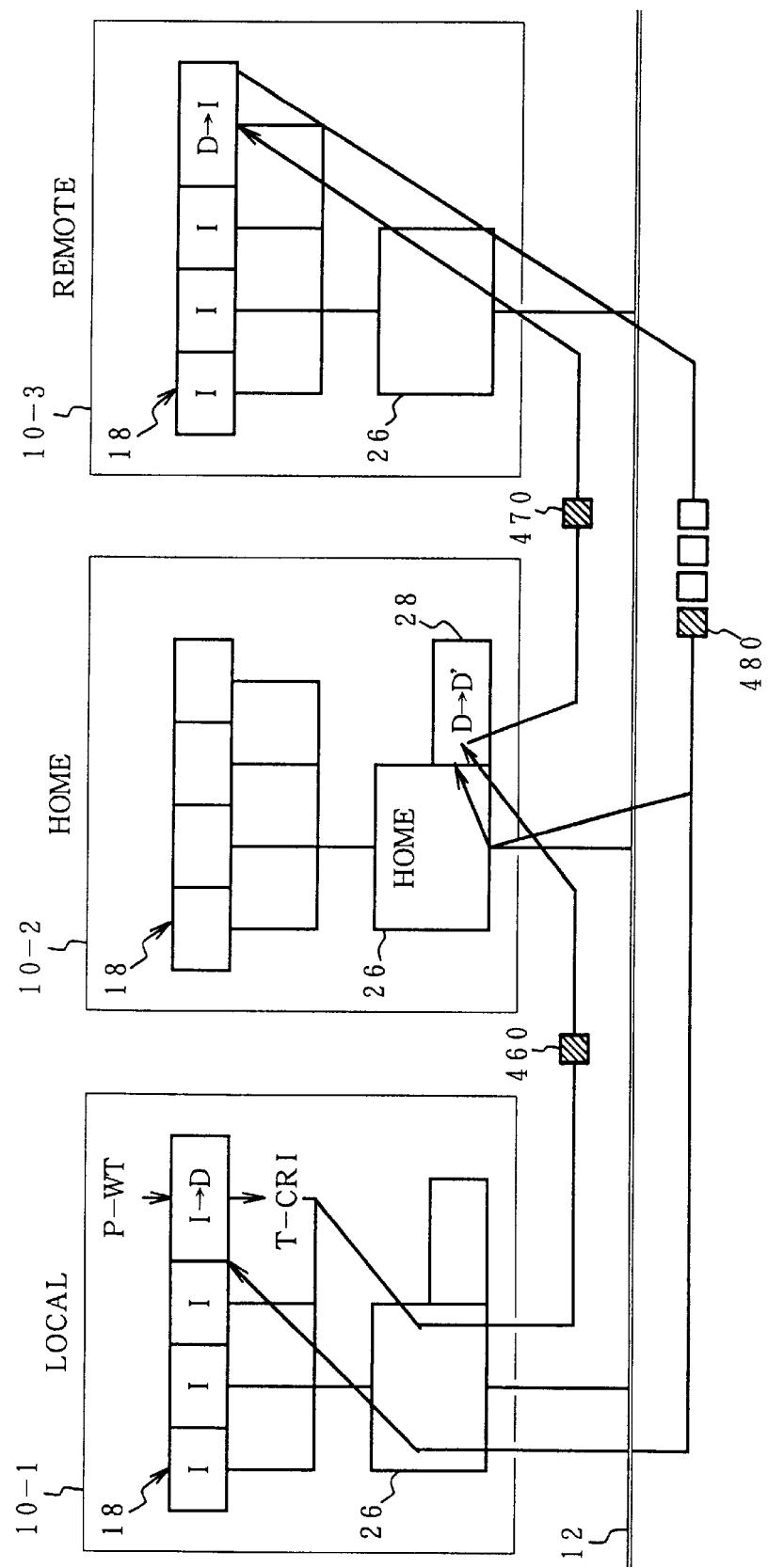
FIG. 28 is an explanatory diagram of the processing operation in a writing mode 6 of the present invention.

FIG. 28 shows a protocol of a cache coherence in the writing mode 6. Writing mode 6 relates to the case where for the write access P-WT by the CPU of the processor module 10-1, the copy data is not registered as a write privilege possessed state in the cache unit and in the cache group 18 including the other cache units connected by the snoop bus 22, a mishit occurs, the write address exists in the local storage 28 of the processor module 10-2, and the newest data in the write address of the local storage 28 exists in the "dirty D" state in which the write privilege is possessed in the cache unit of the processor module 10-3. In this case, the memory management unit 26 of the processor module 10-1 as a local generates a home command 460 serving as a request command of the write privilege by using the system bus 12. The memory management unit 26 of the processor module 10-2 as a home which received the home command 460 generates a remote command 470 likewise serving as a request command of the write privilege to the processor module 10-3 as a remote by using the system bus 12. The processor module 10-3 which received the remote command 470 responds the write privilege including the newest data of the cache unit in "dirty D" state to the processor module 10-2 as a home and the processor module 10-1 as a local by reply data 480 by using the system bus 12. The processor module 10-2 as a home receives the reply data 480 as a response of the write privilege and recognizes the movement of the write privilege. The processor module 10-1 as a local stores the newest data derived by the reception of the write privilege by the reply data 480 into the cache unit of the accessing source and overwrites by the write access of the CPU. The cache unit of the processor module 10-3 as a remote updates the state from "dirty D" to "invalid I" when the possession of the write privilege is moved. When recognizing the movement of the write privilege, the processor module 10-2 as a home updates the state of the directory entry from "dirty D" to "dirty D"'in which the data is changed to the information of the processor module 10-1 in which the newest data exists. Further, the cache unit of the accessing source of the processor module 10-1 as a local stores the newest data and, after that, updates the state to "dirty D" in which the write privilege is possessed.

Writing Mode 7

Figure 29:
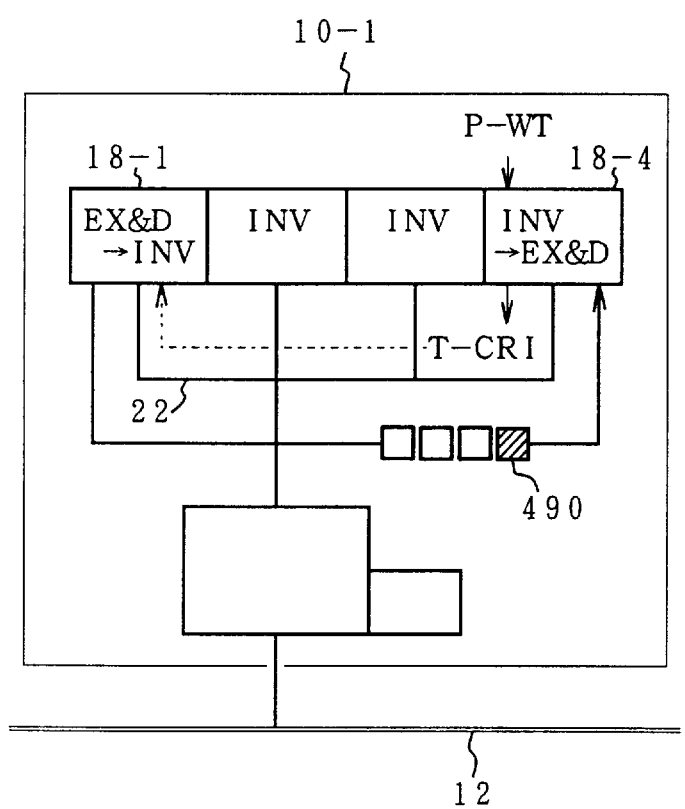
FIG. 29 is an explanatory diagram of the present processing operation in a writing mode 7 of the invention.

FIG. 29 shows a protocol of a cache coherence in the writing mode 7. Writing mode 7 relates to the case of accessing among a plurality of cache units in the processor module 10-1. Namely, it relates to the case where for the write access P-WT of the CPU in the processor module 10-1, although a mishit occurs in the cache unit 18-4, the newest data in the write address exists in the other cache unit 18-1 connected through the snoop bus 22 in a "dirty" state in which the write privilege is possessed, namely, "exclusive & dirty" state. In this case, the cache unit 18-4 of the accessing generates command T-CRI through the snoop bus 22 In response to it, the cache unit reply 490 including the newest data of the cache subline, stores it into the cache unit 18-4, and after that, overwrites by the write access. After the write privilege was moved, the cache unit 18-1 of the accessing source is updated to "invalid INV". After the write privilege was obtained, the cache unit 18-4 of the accessing source is updated from "invalid INV" to the exclusive & dirty" state as a "dirty" in which the write privilege is possessed.

Processor Write of Write Access

Figure 30:
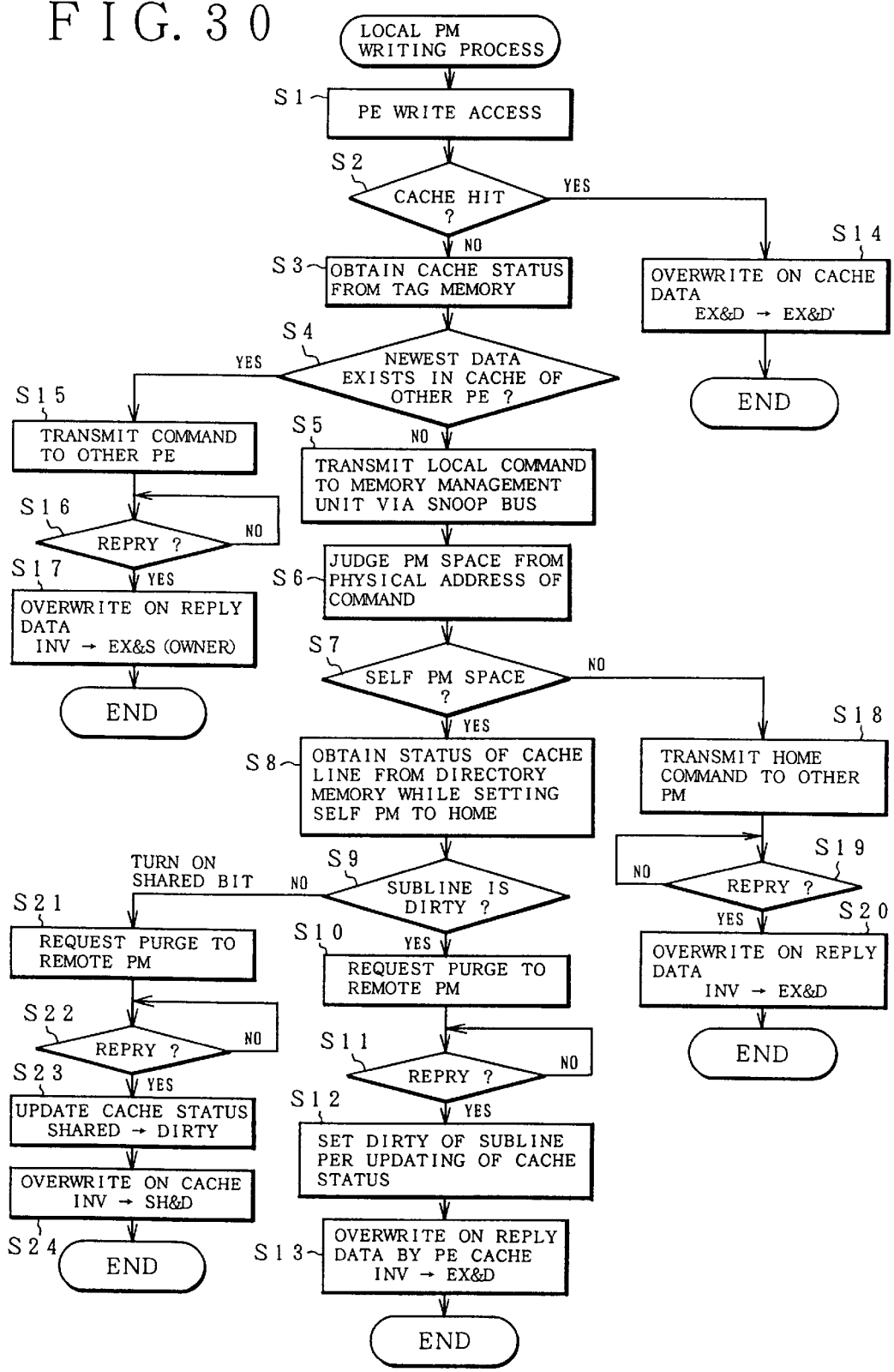
FIG. 30 is a flowchart for a writing process of the local processor module of the present invention.

A flowchart of FIG. 30 relates to a writing process of the processor module as a local in the cache coherence in association with the write access. In step S1, when a write access of the processor element occurs, a cache hit of the secondary cache 38 is judged in step 52. When a cache hit occurs, the data is overwritten onto the cache in step S14. When a cache mishit occurs, a cache status is derived from the tag memory 40. A check is made in step S4 to see if the newest data exists in the other cache unit obtained by the snoop bus 22 When the newest data exists on the other cache, a command is transmitted to the other processor element in step S15. The apparatus waits for a reply in step S16. In step S17, the data is overwritten onto the newest reply data. The write access is finished. In step S14, when the newest data doesn't exist on the cache of the other processor element connected by the snoop bus 22, in step S5, a local command is transmitted to the memory management unit 26 through the snoop bus 22 In step S6, the processor module space from the space identification unit 50 is judged. In step S7, a check is made to see if the space is the processor module space. When it is the processor module space, the processor module itself is set to a home and a directory entry is obtained to see the status of the cache line from the directory memory 30 in step S8. A check is made in step S9 to see if the subline of the directory entry is "dirty". If it is "dirty", a purge is requested to the processor module as a remote through the system bus 12. In response to the purge request, when there is a reply in step S11, "dirty" is set into another subline of the directory entry and the cache status is updated. In step S13, the reply data is overwritten on the cache of the accessing source of the processor element, thereby updating "invalid INV" to "exclusive & dirty" with the write privilege. On the other hand, in step S9, when the subline of the directory entry is not "dirty" but "share", a purge is requested to the remote processor module in step S21. The apparatus waits for a reply in step S22 In step S23, the cache status is updated from "share S" of the directory entry to "dirty D". Finally, in step S24, the data is overwritten onto the cache data and the state is updated from "invalid" to "shared & dirty". Steps S8 to S13 and steps S21 to S24 relate to the processes in the case where the local processor module simultaneously becomes the home processor module. On the other hand, in step S7, when the access space is not the processor module space, a home command is transmitted to the other processor module in step S18. In step S19, the apparatus waits for a reply of the newest data. In step S20, the reply data is overwritten on the cache and the state is updated from invalid, to exclusive & dirty, with the write privilege. This is accompanied with the movement of the write privilege by the home command.

Figure 31:
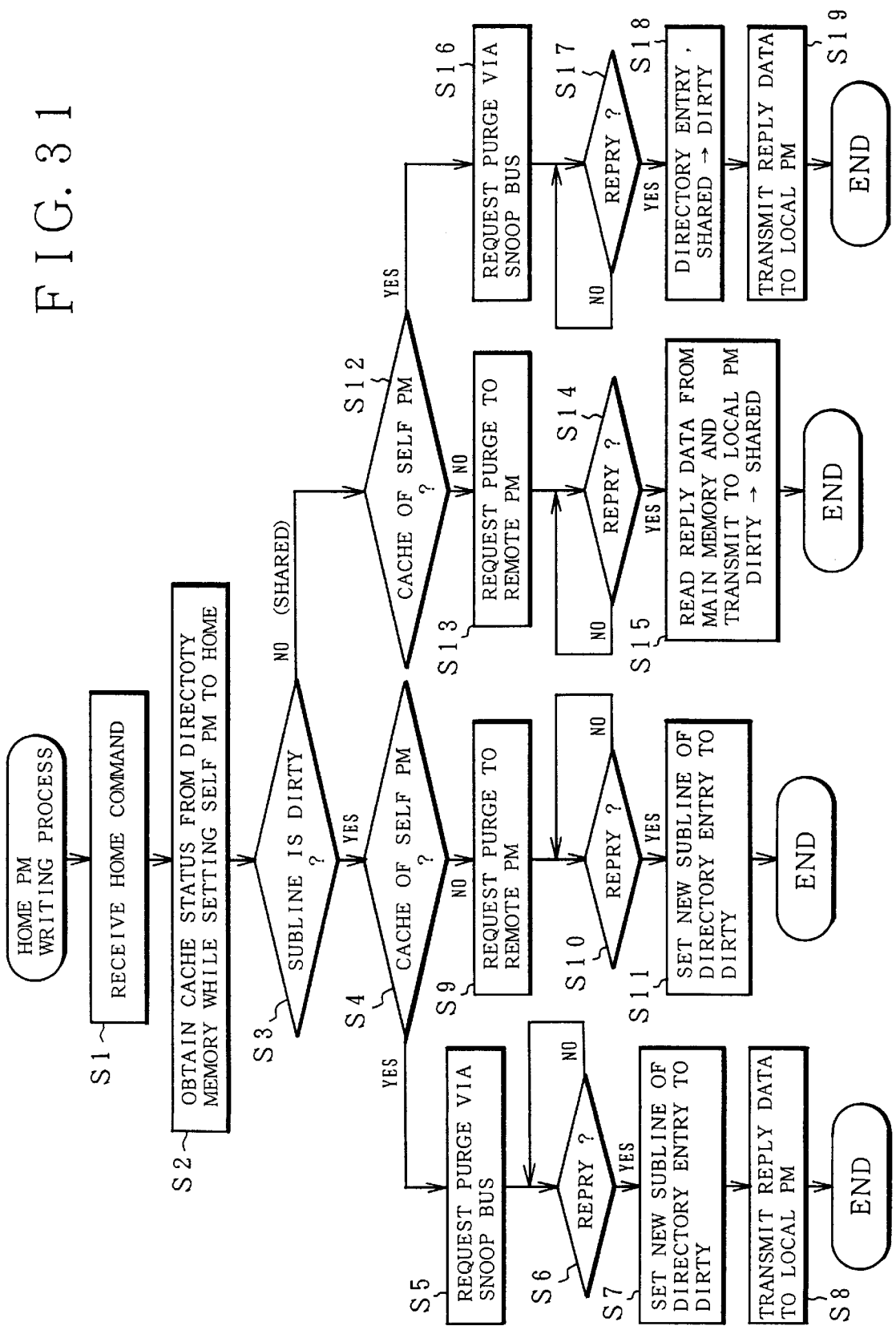
FIG. 31 is a flowchart for a writing process of the home processor module of the present invention.

A flowchart of FIG. 31 relates to the writing process in the case where the processor module becomes the home processor module in the cache coherence by the write access. When the home command is received in step S1, the processor module is set to a home and the directory entry as a cache status is obtained from the directory memory 30 in step S2. In step S3, a check is made to see if the state is "dirty" or not by referring to the subline of the directory entry. If it is "dirty", a check is made in step S4 to see if the newest data exists on the cache of the processor module. When the newest data exists on the cache, a purge is requested through the snoop bus 22 in step S5. In step S6, the apparatus waits for a reply. In step S7, the new subline of the directory entry of the local storage 28 is set to "dirty". In step S8, the newest data is transmitted as reply data to the local processor module. When the newest data exists on the cache of the other processor module in step S4, a purge is requested to the remote processor module in step S9. In step S10, the apparatus waits for a reply. The processing routine advances to step S11 and a new subline in the directory entry is set to "dirty". On the other hand, when the subline of the directory entry is not "dirty" but "share" in step S3, a check is made in step S12 to see if it exists on the cache in the processor module. If NO, a purge is requested to the remote processor module in step S13. The apparatus waits for a reply in step S14. In step S15, the reply data as newest data is read out from the local storage and is transmitted to the local processor module and the cache directory is updated from "dirty D" to "share S". In step S2, when the newest data exists on the cache in the processor module, a purge is requested through the snoop bus 22 in step S16. The apparatus waits for a reply in step S17. The processing routine advances to step S18 and the state of the directory entry is updated from share, to "dirty". In step S19, the newest data in the local storage is transmitted as reply data to the local processor module.

Figure 32:
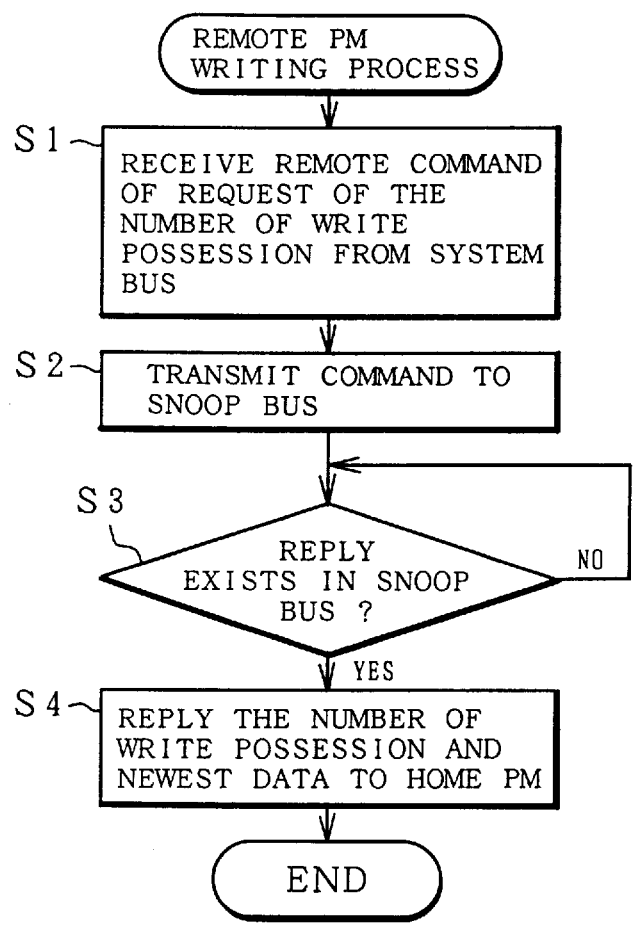
FIG. 32 is a flowchart for a writing process of the remote processor module of the present invention.

A flowchart of FIG. 32 relates to the writing process of the remote processor module in the write access. In the writing process of the remote processor module, first in step S1, when a remote command, namely, a request command of the write privilege is received from the system bus 12, the command is transmitted to the snoop bus 22 in step S2. The apparatus waits for a reply from the snoop bus 22 in step S3. In step S4, a command to respond the movement of the write privilege and the newest data are transmitted as reply data to the local processor module and home processor module.

Figure 33:
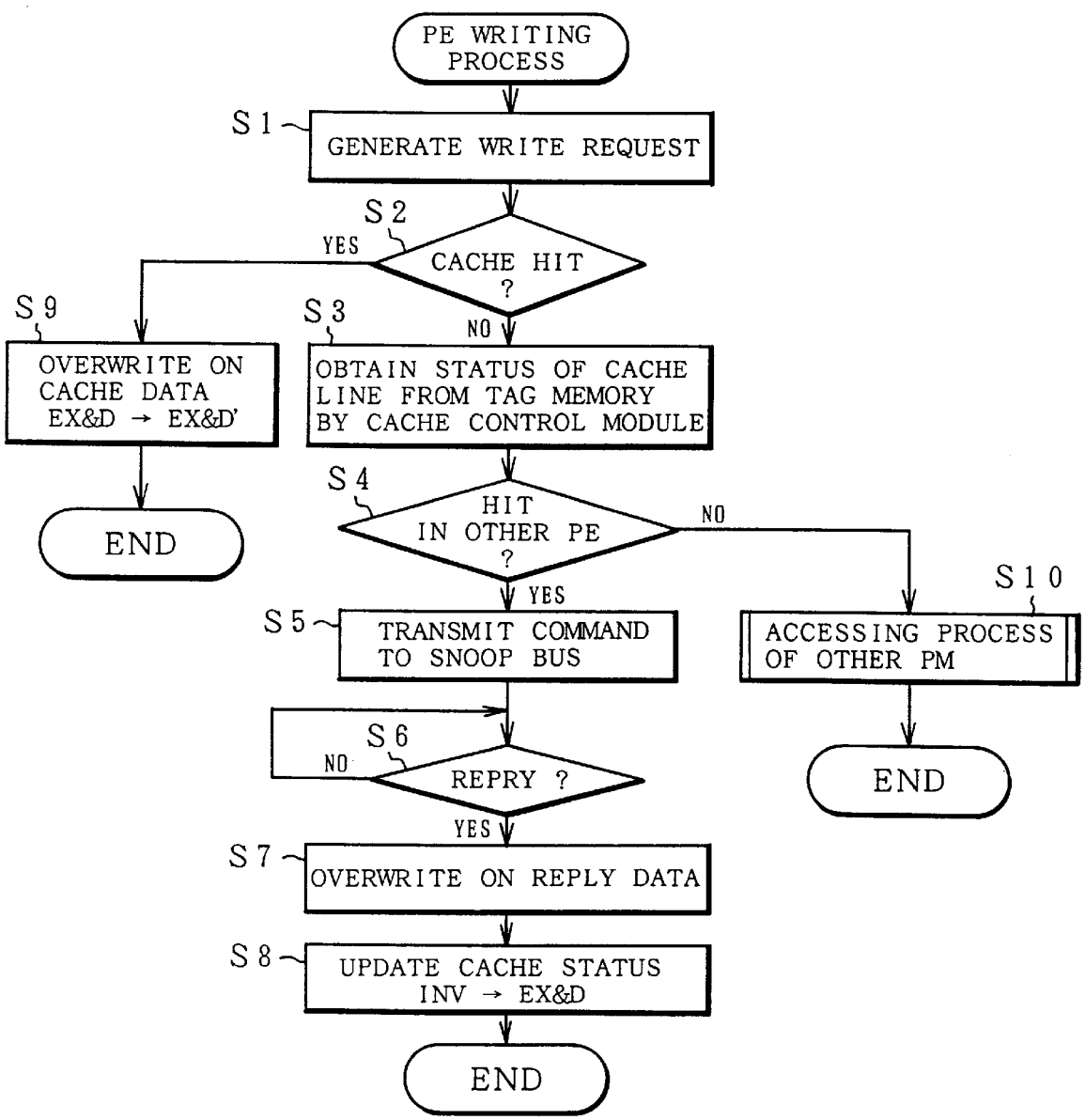
FIG. 33 is a flowchart for a writing process of the processor element of the present invention.

A flowchart of FIG. 33 relates to the writing process of the processor element when the write access occurs. First in step S1, when a write request is generated, a check is made in step S2 to see if the newest data in which the write privilege is possessed exists in the cache unit and in the other cache units connected by the snoop bus 22 When the newest data exists in the other cache, in step S9, it is transferred to the accessing source and the cache data is overwritten. A check is made in step S2 to see if a cache hit has occurred in the cache unit upon reading. When the cache hit occurs, step S9 follows and the data is overwritten onto the cache data by the write request and the cache state is updated to the "exclusive & dirty" state with the same write ownership. When the newest data doesn't exist in the write privilege possession state in the its cache unit, step S3 follows. The tag memory 40 is referred by the cache control module 35, the status of the cache line is obtained, and a check is made to see if the newest data exists in the write privilege possessed state on the cache of the other processor element. If YES, it is judged that the hit occurred. In step S5, the command is transmitted to the snoop bus 22 and the request command of the write privilege is generated. When there is a reply in step S6, the reply data is stored onto the cache of the accessing source and is overwritten. In step S8, the cache status is updated from invalid, to "exclusive & dirty" state. In step S4, when the newest data doesn't exist in the write privilege possessed state in the other processor element, step S10 follows and the accessing process to the other processor module is executed. In this case, the writing process of the local processor module in FIG. 30 is activated.

Access Competition of Caches

In the cache coherence apparatus of the invention, the cache unit provided for every processor element of each of the plurality of processor modules becomes a target of the access of the internal processor element and the external processor module, so that there is a possibility such that the accesses are concentrated to a specific cache unit. For example, when data is transmitted and received between the processor element in the remote processor module and the cache unit, if the remote command from the external home processor module appears on the snoop bus, a retry is transmitted in the subsequent remote command when starting a cache access. This is because since the cache state is in a transition period of time by the advance command, a countermeasure for the remote command cannot be determined. As mentioned above, if the transmission and reception of the data in the remote processor module endlessly continue, there is a case where the home processor module which transmitted the remote command repeats the retry. In this instance, a bus connection unit to the system bus monitors a time of an access response and the repetition of the retry becomes an opportunity for the bus time-out.

Figure 34:
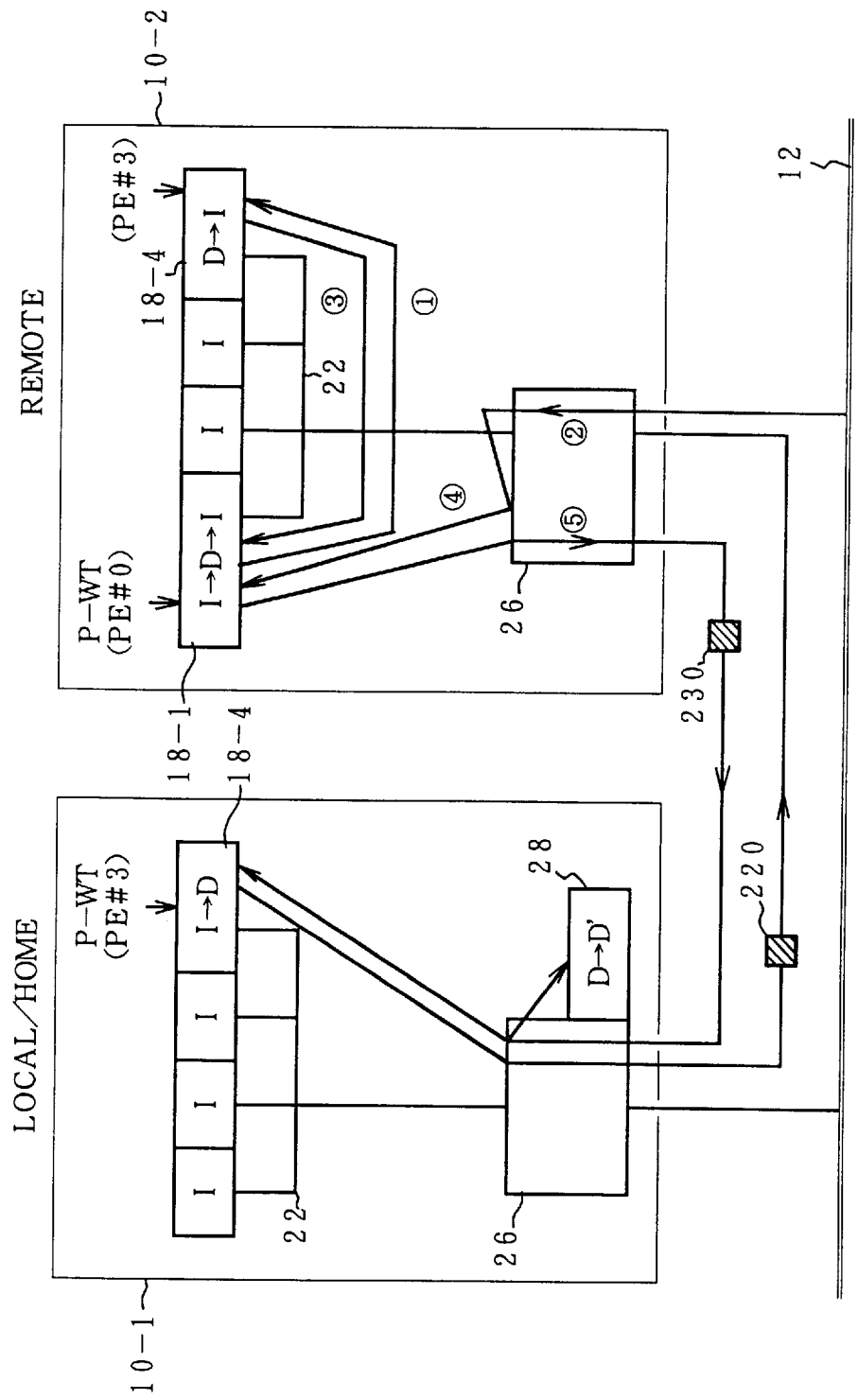
FIG. 34 is an explanatory diagram of the operation in which an internal command and an external remote command to a cache unit compete and a retry is repeated of the present invention.

In FIG. 34, the processor module 10-1 functions as a home because the address of the data as an accessing target is held in the local storage 28. Since the data in the access address of the local storage 28 is not the newest data, in the memory management unit 26 to manage the directory, "dirty D" state has been registered. The newest data of the data in the access address is held as "exclusive & dirty" in the cache unit of the fourth processor element PE#3 in the cache unit group 18 of the processor module 10-2. It is now assumed that in this state, the write command P-WT is generated in the fourth processor element PE#3 of the processor module 10-1 and the write command P-WT to the same address is generated in the first processor module PE#0 of the processor module 10-2. On the basis of the generated write access of the first processor element PE#1, the processor module 10-2 generates a CRI command of "coherent write & invalidate" as shown in (1) from the cache unit 18-1 to the snoop bus 22 In this case, since the data in the access address has been recorded as exclusive & dirty, in the cache unit 18-4 of the fourth processor element PE#3, as shown in (3), the data is supplied from the cache unit of the fourth processor element PE#3 to the first processor element PE#0. In parallel with the access in the processor module 10-2 as mentioned above, the remote command 220 is transmitted to the system bus 12 on the basis of the write access of the fourth processor element PE#3 of the processor module 10-1. As shown in (2), the remote command appears on the snoop bus 22 of the remote processor module 10-2. At this time, no problem occurs so long as the access between the internal processor elements PE#0 and PE#3 of (1) and (3) has been finished. However, when the remote command appears between the internal accesses (1) and (3), a bus busy occurs and the reply command 230 to instruct the retry is transmitted to the processor module 10-1 through the system bus 12 as shown in (5). Therefore, the processor module 10-1 which received the reply command 230 executes the retry operation for again transmitting the remote command 220 to the processor module 10-2. When the snoop bus 22 is busy by the internal access in the processor module 10-2 at this time, a retry by the reply command 230 is again executed, so that there is a possibility such that the retry endlessly continues.

Figure 35:
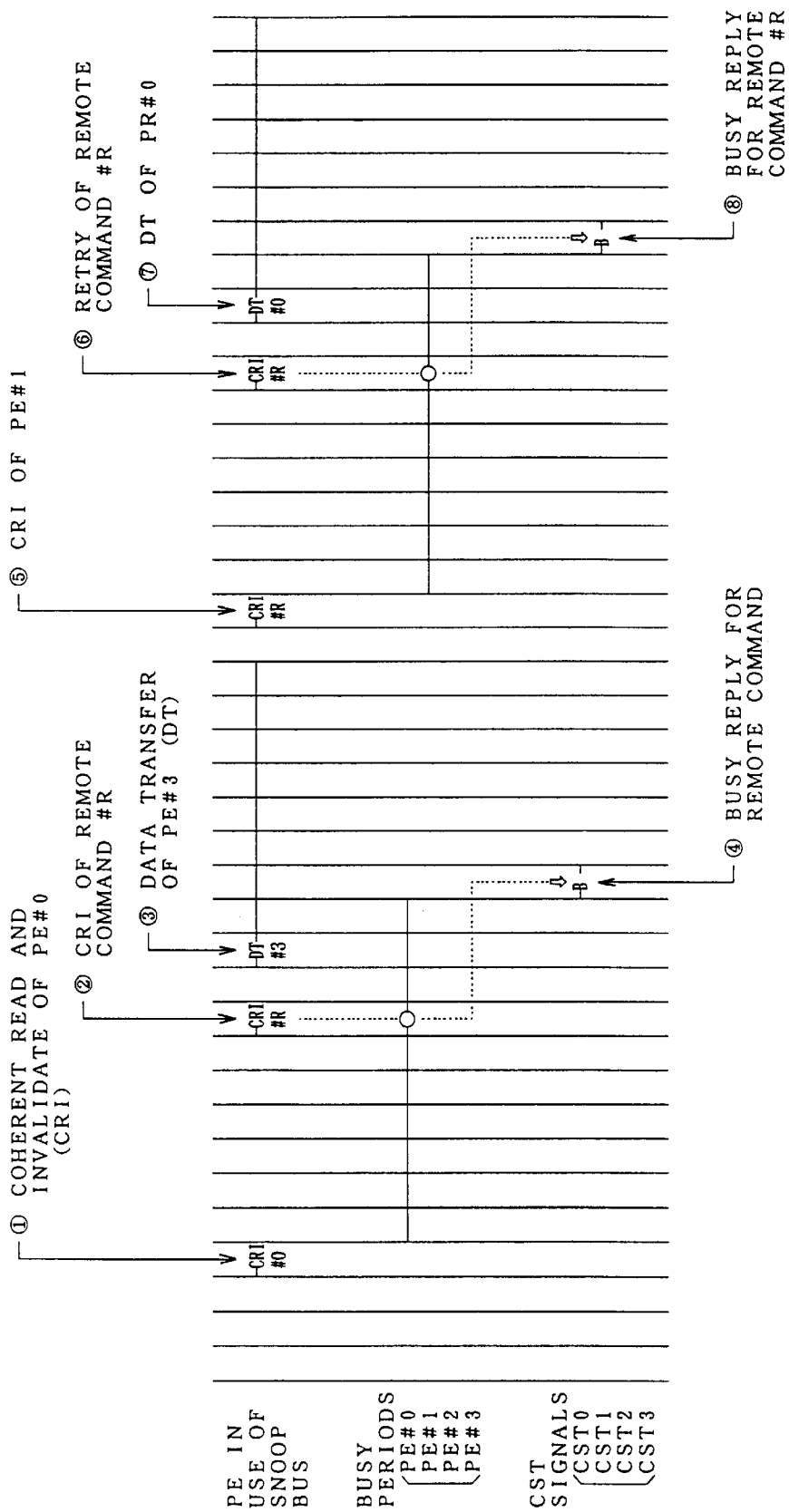
FIG. 35 is a time chart of a specific example of a retry repetition of FIG. 34.

FIG. 35 is a time chart for processes of the processor module 10-2 in which the retry command for the remote command is repeated. In the time chart of FIG. 35, an axis of abscissa denotes a processing timing of a bus clock cycle and an axis of ordinate indicates processor elements which are being used of the snoop bus 22, a busy period of time for every processor elements PE#0to PE#3, and further, cache status signals CST0 to CST3 corresponding to the processor elements #0 to #3. First as shown in (1), in association with the generation of the write command of the first processor element PE#0, the snoop bus 22 is occupied by the processor element PE#0 and the CRT command of "coherent read and invalidate" is transmitted. In response to the CRT command, a busy indicator for processor element PE#0 of the accessing destination is set. As shown in (2), when the CRI command of a remote command #R from the external processor element 10-1 appears for a busy period of time of the processor element PE#0 serving as an accessing destination, a busy-response is performed because the processor element PE#0 of the accessing destination is busy. For example, the reply command of the busy response to the remote command #R is transmitted to the processor module 10-1 at a timing of (4) after four cycles. On the other hand, a DT command to transfer the data appears from the processor element PE#3 after the CRI command of the remote command #R of (2). The data is transferred from the processor element PE#0 which received the CRI command to the processor element PE#3 of the requesting source. After completion of the data transfer based on the DT command of (3), as shown in (5), the CRI command of the processor element PE#1appears on the snoop bus 22. Now, assuming that the access requesting destination is the same processor element #0 as that of the remote command #R in which a busy reply was performed, the processor element PE#0 is again set to the busy state. Therefore, even if the retry of the remote command #R appears on the snoop bus as shown in (6) from the processor module 10-1 on the basis of the busy reply for the remote command of (4), since the processor element #0 as an access requesting destination is in the busy state, a busy reply for the remote command #R is executed as shown in (8). The retry instruction due to the busy state of the processor element #0 of the access requesting destination for the remote command #R is endlessly repeated. Eventually, the access from the processor module 10-1 causes a bus time-out and the processing routine is finished as an error.

For such a competition of the accesses in the specific cache unit, according to the invention, a flag is set so that the retry transmitted by receiving the remote command during the accessing process and an address register to hold the access address at that time are provided in each processor element of the processor module. For a period of time, during which the flag, indicates that the retry was instructed, the remote command is valid, the retry is then transmitted without accepting all of the access requests other than the same remote command as that of the access address set in the address register. Therefore, when the accesses by the remote command compete on the snoop bus 22 of the processor module during the internal access, the retry only transmitted once. However, with respect to the remote command by the retry at the second time, all of the other accesses are refused. Therefore, a process in which the access by the remote command at the second time is preferentially accepted can be performed.

Figure 36:
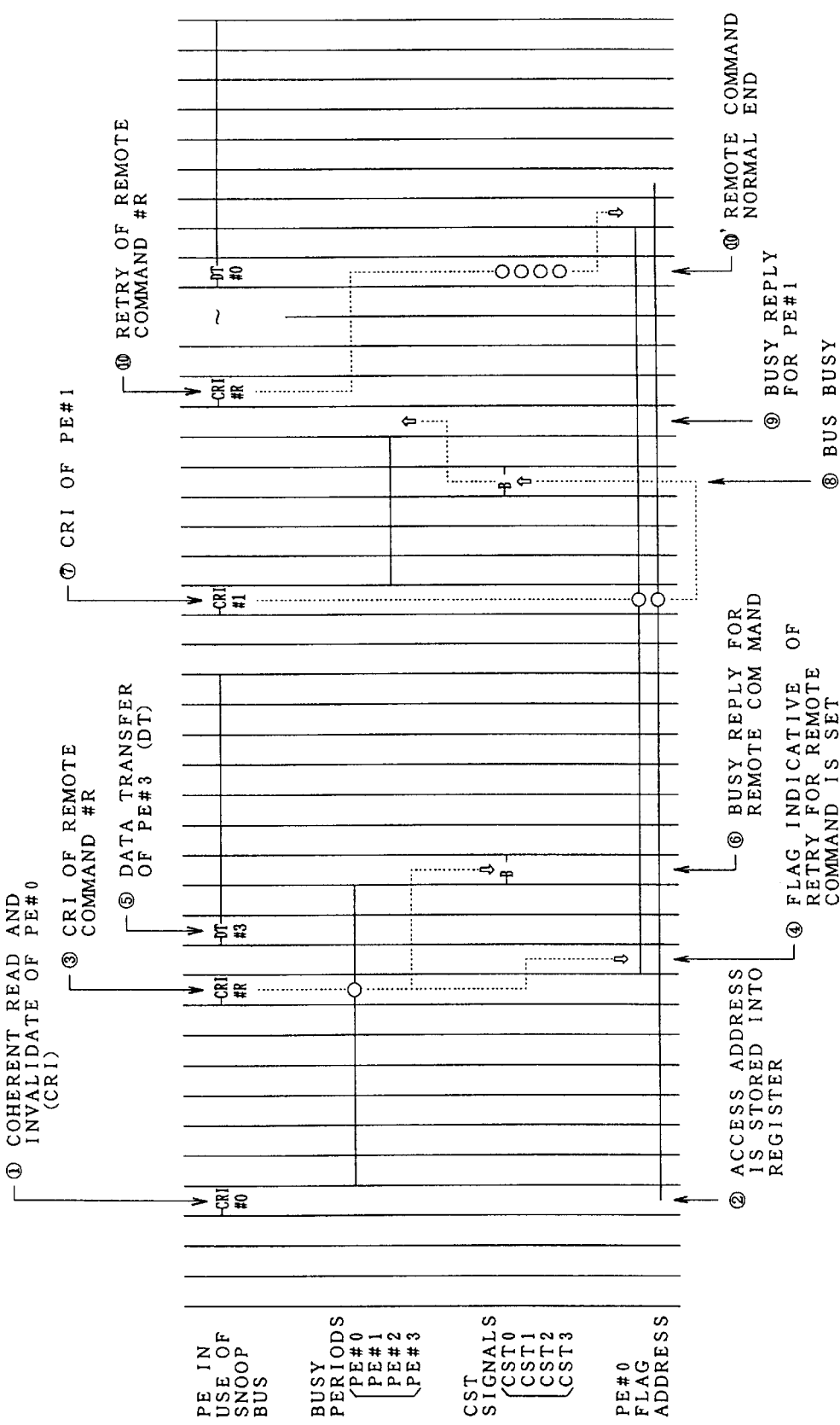
FIG. 36 is a time chart for processes of the present invention in the case where a retry instruction to a remote command is set once and is preferentially accepted.

FIG. 36 is a time chart for the processing operation according to the invention in the case where a flag for preferentially accepting the access of the remote command and the address register are provided for the processor element. In FIG. 36, as shown in (1), when the CRT command by the write privilege of the processor element PE#0 appears on the snoop bus 22, in the processor element PE#0 which generated the CRT command, as shown in (2), the address as an accessing target on the processor element PE#3 side is stored into the register. When the CRI command of the remote command #R appears as shown in (3) for the busy period of time of the processor element PE#0 in association with the CRI command of the processor element PE#0, the flag indicating that the retry instruction for the remote command #R was performed is set as shown in (4). With respect to the remote command #R on the first occurrence, the retry instruction by the busy reply is executed in (6) in a manner similar to FIG. 35. Subsequently, the data transfer from the processor element PE#3 of the access requesting destination in(5) is executed. It is assumed that after the use of the snoop bus 22 was cancelled, the CRI command is generated to the same address as that of the same processor element PE#3 from the different processor element PE#1 as shown in (6). On the other hand, the processor element PE#0 is transmitted to retry the remote command #R at the first time the set state of the flag is stored aid help indicating that the retry instruction was performed for the remote command and the access address at that time. Therefore, in response to the CRI command of the processor element PE#1 in (6), a bus busy occurs in (7). Due to the busy reply to the processor element PE#1 in (8), the retry is transmitted and the access request is refused. Subsequently, when the remote command #R due to the retry appears in (9), since the processor element PE#0 of the access requesting destination is in the empty state in this instance, the process by the CRI command of the remote command #R is accepted and the data transfer to the remote side is executed. When the data transfer is started, at the subsequent timing, as shown in (10), the flag and access addresses stored in the processor element #0 are sequentially initialized and cancelled and the preferential acceptance for the remote command #R which performed the retry is cancelled. The time chart of FIG. 36 shows the competition of the remote command from the external processor module and the access command of the internal processor element as an example. However, with regard to a competition of the access commands of the internal processor elements, the subsequent access command executes the retry once by similar processes. However, with respect to the second time, the access command is preferentially accepted and the competition of the accesses for the cache coherence on the snoop bus 22 can be properly adjusted.

Write Ownership of Copy Back

Figures 37, 38:
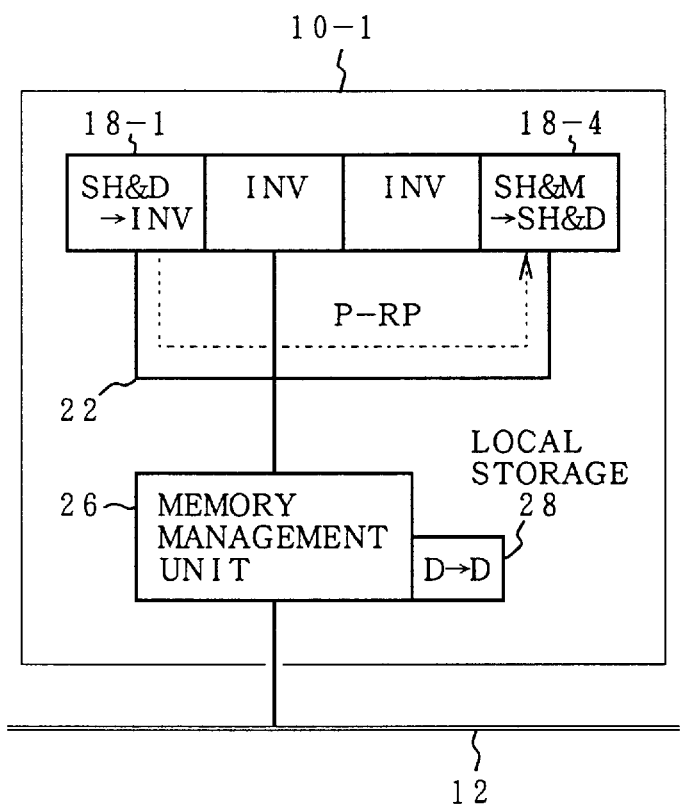
FIG. 37 is an explanatory diagram for a movement of a write privilege (owner) which is executed between the cache units of the processor module of the present invention.
FIG. 38 is an explanatory diagram of the order for transmitting the write privilege of the present invention.

FIG. 37 shows a protocol regarding the movement of the write privilege for copying back the newest data held in any one of the cache units of processor module 10-1 into the local storage 28 as a distributed main storage when a replacement of the newest data occurs. In the processor module 10-1, it is assumed that the data in the local storage 28 is not the newest data but exists in cache units 18-1 and 18-4 among the four cache units connected to the memory management unit 26 by the snoop bus 22 Further, it is also assumed that in the cache units 18-1 and 18-4 which share the same newest data, the cache unit 18-1 possesses the write ownership to copy back the newest data into the local storage 28. In this instance, the cache state of the cache unit 18-1 having the newest data and the write privilege is expressed by "shared & dirty" state and the cache state of the cache unit 18-4 which has the newest data but doesn't have the write privilege is expressed by "shared & modified" state. Further, in the memory management unit 26, the target data of the local storage 28 is in a "dirty" state. The cache unit 18-1 having the write privilege to copy, back to the local storage 28 is called an owner. In such a cache state in the processor module 10-1 in FIG. 37, it is now assumed that the newest data of the cache unit 18-1 having the write privilege as an owner was replaced by the operation of the processor due to an abandonment of the data or the like. In association with the replacement, a replace command P-RP is generated to the snoop bus 22 The cache unit 18-1 having the write privilege is shifted to the "invalid" state. On the other hand, the cache unit 18-4 which has the newest data but doesn't have the write privilege becomes the owner by receiving the movement of the write privilege on the basis of the replace command P-RP transmitted onto the snoop bus 22 and is shifted to the "shared & dirty" state. Therefore, even if the newest data is replaced by the memory unit 18-1, the write privilege is moved to another cache unit 18-4 and the copy back of the newest data to the local storage 28 is not performed at this time point. when a replacement occurs in the cache unit 18-4 due to a similar processor operation after the write privilege was moved, since the write privilege cannot be moved to the other memory unit in this case, the newest data is copied back to the local storage 28. When the write privilege is moved from the cache unit 18-1 to the cache unit 18-4, although the memory management unit 26 is "dirty, with respect to the data as a target of the movement of the write privilege, even if the movement of the write privilege is performed between the cache units 18-1 and 18-4, the "dirty" state is maintained as it is. The "dirty" state of the memory management unit 26 is reset only when the cache line having the newest data is moved to the other processor module. When the newest data is copied back to the local storage 28, the "dirty" state is shifted to a "clean" state. FIG. 37 shows the case where the newest data of the local storage 28 exists in two out of the four cache units 18-1 to 18-4 as an example. However, in the case where the newest data exists in three or four cache units, the write privilege is transferred among a plurality of cache units. Therefore, in this case, the write privilege is transferred, for example, in accordance with a predetermined order as shown in FIG. 38.

FIG. 38 shows identification numbers of the cache units 18-1 to 18-4 by #0 to #3. The cache unit which has the write privilege and was replaced is used as an index and the order to shift the write privilege for the three remaining cache units is shown. For example, in the case where the cache unit #0 possesses the write privilege and the newest data exists in the other three cache units #1 to #3, if a replacement of the cache unit #0 occurs, the priorities to shift the write privilege is set to the order of #1, #2, and #3. Therefore, the write privilege is moved to the cache unit #1 having the highest priority. Subsequently, the write privilege is shifted to the cache unit #2 and is finally moved to the cache unit #3. The order of the cache units for movement of the write privilege can be also properly set without limiting it to the unit identification numbers shown in FIG. 38.

System Common Bus

Figure 39:
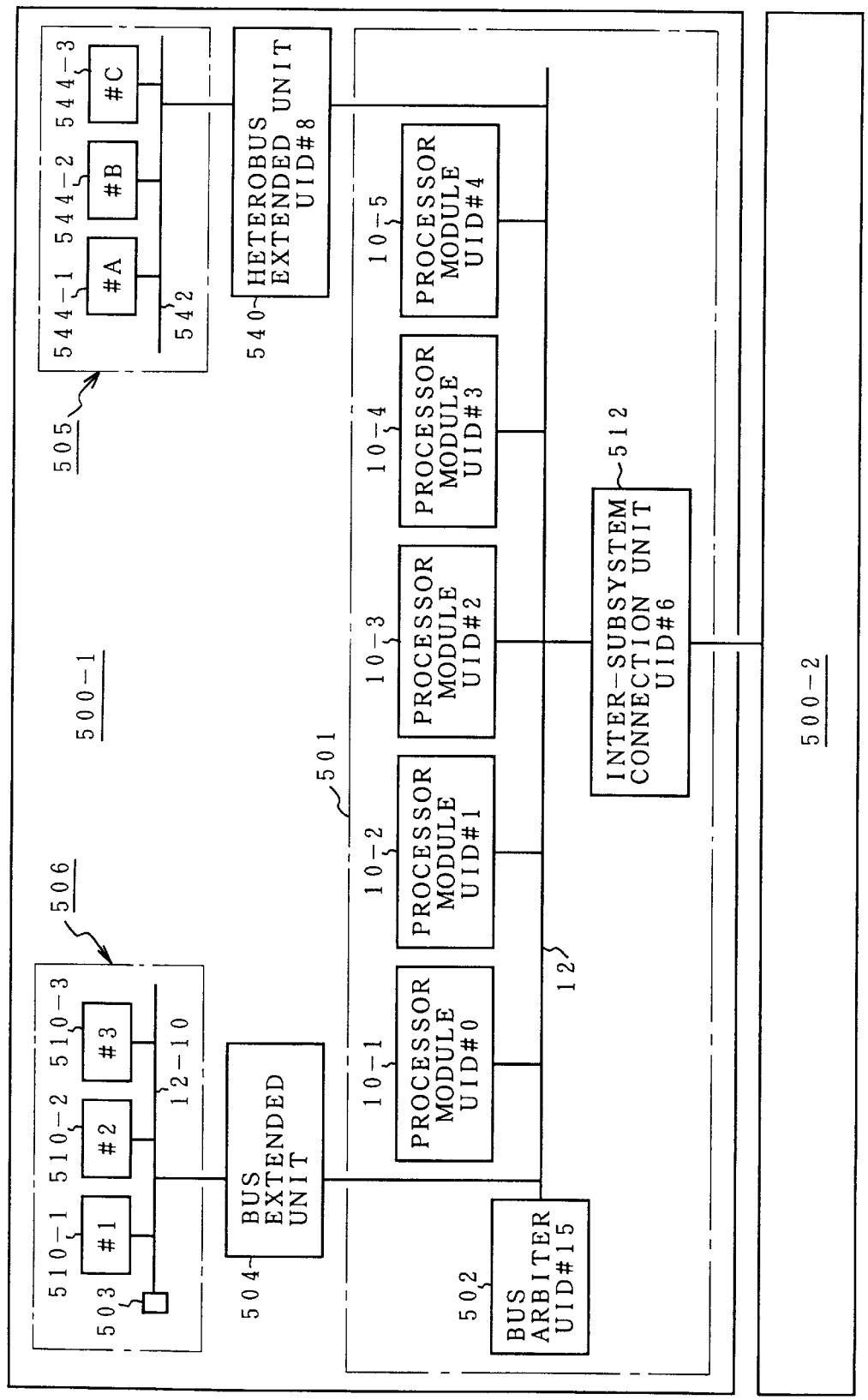
FIG. 39 is an explanatory diagram of a system construction extended on the basis of the cache coherence apparatus of FIG. 3.

FIG. 39 is a architectural diagram of a subsystem based on the cache coherence apparatus according to the invention in FIG. 3. In subsystem 500-1, as basic system 501, for example, the five processor modules 10-1 to 10-5 are connected by the system bus 12 as a second common bus. A bus arbiter 502 performs bus arbitration is provided for the system bus 12. An extended system 506 in which, for example, three processor modules 510-1 to 510-3 are connected to a system bus 12-10 having a bus arbiter 503 is connected to the basic system 501. For the basic system 501, the extended system 506 uses a bus arbiter and processor modules with the same construction. Further, a heterosystem 505 is connected to the system bus 12 of the basic system 501 through a heterobus extended unit 540. Proper processing units 544-1 to 544-3 are connected to the heterosystem 505 by a system bus 542.The heterosystem 505 is a system which is different from the basic system 501 and extended system 506 to realize the cache coherence apparatus according to the invention and, for example, constructs an I/O system for an external storage device. For the subsystem 500-1, another subsystem 500-2 having the same construction can be extended. The subsystem 500-1 can be connected to the subsystem 500-2 extended by an inter-subsystem connection unit 512. In a manner similar to the subsystem 500-1 side, the subsystem 500-2 side is also connected to a system bus through the inter-subsystem connection unit. For example, up to sixteen modules or units can be connected to the system bus 12 of the basic unit 501. In the embodiment, total eight units comprising five processor modules 10-1 to 10-5, inter-subsystem connection unit 512, heterobus extended unit 540, and bus arbiter 502 are connected to the system bus. Unit IDs #0 to #15 are allocated to the modules or units which can be connected to the system bus 12. For example, the unit IDs (UIDS) #0 to #4 are allocated to the processor modules 10-1 to 10-5. The unit ID #6 is allocated to the inter-subsystem connection unit 512. The unit ID #8 is allocated to the heterobus extended unit 510. Further, a unit ID #16 is allocated to the bus arbiter 502. The remaining unit IDs are empty. A bus extended unit 504 is a mere interface between the system buses 12 and there is no need to designate the unit ID. Sixteen unit IDs which are unique to the system bus 12-10 are properly allocated to the bus arbiter 502 and processor modules 510-1 to 510-3 connected to the system bus 12-10 of the extended system 506 connected through the bus extended unit 504. Further, unit IDs #A, #B, and #C which are unique to the heterosystems that are different from the basic system 501 and extended system 506 are allocated to the heterosystem 505.

Figure 40:
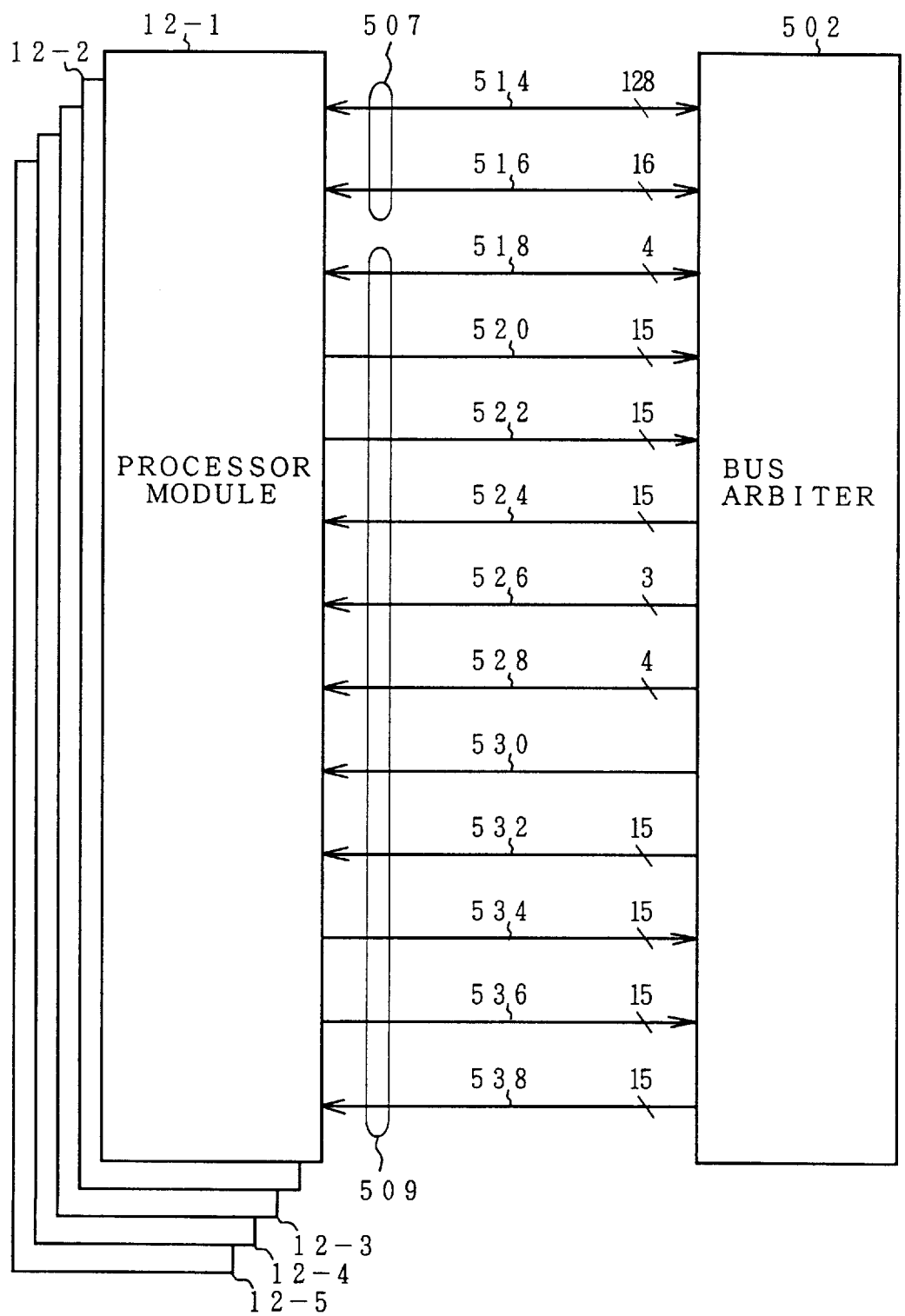
FIG. 40 is an explanatory diagram of a line construction of a system bus in FIG. 39.

FIG. 40 shows a construction of signal lines of the system bus 12 provided for the basic system 501 in FIG. 39. Fundamentally, a bus data line 507 and a tag control line 509 are provided between the processor modules 12-1 to 12-5 and the bus arbiter 502. A common data bus line 514 and a data parity line 516 are included in the bus data line 507. The common data bus line 514 is constructed by, for example, 128 lines. Now, assuming that one byte consists of eight bits, the common data bus line 514 can transfer bit data of 16 bytes in parallel. The data parity line 516 comprises sixteen lines and transfers a data parity of one byte. The tag control line is constructed comprising a bus request line 520, an emergency bus request line 522, a bus grant line 524, a bus ID line 526, a unit ID line 528, a halt line 530, a master right change-over line 532, an installation line 534, a disconnection notification line 536, and a clock line 538.

The construction of the data bus 12 of FIG. 40 will be further described in detail. First, the common data bus line 514 and data parity line 516 are commonly connected to all of the processor modules 2-1 to 12-5 and bus arbiter 502. These lines transmit in parallel and receive data by bidirectionally transmitting data of 128 bits (16 bytes) and parity of 16 bits (one byte). A common tag bus line 518 is constructed by four lines and is commonly connected to all of the processor modules 12-1 to 12-5 and bus arbiter 502. By referring to a signal on the common tag bus line 518, the kind of data on the common data bus line 514 in a bus cycle at that time can be known. FIG. 41 shows the kinds of data on the common data bus line 128 shown by the common tag bus line 518.

In FIG. 41, a tag bus code (TB code) designates the operation in each bus clock cycle of the common data bus line 514 by a code of three bits. Signal states of the common tag bus line 518 is referenced by a bus master serving as a transmitting source and a bus slave serving as a destination in the processor modules 12-1 to 12-5 and, further, by the bus arbiter 502. A switching of a bus grant (use permission), a switching of a bus cycle, and a control of a data reception, which will be obviously described herein later, are executed. A tag bus code No. 0 indicates the end of command and the continuation of the bus usage privilege. A tag bus code No. 1 denotes the end of command and the end of the bus use privilege. A tag bus code No. 2 denotes the continuation of the command. A tag bus code No. 3 denotes the retry (invalidation) and the end of the bus use privilege. A tag bus code No. 4 denotes a single word command and the continuation of the bus usage privilege. A tag bus code No. 5 denotes a single word command and the end of the bus usage privilege. A tag bus code No. 6 denotes the start of a multi-word command and the continuation of the bus usage privilege if necessary. A tag bus code No. 7 denotes an idle cycle. The "single word command" denotes a command to finish the packet transfer on one bus clock cycle. On the other hand, the "multi-word command" denotes a command which needs the packet transfer in a plurality of bus clock cycles. The end of the bus usage privilege" denotes that the bus usage privilege is released in the bus cycle of the tag bus code indicative of it and the bus is released to the other bus use requesting units. The "continuation of the bus usage privilege" denotes that the bus is also continuously used in the next cycle of the bus cycle shown by the tag bus code. Further, a "retry" denotes that the bus cycle (bus command) shown by the tag bus code is forcedly finished and a retry is performed. In this instance, the bus slave resigns the bus command in which the retry was instructed. Whether the retry is executed or not depends on an implement of the system. Further, an idle cycle, indicates a state in which any one of the units doesn't use the bus. In this instance, the bus slave side ignores the bus cycle serving as an idle cycle.

The bus request line 520 and emergency bus request line 522 in FIG. 40 will now be described. The bus request line 520 and emergency bus request line 522 are constructed by fifteen signal lines, respectively, and are connected between the processor modules 12-1 to 12-5 and the bus arbiter 502 in a one-to-one correspondence manner. A bus transfer is requested to the bus arbiter 502 from the processor modules 12-1 to 12-5 side. As for an ordinary transfer request, the transfer request is performed by only the bus request line 520. On the other hand, in case of emergency such that an abnormality is detected or the like, the transfer request is performed by using both of the bus request line 520 and emergency bus request line 522. FIG. 42 shows request items to the bus arbiter 502 by a combination of the bus request line 520 and the emergency bus request line 522. First, when both of a bus request BRQ and an emergency bus request BRE are at the L level, this means that the unit of the slot of a unit ID #N is in an inoperative state. Second, when only the emergency bus request BRE is set to the H level, there is no bus request. In this case, the unit which doesn't perform a bus request at present asserted only the emergency bus request. Third, when only the bus request BRQ is set to the H level, an ordinary bus request is performed and is an ordinary bus request other than the emergency bus request. Fourth, when both of the bus request BRQ and emergency bus request BRE are set to the H level, an emergency bus request is performed. When a bus slave detects an error, the emergency bus request is performed to get the bus for an error reply.

Referring again to FIG. 40, the next bus grant line 524 is connected between the bus arbiter 502 and each of the processor modules 10-1 to 10-5 in a one-to- one correspondence manner. By setting the signal on the bus grant line 524 to the H level by the bus arbiter 502, it is shown that the use permission of the bus was given. The bus ID line 526 sets the number of the system bus 12 to which the processor modules 10-1 to 10-5 and bus arbiter 502 are connected. The same value is set to all of the units connected to the same system bus. In the system construction of FIG. 39, a bus ID #1 is set to the system bus 102 of the basic system 501.On the other hand, a bus ID #2 is set to the system bus 12-10 of the extended system 506 connected through the bus extended unit 504.

The unit ID line 528 in FIG. 40 will now be described. The unit ID line 528 sets the ID numbers of the bus arbiter 502 and processor modules 10-1 to 10-5 on the bus. In FIG. 39, the unit IDs #1 to #5 are set into the processor modules 10-1 to 10-5 and the unit ID #16 is set into the bus arbiter 502. Therefore, the numbers of the processor modules 10-1 to 10-5 and bus arbiter 502 in the whole system are unconditionally determined by a combination of the bus ID and unit ID by the bus ID line 526 and unit ID line 528.

The halt line 530 and master right change-over line 532 in FIG. 40 will now be described. The halt line 5302 is connected from the bus arbiter 502 to all of the units including the processor modules 10-1 to 10-5 by, for example, nine kinds. By setting the halt line 530 to the H level, it is shown that the bus arbiter 502 detects a fault in itself and is in a halt state. The master right change-over line 532 is commonly connected to all units including the processor modules 10-1 to 10-5 from the bus arbiter 502 and is used together with the halt line 530 for a bus arbitrating process. The bus arbitrating process by the combination of the signals of the halt line 530 and master right change-over line 532 is as shown in FIG. 43. In FIG. 43, first, a state in which a halt (HLT) is at the H level and a master force change (MFC) is at the L level denotes that the bus arbiter 502 is not installed. Second, when both of the halt (HLT) and master force change MFC are at the H level, a halt of the bus arbiter 502 is notified, namely, an error occurs by a self-diagnosis or the like of the bus arbiter 502 and the bus arbiter 502 is in the halt state is notified. Third, when both of the halt (HLT) and master force change MFC are at the L level, this means an ordinary change-over of a bus grant BGR and denotes a timing for switching the bus grant BGR in the case where the end of the bus cycle is detected when the bus arbiter 502 holds the bus request. Lastly, a state in which the halt (HLT) is at the L level and the master force change MFC is at the H level denotes a forced switching of the bus grant BGR. A bus grant change-over timing in the case where the bus arbiter 502 holds the bus request and the bus is not used is given.

Referring again to FIG. 40, the installation line 534 is connected between each unit including the processor modules 10-1 to 10-5 and the bus arbiter 502 in a one-to-one correspondence manner. By setting the installation line 534 to the L level, a fact. -that the unit has been installed is notified to the bus arbiter 502. Further, the disconnection notification line 536 is connected between each unit including the processor modules 10-1 to 10-5 and the bus arbiter 502 in a one- to-one correspondence manner. By setting the disconnection notification line 536 to the L level, a fact that the unit is disconnected from the system bus 12 is notified to the bus arbiter 502.

Bus Arbitration

Bus arbitration of the system bus 12 accomplish through the bus data line 507 and tag control line 509 in FIG. 40 will now be described. As a bus arbitration of the system bus of the invention, there are two modes of a fast mode and a safety mode. First, as a preferential bus arbitration, the bus arbitration is divided into a case where the bus slave requests the preferential bus arbitration and a case where the bus arbiter requests the preferential bus arbitration.

FIG. 44 is a time chart for arbitration in the fast mode. The abscissa axis indicates bus clock cycles T1, T2, T3, etc. The ordinate axis indicates the internal operation of the bus arbiter 502 and interface signals on the system bus 12. A holding operation of a bus request is performed as an internal operation of the bus arbiter 502. Interface signals on the system bus 12 indicate a bus request, a bus grant, a tag bus, and a data bus. First, it is assumed that in a cycle T1, an assertion of one cycle of a bus request signal was performed from the units of the unit IDs #0 and #1 as shown in (1). In this instance, since the data bus is in an idle state, the bus arbiter 502 monitors for bus request from all of the bus requesting sources. When two bus request signals of the unit IDS #0 and #1 are asserted as shown in (1), all of the requests are held in the next cycle T2 as shown in (2). When there are a plurality of bus requests, it is assumed that the unit having a smaller ID number has a higher priority. Therefore, the bus arbiter 502 asserts the bus grant signal for the unit ID #0 of a high priority from the idle state together with the master right change-over signal as shown in (3). Subsequently in the next cycle T3, the bus arbiter 502 resigns the holding request of the bus request of the unit ID #0 in which the bus usage privilege is permitted. At the same time, when there is another holding request, the bus grant signal is switched. In this instance, since there is a holding request for unit ID #1, the bus request signal is switched to unit ID #1. As mentioned above, the unit of the unit ID #0 as a bus master which received the permission by the bus grant signal and master right change-over signal from the bus arbiter 502 starts the data transfer from the next cycle T3. From the cycle T3, a tag bus signal indicates any one of a tag bus code 010, 100, or 110 (CC, SC & C, MC & S) in FIG. 41. In this case, since data is transmitted in a plurality of bus clock cycles, the tag bus code is equal to 110 (MC & S) and the multi-word command is started. If a bus sequence indicates an END by the tag bus as shown in, for example, a cycle T5 during the data transfer from the cycle T3, as shown in (4), the bus mater is switched to the unit ID #1 in accordance with the bus grant signal at that time. The data transfer from the unit of the unit ID #1 which became the bus master is started from the next cycle T6. A tag bus code of the tag bus indicative of the end of the data transfer is equal to any one of 001, 011, and 101 (CE & E, retry, SC & E) in FIG. 41. On the other hand, during the process of the bus request from the unit ID #1 which has once been held in the cycle T2, for example, when the bus arbiter 502 detects a bus requests from the other units IDs #0 and #2 as shown in the cycles T3 and T4, those bus requests are separately stored. As shown in the cycle T5, at a timing of the end notification by the tag bus when there is no holding request, new bus requests of the units IDs #0 and #2 are held as shown in (5). Further, the second bus request from the unit ID #0 in the cycle T4 relates to a single command. Therefore, when the data transfer of the unit ID #1 is finished in a cycle T8, the data transfer of the single command of the unit ID #0 is executed in the next cycle T9 prior to the bus request of the lower unit ID #2 which was generated in the cycle T3. Since the data transfer of the single command also denotes the end of the transfer, the holding operation of the bus request executed by the unit ID #1 in the cycle T6 is performed as shown in (6) in a cycle T10- In the bus arbitration in the fast mode, so long as the bus request is held in the bus arbiter 502, the bus transfer is continuously executed without causing an empty cycle on the data bus. Since an empty cycle is not created, bus transfer speed can be increased.

Figure 45:
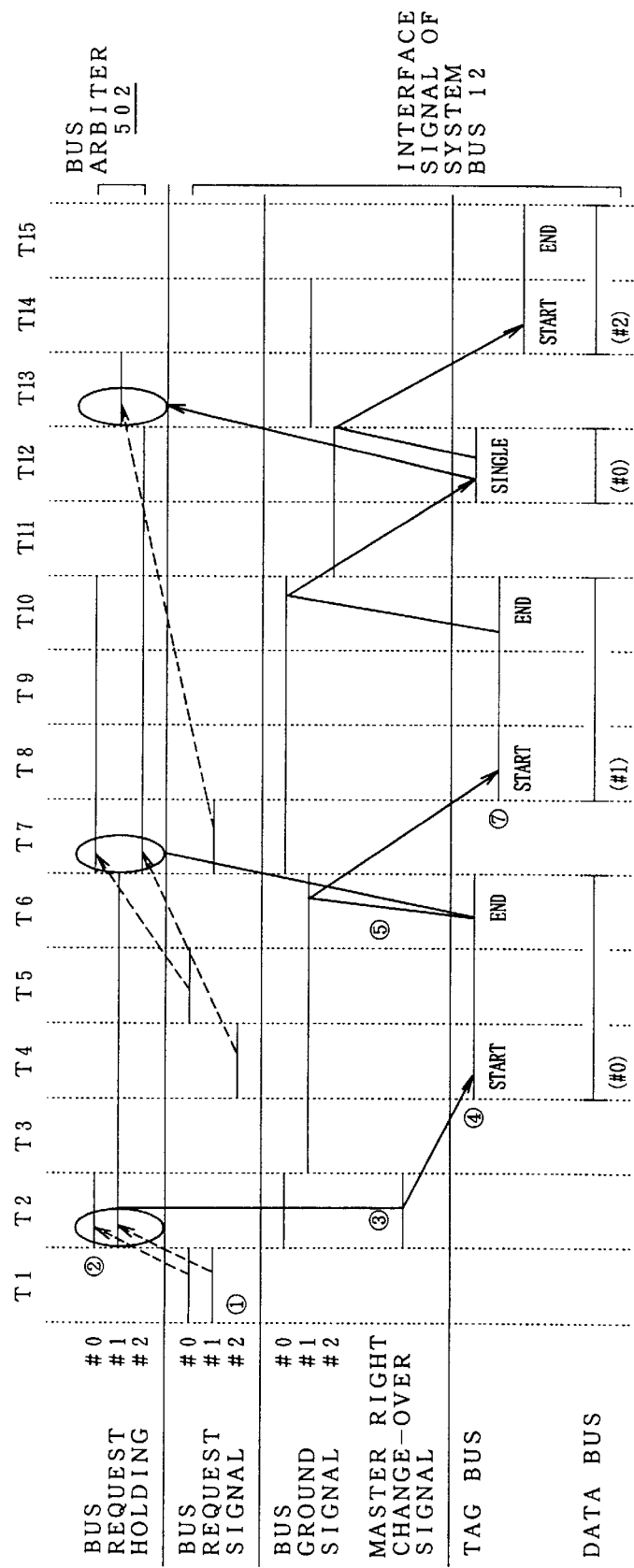
FIG. 45 is a time chart for a bus arbitration in a safety mode of the system bus in FIG. 40.

FIG. 45 is a time chart in the safety mode in the bus arbitration of the invention. In the time chart in the safety mode as well, a case where the bus request by the units IDs #0 to #2 is executed in a manner similar to the fast mode in FIG. 44 is shown as an example. In the safety mode, after the unit ID acting as a bus master received permission by the assertion of the bus grant signal and master right change-over signal from the bus arbiter 502, the data transfer is started after the elapse of one idle cycle. Namely, for the bus request in (1) in the cycle TI, the bus request of the bus arbiter 502 is held in the cycle T2 as shown in (2). When the bus grant signal for the unit ID #0 of higher priority and, further, a master change-over signal are asserted as shown in (3), the next cycle T3 is set to an idle cycle and, after that, the data transfer is started from the cycle T4. The idle cycle of the cycle T3 is a period of time for stabilizing a transient state of the tag bus. All of the units ignore the value of the tag bus in the idle cycle. After completion of the data transfer by the bus master of the unit ID #0 in the cycle T6, with respect to the data transfer by the bus grant signal of the unit ID #1 at that time as well, the data transfer is started as shown in (6) after the elapse of the idle period of time of one cycle in the cycle T7. The operations other than that the idle period of time of one cycle is provided for an interval until the start of the data transfer after the permission of the data transfer was received from the bus arbiter 502 are substantially the same as those in the fast mode in FIG. 44.

Figure 46:
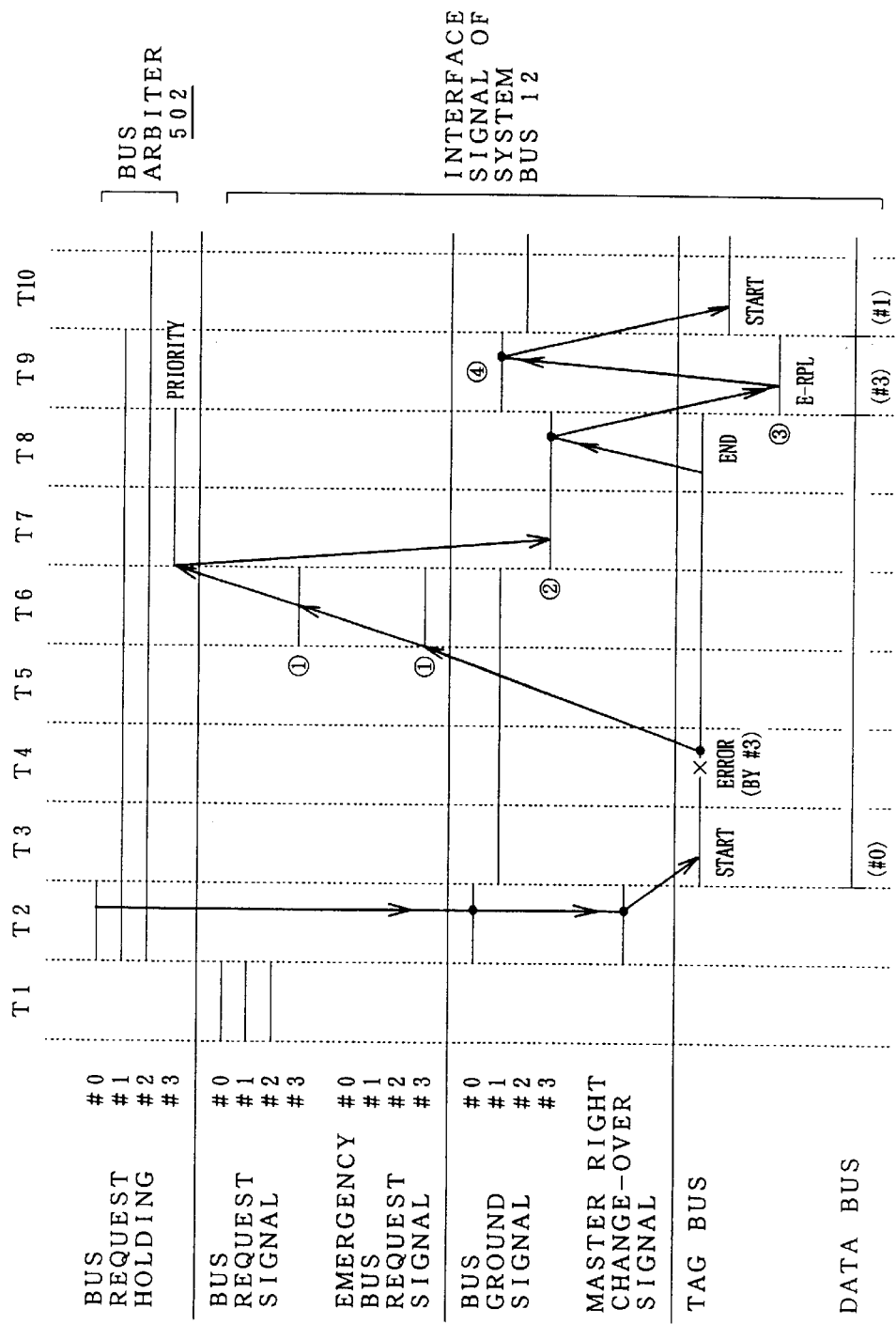
FIG. 46 is a time chart for a preferential bus arbitration when an error is detected in a bus slave of the system bus in FIG. 40.

FIG. 46 is a time chart of a preferential bus arbitration for an error reply operation in the case where the bus slave detected an error during the data transfer. As shown in the cycle T1, it is now assumed that bus requests from the three units of the unit IDs #0 to #2 are simultaneously performed in the idle state and all of the bus requests are held in the bus arbiter 502 in the next cycle T2. In this case, the bus grant signal is generated from the bus arbiter 502 to the unit ID #0 of the highest priority. At the same time, since the master right change-over signal is also asserted, the data transfer is started to, for example, the unit ID #3 as a bus slave from the unit ID #0 of the bus master from the cycle T3. Now, assuming that an error is detected in the unit ID #3 as a bus slave in the cycle T4 during the data transfer, both of the bus request signal and emergency bus request signal are generated as shown in (1) from the unit ID #3 to the bus arbiter 502. The bus arbiter 502 which received the bus request signal and emergency request signal in the cycle T6, the bus request is most preferentially held and, at the same time, the bus grant is switched to the unit ID #3 in which the error was detected in order to early switch the bus as shown in (2). Therefore, when the data transfer is finished in the cycle T8, the unit ID #3 as a bus slave which detected an error in which the bus grant signal is valid is switched to the bus master. In the cycle T9, as shown in (3), an error reply is performed from the unit ID #3 of the bus master which detected an error. In this instance, the holding request of a highest priority in the bus arbiter 502 is resigned and the ordinary arbitration is continued from the next cycle T10. A block detection of a physical buffer full or the like is also included in the error which is detected on the bus slave side. When the error detection is performed on the bus slave side during the bus transfer, the bus slave which forcedly detected the error before switching to the next bus transfer is switched to the bus master and the error reply can be performed. The error during the bus transfer is promptly detected and a countermeasure such as a retry or the like can be executed.

Figure 47:
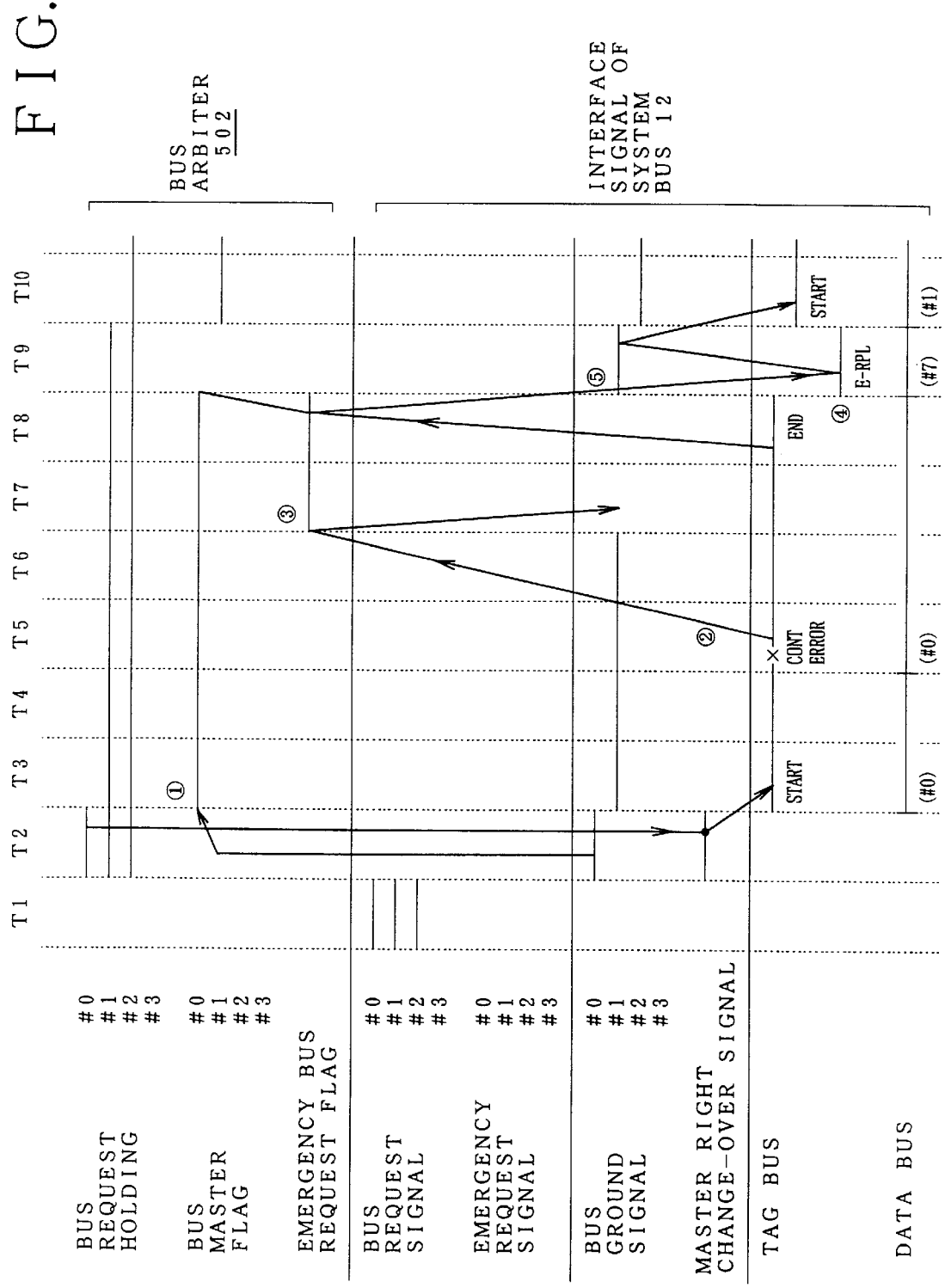
FIG. 47 is a time chart for the preferential bus arbitration when an error is detected in a bus arbiter of the system bus in FIG. 40.

FIG. 47 is a time chart of a preferential bus arbitration for an error reply in the case where the error occurring during the bus transfer, before the bus slave side is decided, is detected by the bus arbiter 502. Namely, in the bus transfer of the invention, a packet transfer of a split type is used and a command word is transferred as a first word of the packet, so that unless the decoding of a destination field of the command word is finished, the bus slave unit is not identified. Until the bus slave unit is identified, an error of the bus transfer is monitored in the bus arbiter 502. When the error is detected, the bus arbiter 502 performs the error reply in place of the slave. in FIG. 47, when there are bus requests from the unit IDS #0 to #2 of the unit #1 in the cycle T1, the arbiter 502 holds all of them in the cycle T2. With respect to unit ID #0 which is the highest priority, the bus grant signal is made valid and the master right change-over signal is asserted. The data transfer is started from the next cycle T3. In the cycle T2, as shown in (1), the bus arbiter 502 has a bus master flag of the unit ID #0 showing the bus master to which the bus use permission was given and holds the bus master flag for a bus cycle period of time in the cycles T3 to T8 of the unit ID #0. When the arbiter 502 detects the error as shown in (2) in the cycle T5 during the data transfer from the unit ID #0 as a bus master, for example, a parity error of the packet header is detected, the error contents are held and, at the same time, the emergency bus request flag is set into the bus arbiter 502 as shown in (3). The cycle T5 in which the error was detected relates to an example in which the unit ID #01 as a bus master detects an error during the transfer of a plurality of continuous bus commands. Subsequently, the bus arbiter 502 masks the other bus requests held at present by the emergency bus request flag (3) which was set, thereby preventing that the bus grant is asserted with respect to the bus requests held. In the cycle T8, when the data transfer in which the bus master is set to the unit ID #0 is detected, the bus arbiter 502 itself is set to the bus master at the bus master change-over timing and transfers the error reply in the cycle T9 as shown in (4). Namely, by the arbitration in the bus arbiter 502 which doesn't appear on the bus, the bus arbiter 502 itself becomes the bus master and executes the error reply. After completion of the error reply of the bus arbiter 502 as mentioned above, the emergency bus request flag and bus master flag set in the bus arbiter 502 are simultaneously terminated. The unit is switched to the unit ID #1 as a next bus master by the bus grant. The ordinary arbitration is executed from the next cycle T10.

Bus Transfer Sequence

Figure 48:
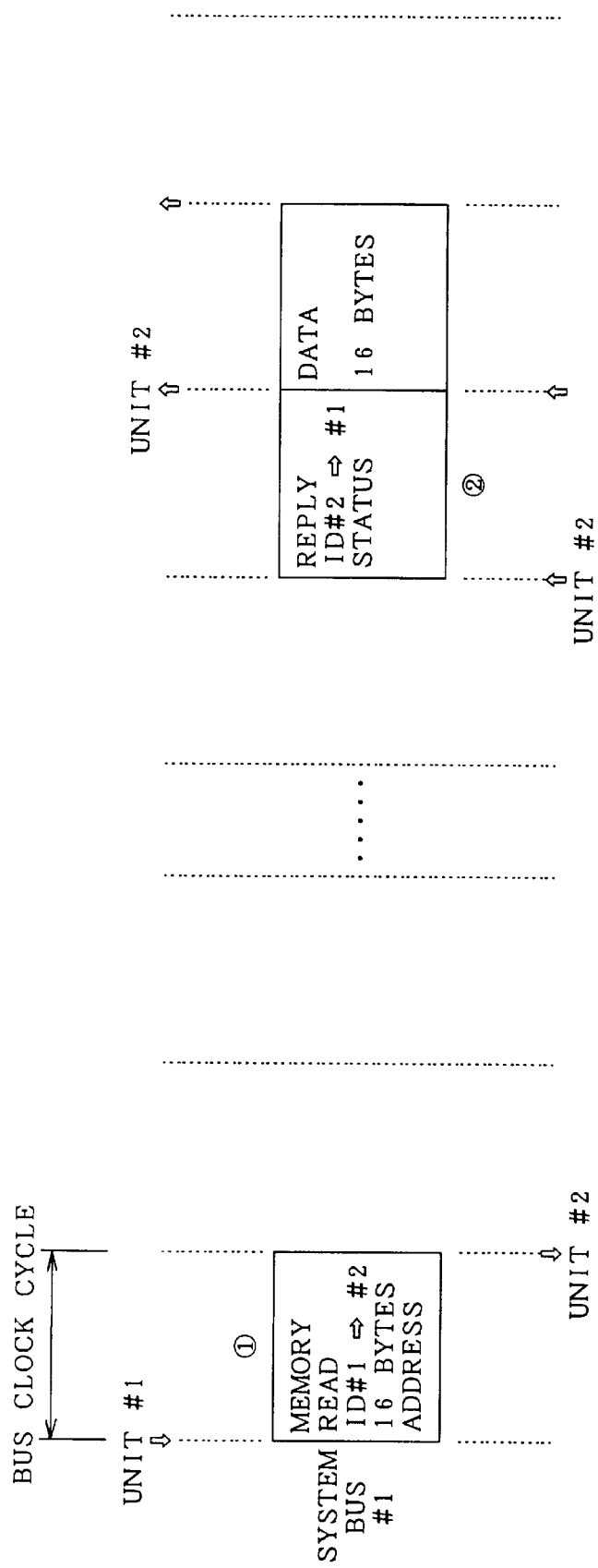
FIG. 48 is a time chart for a transfer sequence of a memory read of the system bus in FIG. 39.

A transfer sequence of the bus command and data on the system bus 12 in FIG. 40 will now be described. FIG. 48 shows a transfer sequence when a read request of the memory is performed from the unit #1 to the unit #2. The unit #1 of the read requesting source assumes the source unit and the unit #2 of the read requesting destination assumes the destination unit. First, the unit #1 of the requesting source transmits a packet header, as a bus command, in which the command contents, requesting source, requesting destination, the number of transfer bytes, and access address are designated. The packet header constructs the first word of the bus command. Specifically, the unit #1 designates a memory read for a command field of the packet header, designates the unit ID #1 serving as a requesting source for the source field, and designates the unit ID #2 of the requesting destination for the destination field. Further, the unit #1 forms and transmits a packet header in which 16 bytes are designated for the field on the side indicative of the number of transfer bytes and an access address is designated for the address field. In the bus transfer of the invention, in addition to the source field indicative of the requesting source and the destination field indicative of the requesting destination, a second destination field indicative of a second requesting destination is provided for the first word of the bus command that is transmitted as a packet header.

The destination field which is ordinarily used is hereinafter referred to as a first destination field. There is also a case where the first destination field is simply called a destination field in the case where there is no designation of the second destination field. The details of the bus command having the source field, first destination field, and second destination field of the first word of the bus command which is transmitted as a packet header will be obviously explained hereinlater.

In the transfer sequence of the memory read in FIG. 48, since there is one destination, the packet header that is transmitted from the unit #1 merely designates the unit ID #2 of the read requesting destination for the first destination field. After completion of the transmission of the packet header from the unit #1, the system bus is released and a bus usage privilege is shifted to the unit which is allocated next. In the unit #2 serving as a read requesting destination, the transfer packet on the system bus is received and the ID of the destination field is identified. In case of the packet in which the its own unit is designated, it is received and the process designated by the reception packet, namely, the reading process of the memory designated by the packet header from the unit #1 is started. When the requested read data can be prepared in the unit #2, the reply bus command and data shown in (2) are formed and returned. As for the first word of the reply bus command, the its unit ID #2 is designated for the source field, the unit ID #1 of the requesting source is designated for the destination field, the reply command is designated for the command field, and further, status information according to the necessity is added to the first word and the resultant word is transmitted. After completion of the transmission of the first word as a packet header of the reply bus command, the data of 16 bytes as the number of bytes designated is subsequently returned. In the embodiment, since the data bus width is equal to 16 bytes, the transfer of the reply bus command of two words is finished in two bus cycles.

Figure 49:
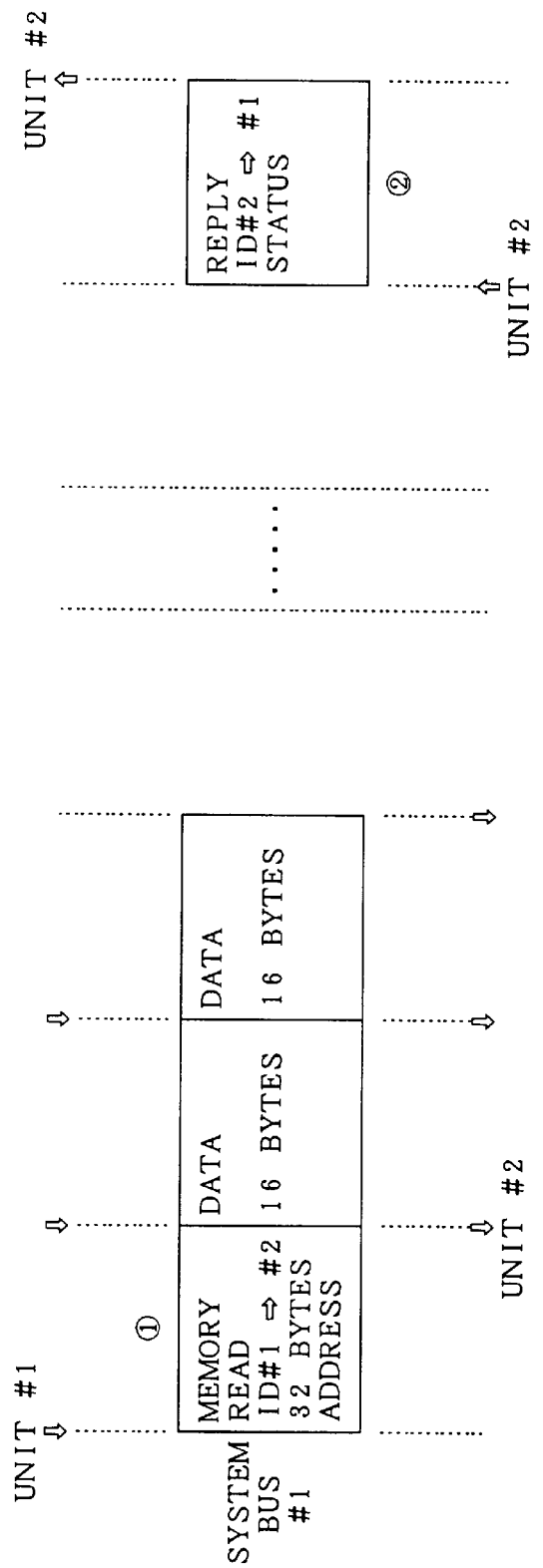
FIG. 49 is a time chart for a transfer sequence of a memory write of the system bus in FIG. 39.

FIG. 49 shows a transfer sequence of the memory write in the system bus of the invention. First, the unit #1 of the write requesting source forms and transfers the packet header serving as a first word of the bus command to the unit #2 serving as a write requesting destination. In case of writing, for example, 32-byte data subsequent to the packet header, the data packets of two words are transferred separately on a 16-byte unit basis. In the packet header of the first word, the source field is set to the unit ID #1, the destination field is set to the unit ID #2 of the write partner destination, a memory write is designated for the command field, and further, a 32-byte address is designated for the address field and transmitted to the bus. In the unit #2 of the write requesting destination, if there is a packet in which the unit ID #2 is designated in the destination field, the packet is received and the writing process designated by the command field is started. After completion of the writing process, as shown in (2), the reply bus command for the unit #1 of the write requesting source is formed and a status of the process is returned. Namely, the reply bus command sets the source field to the unit ID #2, sets the destination field to the unit ID #1 of the write requesting source, and sets the command field to reply. Further, a status indicative of the normal writing operation is set into the status field and is returned.

Figure 50:
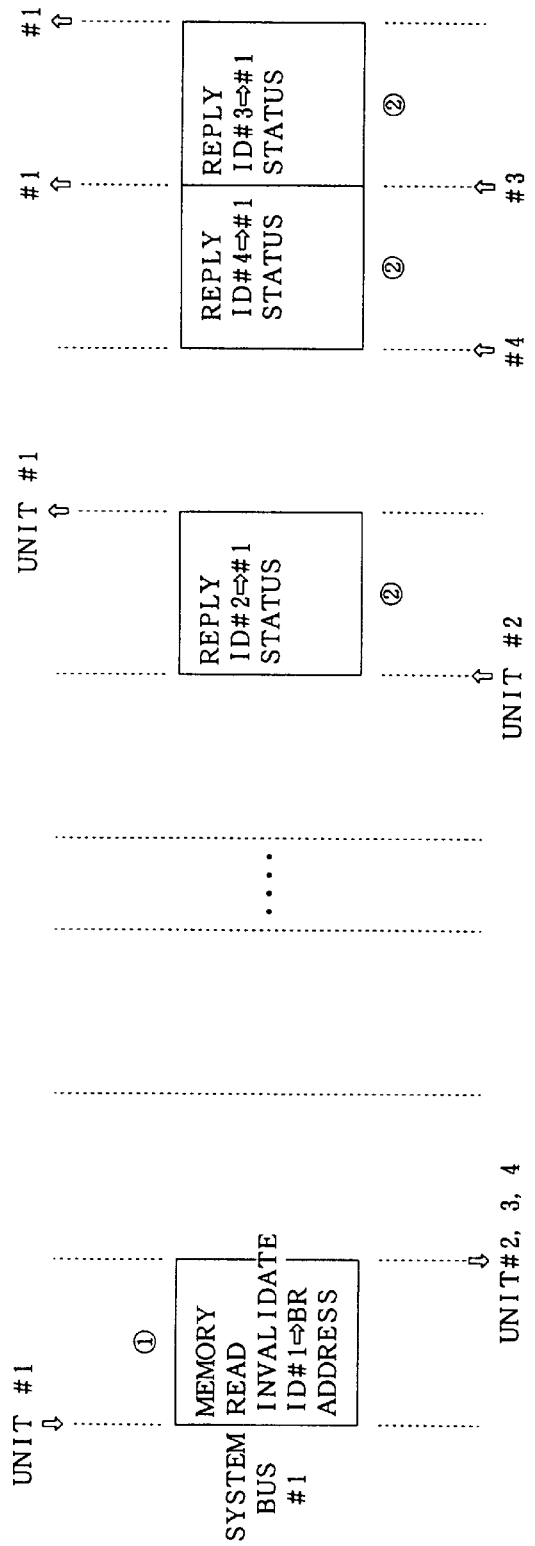
FIG. 50 is a time chart for a transfer sequence of broadcast/broadcall of the system bus in FIG. 39.

FIG. 50 shows a transfer sequence of a broadcast for simultaneously designating a plurality of units connected to the system bus and for transferring data. The example relates to the case where the unit #1 transfers the bus command of the cache invalidation for a cache coherence to the units #2, #3, and #4 as a broadcast bus command. First, with respect to the packet header of the broadcast bus command, the unit #1 of the requesting source of the cache invalidation designates the unit ID #1 of the requesting source for the source field and designates three units #2, #3, and #4 serving as requesting destinations for the broadcast field. Further, the unit #1 designates the cache invalidation for the command field and also designates and transmits an access address. Each of the units #2, #3, and #4 serving as requesting destinations of the cache invalidation receives the broadcast bus command from the unit #1 of the requesting source. When there is a designation in the broadcast field, it is received and the a process of the designated cache invalidation is started. After completion of the cache invalidating process, the reply bus command is transmitted to the unit #1 of the requesting source in accordance with the order of completion. In the example, the cache invalidating processes are finished in accordance with the order of the units #2, #4, and #3 and the reply bus command is returned. For example, in the first unit #2, the source field is set to the unit ID #2, the destination field is set to the unit ID #1 of the requesting source, the reply is designated in the command field, and further, the processing result of the cache invalidation is set into the status field and is returned.

Similar processes shall also apply to the other units #4 and #3. The unit #1 of the requesting source receives the reply bus commands from all of the units #2, #3, and #4 of the requesting destinations. When the unit #1 recognizes the success of the cache invalidation from the status information, the next process is executed.

Figure 51:
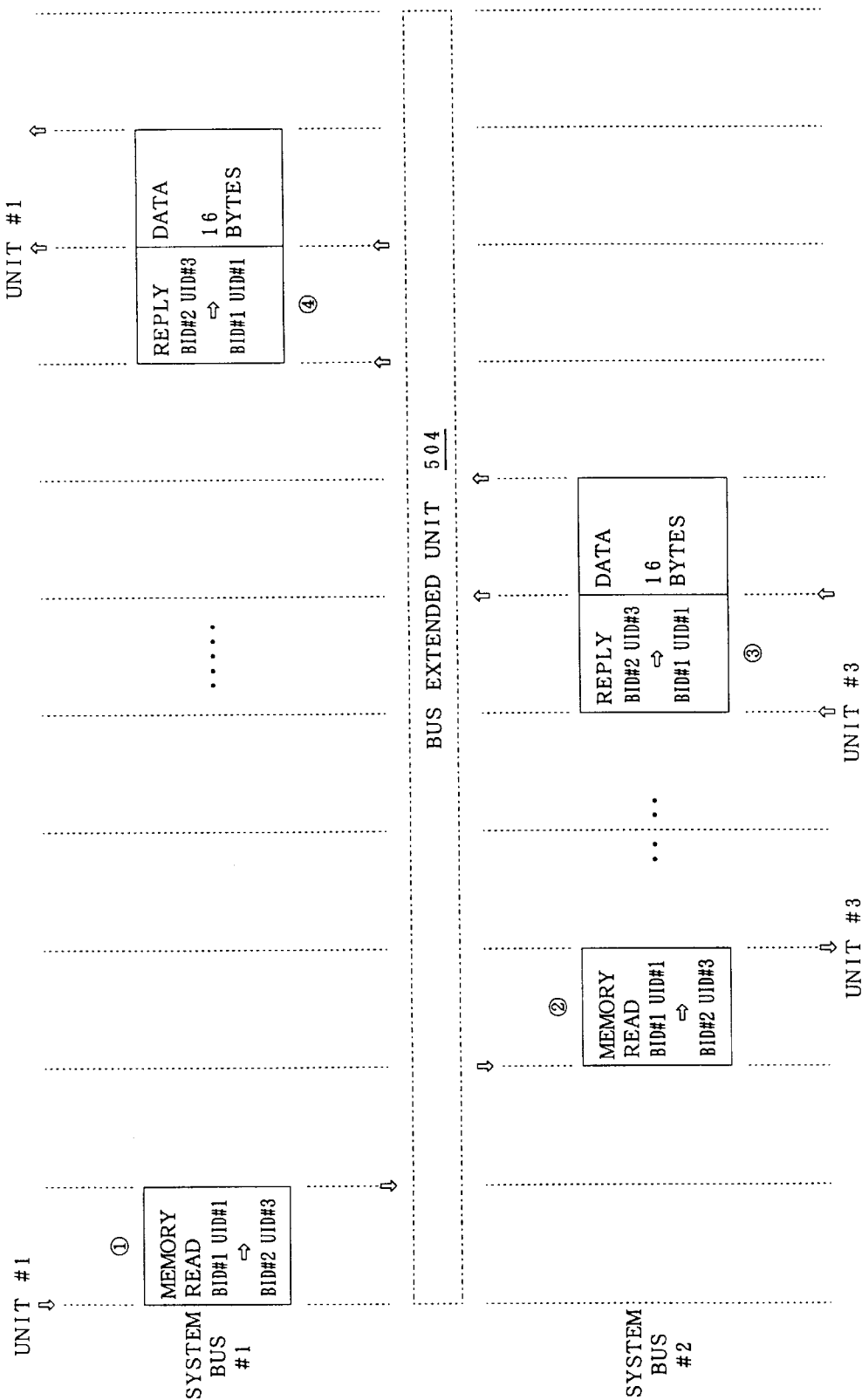
FIG. 51 is a time chart for a transfer sequence between system buses in FIG. 39.

FIG. 51 shows a transfer sequence in case of performing a bus transfer from the unit of the basic system 501 to a unit of the extended system 506 in FIG. 39. FIG. 51 relates to the transfer sequence in the case where a read request is performed from the unit #1 of a system bus #1 in the basic system to the unit #3 of a system bus #2 of the extended system through the bus extended unit 504. First, the unit #1 of the system bus #1 forms a bus command in which the unit #3 of the system bus #2 is set to the requesting destination and transmits as shown in (1). The bus command from the unit #1 designates the bus ID #1 indicative of the system bus of the requesting source and the unit ID #1 showing the unit #1 for the source field. The bus ID #2 indicative of the system bus of the partner destination and the unit ID #3 indicative of the unit of the partner destination are designated for the designation field. As operations other than the above, in a manner similar to the bus command on the same system bus, the memory read is designated for the command field and, further, the number of transfer bytes is designated and transmitted. The bus extended unit 504 receives the bus command from the unit #1 and when recognizing that the bus ID #2 of the destination field of the bus command is a bus to which unit 504 connects and expands, the bus extended unit 504 receives the bus command and generates the same bus command to the system bus #2 as shown in (2). In the unit #3 of the system bus #2, when recognizing that the unit ID of the destination field is its own unit ID #3, the unit #3 receives the bus command and executes the reading process. When the read data can be prepared, as shown in (3), a reply bus command in which the command is set to the first word and the data is set to the second word is transmitted. With respect to the reply bus command as well, the ID #2 of the system bus and the unit ID #3 are designated for the source field. With regard to the destination field, the bus ID #1 of another system bus and the unit ID #1 are designated, a reply is further designated for the command field, and moreover, a status of the reading result is added and the resultant data is transmitted. After completion of the transmission of the first word of the reply bus command, a packet of the 16-byte data of the next second word is transmitted. By receiving the reply command of (3), when the bus extended unit 504 recognizes the system bus #1 which was connected and expanded by itself from the bus ID #1 of the destination field, the same reply command is transferred to the system bus #1. When recognizing the its own destination unit ID #1 from the reply command, unit #1 of the system bus #1 receives the reply bus command, receives the read data of 16 bytes of the next second word, and finishes the processes.

Figure 52:
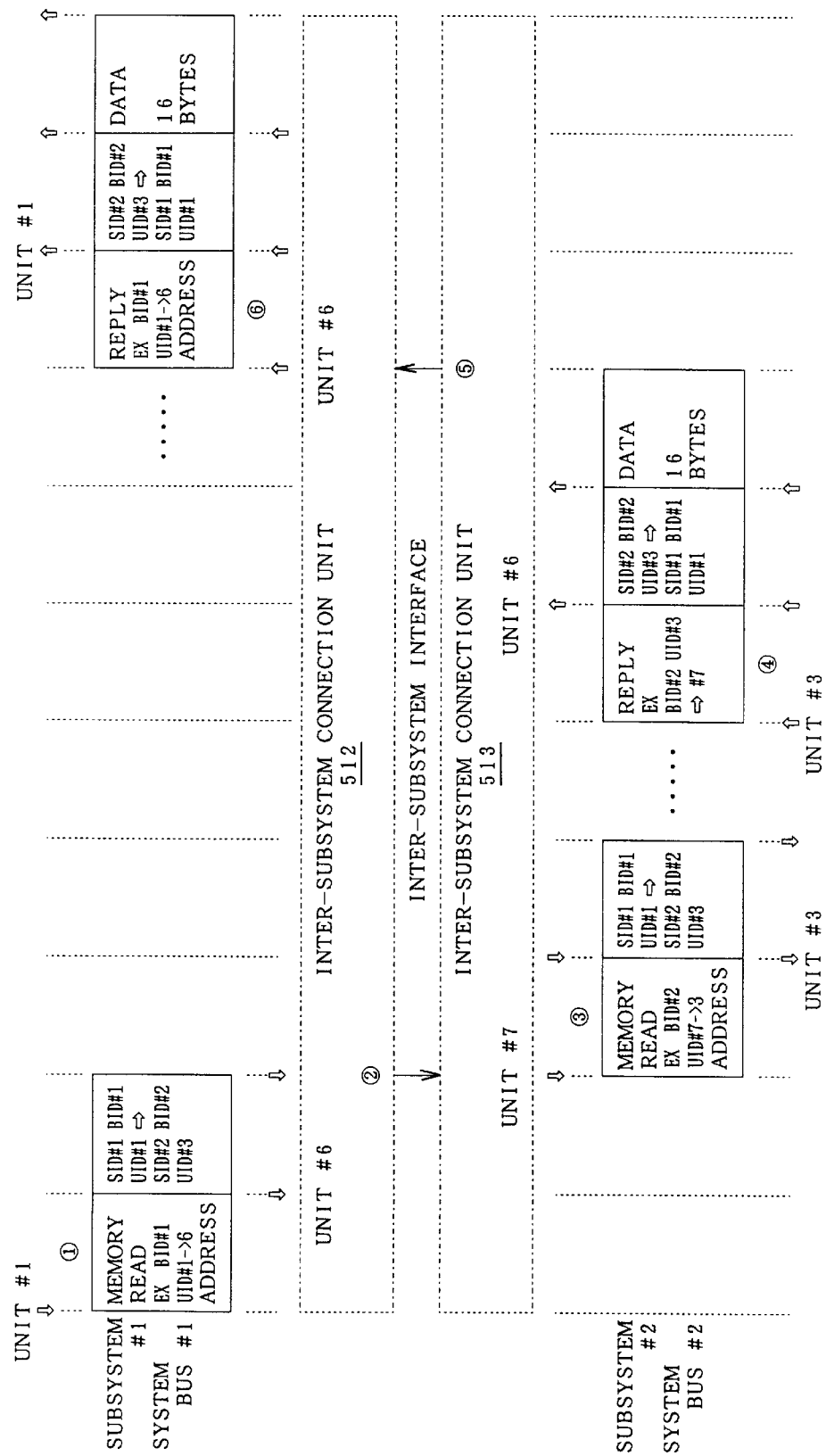
FIG. 52 is a time chart for a transfer sequence between subsystem buses in FIG. 39.

FIG. 52 shows a sequence of a bus transfer via the inter-subsystem connection unit 512 between the subsystems 500-1 and 500-2 in FIG. 39. FIG. 52 relates to the case where a read request is performed from the unit #1 of the subsystem #1 to the unit #3 of another subsystem #2. First, as shown in (1), the unit #1 of the subsystem #1 as a requesting source transmits a bus command for a read request. The bus command is constructed by a bus command of two words using two packet headers. First, an identifier to designate the access of the extended subsystem #2, namely, a subsystem extension identifier EX is designated for the first word of the bus command. Subsequently, the bus ID #1 of the subsystem #1 and the unit ID #1 are set to the source field. The unit ID #6 of the inter-subsystem connection unit 512 for the subsystem #2 is designated by the destination field. Further, a memory read is designated for the command field, an access address is designated for the address field, and further, the number of transfer bytes is designated for the size field (not shown). The next second word is an extended bus command added by the designation of the system bus extension identifier EX. The subsystem ID #1 of the requesting source, bus ID #1, and unit ID #1 are designated for the source field. The subsystem ID #2 of the requesting destination, bus ID #2 of the requesting destination, and unit ID #3 of the requesting destination are designated for the destination field. When the bus command comprising two words is transmitted to the system bus, in the inter-subsystem connection unit 512, the unit ID #6 of the destination field of the first word is recognized and the first and second words of the bus command are received. The same bus command is transferred as it is to an inter-subsystem connection unit 513 provided on the subsystem #2 side. The transfer control is decided by each ID of the second word of the bus command. The inter-subsystem connection unit 513 of the subsystem #2 which received the bus command from the inter-subsystem connection unit 512 of the subsystem #1 changes the unit ID in the source field of the first word of the bus command to the designation of the unit ID #7 of itself. Further, the unit 513 changes the destination field to the designation of the unit ID #3 decoded from the second word and transmits to the system bus #2. The second word of the bus command is transmitted as it is. By receiving the first word of the bus command transmitted from the inter-subsystem connection unit 513, when recognizing that the unit ID of the destination field is the unit ID #3, the unit #3 of the system bus #2 receives the command and, further, also receives the second word. The memory read designated by the command field of the first word is executed with respect to the designated access address. When the read data can be prepared, as shown in (4), the reply bus command is transmitted. The reply bus command sets the subsystem extension identifier EX to the source field of the first word, further, sets the bus ID #2 and unit ID #3, and designates the unit ID #7 of the inter-subsystem connection unit 513 for the destination field. The reply is designated for the command field and the status (not shown) is also set. As for the second word of the reply bus command, the subsystem ID #2, the system bus ID #2, and unit ID #3 are designated for the source field, and with respect to the destination field, the subsystem ID #1 serving as a requesting source, the system bus ID #1, and the unit ID #1 are designated. The data 16 bytes in which the third word is set to the read data is derived. When recognizing the unit ID #7 from the destination field of the first word of the reply bus command sent from the unit #3, the inter-subsystem connection unit 513 receives the bus command and, as shown in (5), transfers the first, second, and third words of the reply bus command to the inter-subsystem connection unit 512 of the subsystem #1 through the inter-subsystem interface. The inter-subsystem connection unit 512 of the subsystem #1 changes the unit ID of the source field of the first word of the reply bus command to the designation of the unit ID #6 and also changes the destination field to the unit ID #1 of the requesting source and transmits to the system bus #1. The changes of the unit IDs of the source field and destination field can be designated and changed by referring to the second word of the received reply bus command. The second word of the reply bus command is transmitted as it is. The data of 16 bytes of the second word is also transferred as it is.

When recognizing the unit ID from the destination field of the first word of the reply bus command, the unit #1 of the subsystem #1 starts the reception of the bus command and receives up to the third word and finishes the processes.

FIG. 53 shows a transfer sequence in the case a width of the system bus of the invention is set to eight bytes. In the system bus of FIG. 40, by setting the number of common data bus lines 514 to 128 lines, the 16-byte transfer is performed. However, there is also a case where the bus of eight bytes as half bytes is also used in dependence on a system. In case of using the 8-byte system bus, the bus transfer in one clock cycle of the 16-byte width described so far is executed by an amount of two bus clocks. FIG. 53 shows a transfer sequence in case of performing a read request from the unit #1 to the unit #2 using the 8-byte bus. The unit #1 transmits the bus command of 16 bytes to the system bus while separating into the first word and the second word of an 8-byte unit. The source field, destination field, command field, and side field are provided for the first word of the 8-byte bus command, respectively. The second word denotes the address field. When the bus command constructed by two words each consisting of eight bytes is transmitted to the system bus, the unit #2 of the requesting destination recognizes the destination unit ID #2 of the first word of the bus command, receives the bus command, and executes the reading operation of the memory with respect to the access address designated by the second word. When the read data can be prepared, the reply bus command is transmitted as shown in (2). In the reply bus command, the first word of eight bytes becomes a packet header. After that, two words of total 16 bytes separately provided every eight bytes are added and are transmitted.

Figure 54:
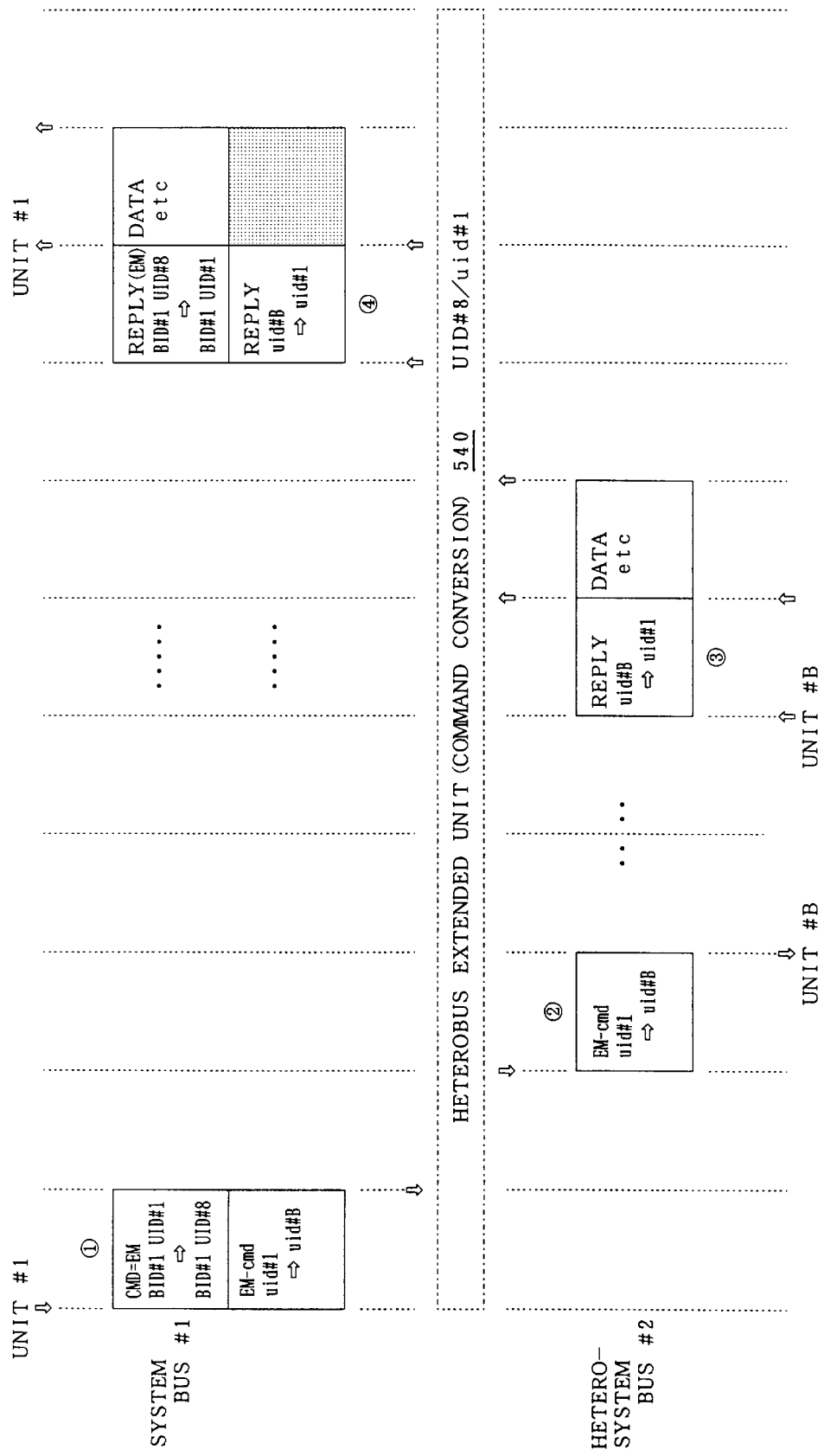
FIG. 54 is a time chart for a transfer sequence between the system bus and a heterosystem bus in FIG. 39.

FIG. 54 shows a bus transfer sequence between the basic system 501 and the heterosystem 505 in the subsystem 500-1 in FIG. 39. In FIG. 54, the system bus #1 of the basic system is connected to the heterosystem bus #2 through the heterobus extended unit 540. A command converting function for converting a command on the system bus #1 side to a command on the heterosystem bus #2 side is provided for the heterobus extended unit 540. It is now assumed that an access request is performed from the unit #1 of the system bus #1 to a unit #B of the heterosystem bus #2. The unit #1 transmits the packet of two words as a bus command as a packet header. In the first word of the bus command, the bus ID #1 and unit ID #1 are designated in the source field. The bus ID #1 and the unit ID #8 of the heterobus extended unit 540 are designated for the destination field. Further, the emulation extended identifier EM to convert to the command system of the heterosystem bus #2 is designated for the command field. The second word is a bus command adapted to heterosystem bus #2. The unit id #1 of the heterobus extended unit 540 in the space of the heterosystem bus #2 is designated for the source field. A unit ID uid #B of the heterosystem bus #2 is designated for the destination field. The bus command of two words transmitted from the unit #1 of the system bus #1 is received by recognizing the unit ID #8 from the destination field of the first word in the heterobus extended unit 540. When recognizing that the command is an emulation command for the heterosystem bus #2 which was connected and extended by the heterobus extended unit 540 itself, only the second word which becomes a command dependent field is transmitted to the heterosystem bus #2 as shown in (2). The unit #B of the heterosystem bus #2 recognizes the destination from the uid #B of the destination field and receives it and executes the process designated by the command field. After completion of the processes, a reply command shown in (3) is transmitted. The reply command from the unit #B designates the unit id #B for the source field of the first word, designates the unit id #1 of the heterobus extended unit 540 for the destination field, and further, transfers the status and the other necessary data to the second word. When recognizing that the command is the reply command to the system bus #1 connected by the heterobus extended unit 540 itself from the first word of the reply bus command from the unit #B, the unit 540 accepts the reply command and transmits a similar reply bus command to the system bus #1 side as shown in (4). The first word of the reply bus command designates the system bus ID #1 and the unit ID #8 of the heterobus extended unit 540 by the source field and designates the unit ID #1 of the system bus ID #1 of the requesting source for the destination field. For the second and third words, the bus command transmitted from the unit #B of the heterosystem bus #2 is added as it is. By the simple conversion of the bus command by the heterobus extended unit 540, the data transfer can be performed between the units of the different bus systems. It is sufficient that the unit ID in each bus which is used in the emulation bus command is uniquely set on each bus and the ID on the extended heterosystem bus is also unique while including the heterobus extended unit 540.

Bus Command

Figure 55:
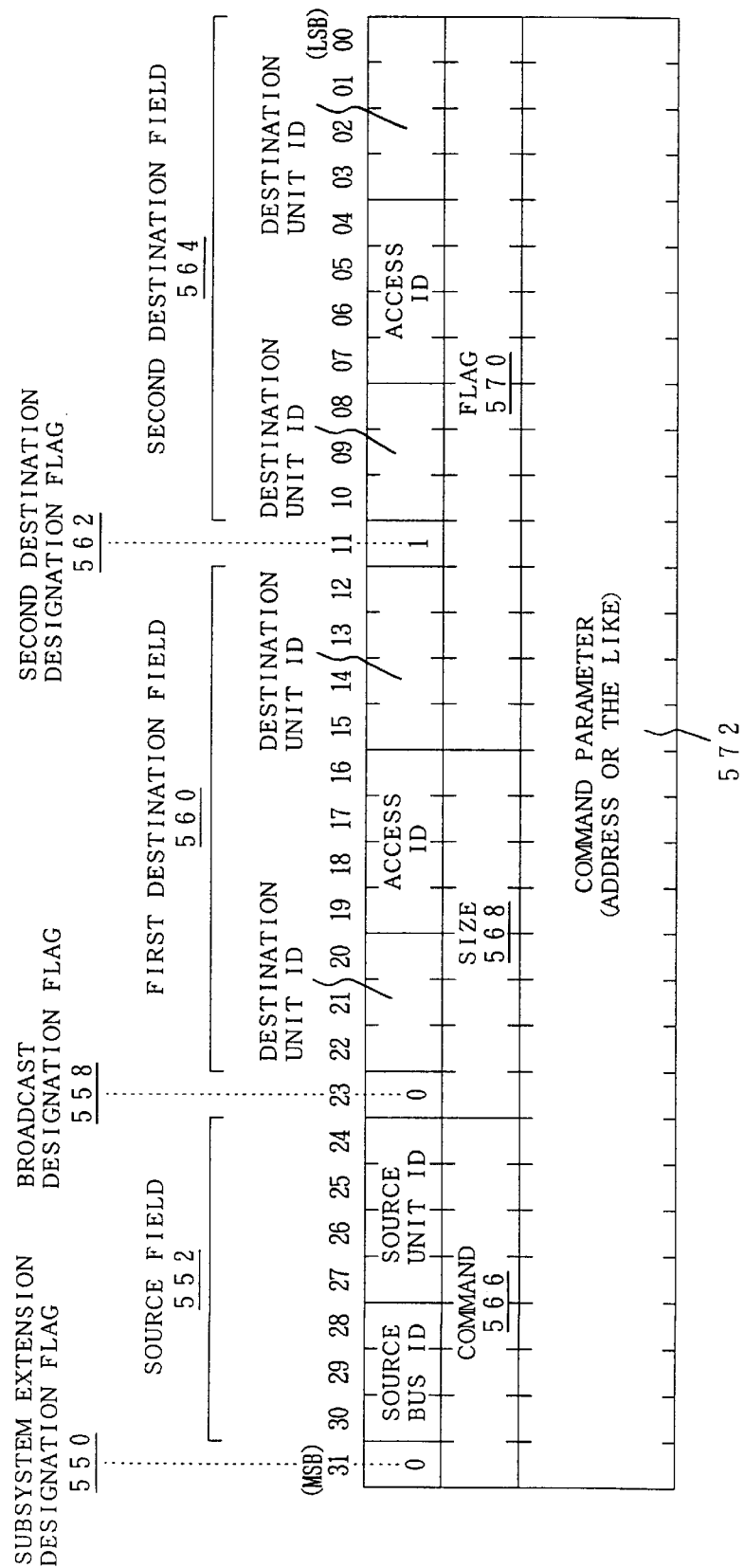
FIG. 55 is an explanatory diagram for a format of a fundamental bus command of the system bus in FIG. 39.

FIG. 55 shows a fundamental command format of a bus command which is used for the bus transfer of the system bus 12 of the cache coherence apparatus of the invention. In FIG. 55, now assuming that one byte consists of eight bits, the basic bus command is constructed by a length of 16 bytes. In FIG. 55, the command field is divided into fields each having a width of four bytes (32 bits). A source field 552, a first destination field 560, and a second destination field 564 are provided for the head basic byte portion of the basic bus command. Information of an access requesting source is designated for the source field 552. Information of the partner destination which requests an access is designated from the requesting source of the source field for the first destination field 560. Information of another partner destination which accesses other than the source field 552 and first destination field 560 is designated for the second destination field 564. Specifically speaking, for example, when considering the processing operation in the reading mode 2 in the cache coherence apparatus in FIG. 17, it is executed as follows.

FIG. 17 shows the processes in the case where although the read request was performed from the local processor module 10-1 as an access requesting source to the home processor module 10-2 as a target of an access, the newest data doesn't exist in the local storage 28 but the newest data exists in the cache unit of the processor module 10-3 serving as a remote. In such a reading process, first, in case of performing a read request from the local processor module 10-1 to the home processor module 10-2, the unit ID of the local is designated for the source field 552 in FIG. 55 and the first destination field 560 designates the unit ID as a home. In this instance, the second destination field 564 is not used. Subsequently, in case of performing a read request from the home processor module 10-2 to the remote processor module 10-3, the source field 552 is set to the home ID, the first destination field 560 is set to the remote ID, and further, the local ID as a first access requesting source is designated for the second destination field 564. Moreover, in case of transmitting the reply data 260 from the remote processor module 10-3, the remote ID is designated for the source field 552 in FIG. 55, the home ID as a requesting source is designated for the first destination field 560, and further, the local ID as a first requesting source is designated for the second destination field 564. Specifically speaking, it is sufficient that the same information as the bus command received by the remote processor module 10-3 is set as it is and the reply data 260 as a reply command is transmitted. As mentioned above, in the read access in which the data transfer is necessary among the three processor modules serving as a local, a home, and a remote in the cache coherence apparatus of the invention, the command format of the source field 552, first destination field 560, and second destination field 564 in FIG. 55 has a meaning.

In the basic bus command in FIG. 55, the source field 552 is actually divided into a source bus ID field and a source unit ID field. By possessing the source bus ID field, the data transfer among the different system buses can be performed. similarly, with respect to the first destination field 560 and second destination field 564, the destination bus ID field and destination unit ID field are also provided, respectively. Further, access ID fields are provided for the first destination field 560 and second destination field 564. The access ID field of the first destination field 560 is a field to designate an operation identification (ID) number to perform a multi-operation of the bus accesses in the split transfer and is valid for a command or a command group. Applications of the operation ID number by the access ID field are a simultaneous operation of a plurality of bus access ports, a pipeline operation of a single DMA port, and the like. Up to sixteen kinds of multi- operations per one unit can be designated. In the ordinary bus command in which the second destination field 564 is not designated, it is sufficient to designate an arbitrary operation ID number of the source unit for the ID field of the first destination field 560. In this case, in the source unit, the same operation ID number as the access unit ID has been stored. When the reply command is received, the access ID field of the first destination field 560 is compared with the operation ID number stored in the source unit. When they coincide, it is judged that the command is the reply command for the bus command generated by the unit.

In the case where the second destination field 564 has been designated like a second bus command from the home processor module 10-2 and a reply command from the remote processor module 10-3 by the reading process in the reading mode 2 in FIG. 17, the operation ID number stored by the source unit itself when the bus command is transmitted is compared with the access ID field of the second destination field 564 in the reply command. when they coincide, it is judged that the reply for the bus command generated by the unit is the reply command designated by the first destination field 560. Specifically, in FIG. 17, the local processor module 10-1 waits for the reply command for the bus command sent to the home processor module 10-2. However, actually, the reply command for the second bus command sent to the remote processor module 10-3 from the home processor module 10-2 is returned from the remote processor module 10-3 instead of the home processor module 10-2. In this instance, the access ID field of the second destination field 564 is compared with the operation ID number stored upon transmission of the bus command in the local processor module 10-1. when they coincide, it is regarded that the reply command is a reply command for the bus command sent by itself to the home processor module 10-2. The reply command is received. Thus, the local processor module 10-1 as an inherent requesting source can receive the newest data which doesn't exist in the local storage 28 of the home processor module 10-2 but exists in the cache of the remote processor module 10-3 without being aware of the remote processor module 10-3. At this time, in the local processor module 10-1, a time T1 (first time) is set in consideration of the reply from the home processor module 10-2 as a bus timer to monitor the receiving time of the reply data. However, since such a reply is a reply by the transmission of the second bus command to the remote processor module 10-3 from the home processor module 10-2, the time of the timer to monitor a bus time-out in the local processor module 10-1 is changed to a time T2 (second time) longer than the time T1 in consideration of the remote processor module 10-3, thereby monitoring a time-out of the bus transfer. It is sufficient to execute the change of the bus time-out counter by monitoring the transmission of the remote command 250 which is transmitted from the home to the remote command in the local processor module 10-1. The time change can be also obviously performed by using the tag information line 509 shown in FIG. 40. Further, with respect to the return of the reply command as reply data 260 from the remote processor module 10-3 in FIG. 17, the operation ID number of the access ID field in the first destination field 560, of the bus command as a remote command 250 from the home processor module 10-2 which becomes an opportunity for the reply command, can be designated as it is.

Figure 62:
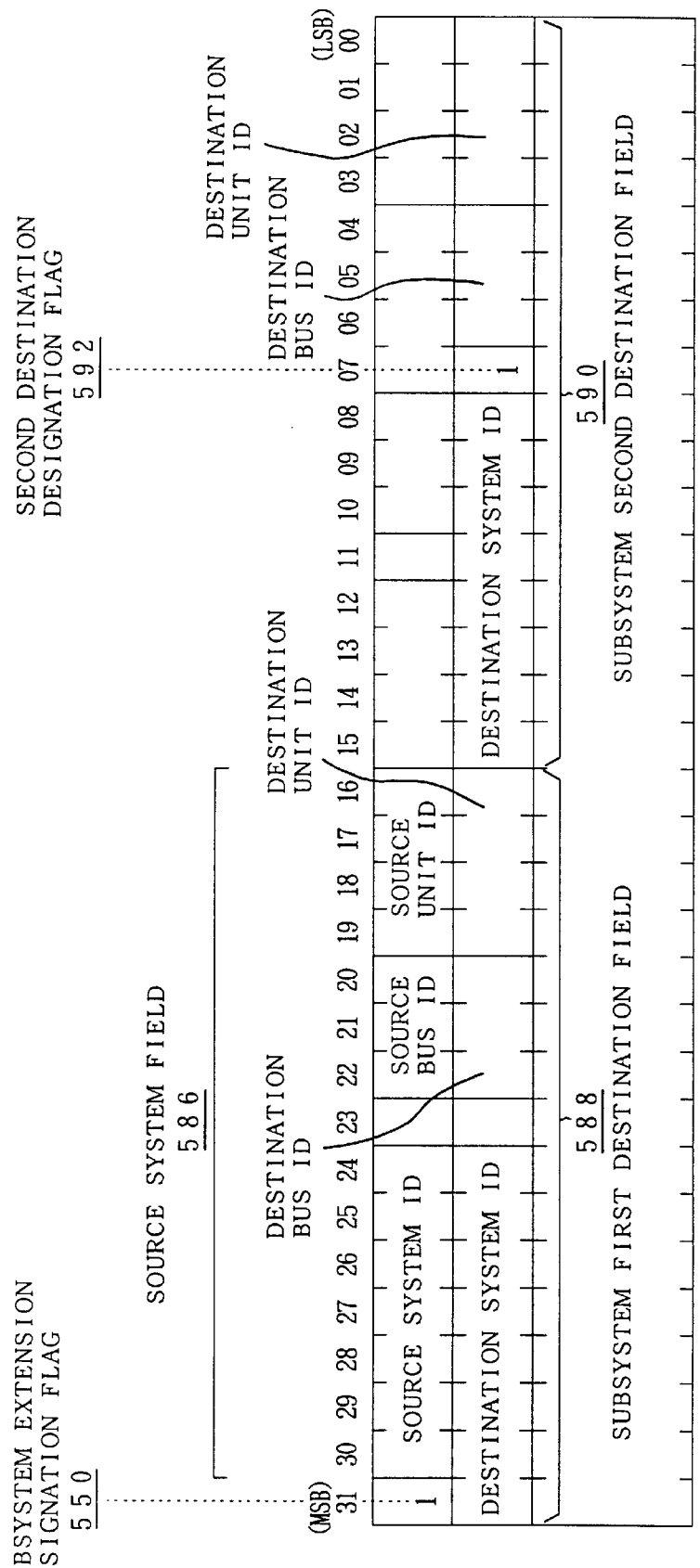
FIG. 62 is an explanatory diagram for a format of an extension bus command which is added to a fundamental bus command and used upon bus transfer between the subsystem buses in FIG. 39.

A subsystem extension designation flag 550 is provided at the head of the basic bus command in FIG. 55. As shown in FIG. 52, the subsystem extension designation flag 550 is set to 1 in case of performing a data transfer between the units of different subsystems. Thus, in addition to the basic bus command in FIG. 55, the second word of the bus command for extension of the subsystem shown in FIG. 62 is formed. The second word for extension of the subsystem will be clearly explained hereinafter. In the basic bus command in FIG. 55, a broadcast designation flag 558 is provided in a boundary portion between the source field 552 and the first destination field 560 which is set to 1 when it is used as a broadcast bus command. A second destination designation flag 562 is provided in the head portion of the second destination field 564 and is set to 1 when the second destination field 564 is used. A command field 566, a size field 568, and a flag field 570 are provided in the portion of five to eight bytes as a second line of the basic bus command. Command identification (ID) codes such as read command, write command, reply command, broadcast command, and the like are set in the command field 566. A data transfer size is set into the next side field 568.

In the bus command of the reading system, a data size is designated and returned by the reply command. In the bus command of the writing system, a data size is designated for the write data subsequent to the bus command. In the next flag field 570, an identification flag and an attribute flag of the command are provided as necessary. For example, an access address or the like depending on the kind of command of the command field 566 is designated for a last command parameter field 572.

Figure 56:
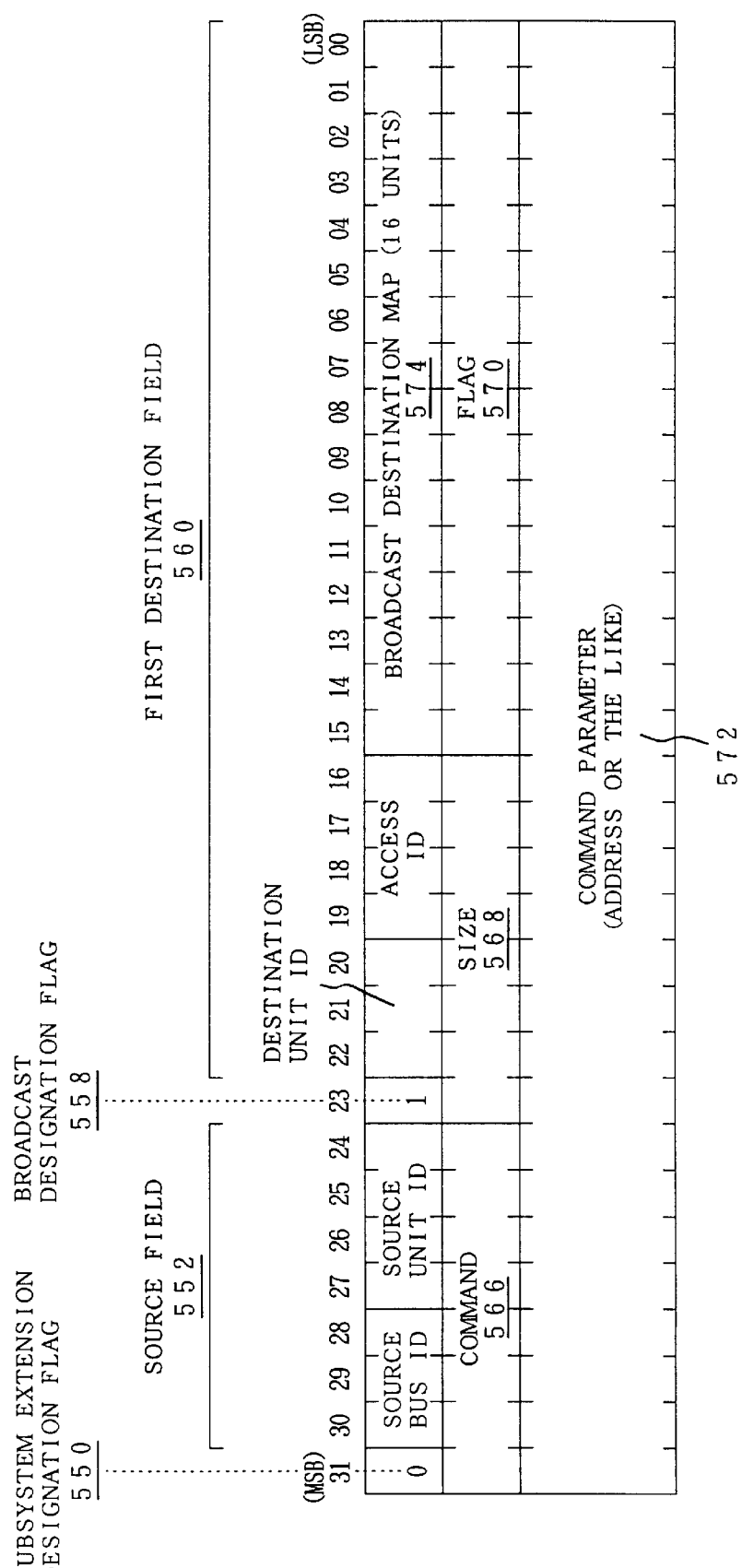
FIG. 56 is an explanatory diagram for a format of a broadcast bus command of the system bus in FIG. 39.

FIG. 56 shows a command format of the broadcast bus command which is used in the invention. As for the broadcast bus command, with respect to the first destination field 560 provided after the source field 552, a broadcast destination map field 574 of a width of 16 bits is provided in place of the destination unit ID in the basic bus command in FIG. 55. Since up to sixteen units can be connected on a system bus 12 of the invention, in the broadcast destination map field 574, the unit as a partner destination of the broadcast command can be designated by a bit correspondence relation. The broadcall bus command also has the same format as that of the broadcast bus command.

Figure 57:
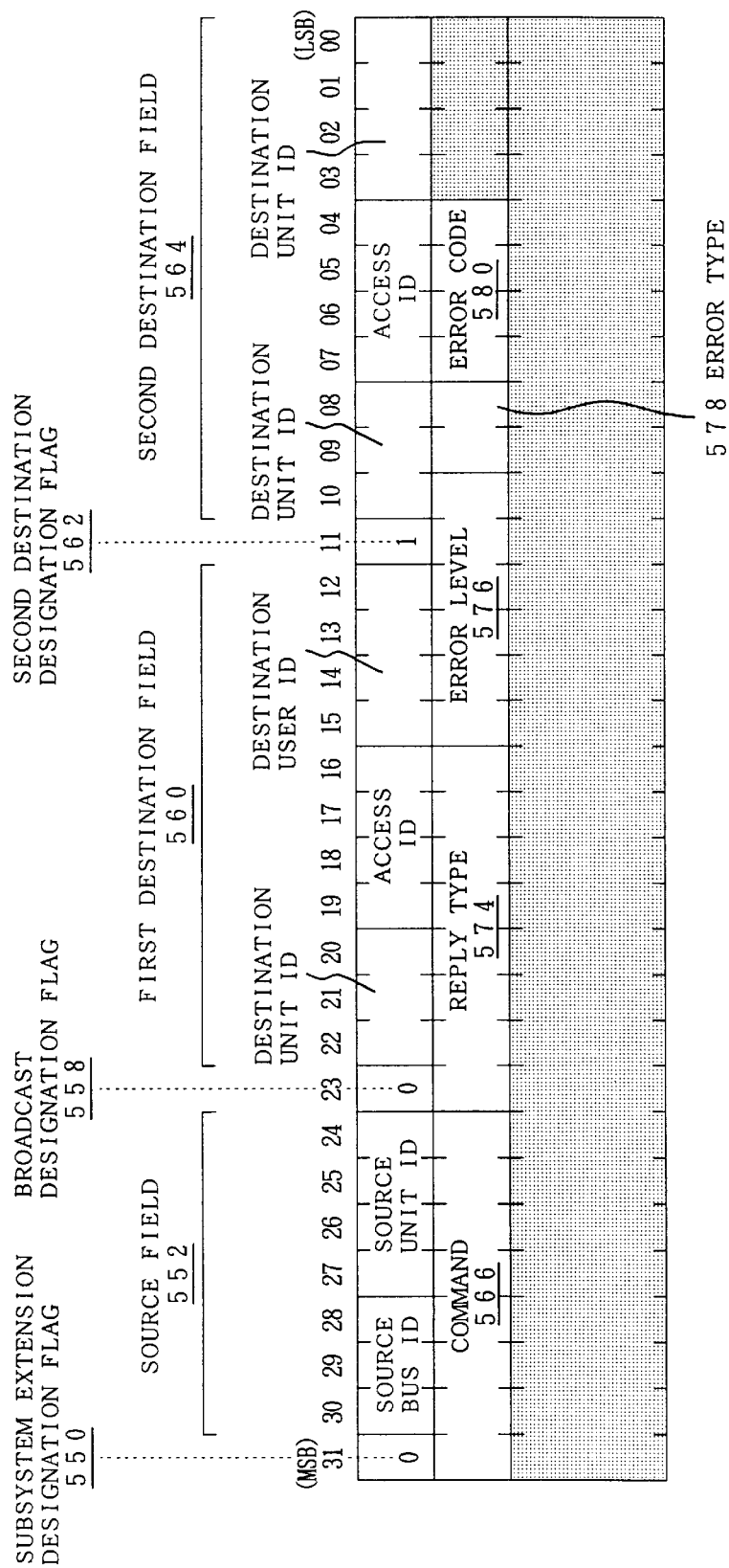
FIG. 57 is an explanatory diagram for a format of a fundamental reply/error bus command of the system bus in FIG. 39.

FIG. 57 shows a command format of a bus command for a basic reply and an error reply which are used in the system bus of the invention. The bus command for the basic reply and error reply is characterized in that each field of a reply type 574, an error level 576, an error type 578, and an error code 580 is provided in the portion of the second line. The other structure is the same as that of the basic bus command in FIG. 55. The field of the last command parameter 572 is not used. A command code of the bus command generated by the source unit which requested the reply is designated for the reply type field 574. The format of the additional information of the reply command and the presence or absence of the data are determined by the command code of the reply type field 574. An error level is stored into the next error level field 576 when it is used as an error reply bus command. An error type indicative of the classification of the error at the time of the return of the error is attributed to the next error type field 578. Further, detailed factors of the error are attributed to the error code field 580 at the time of the error return.

FIG. 59 shows an example of the error type field 578 in FIG. 57 and classification information of a software error, a system construction error, a hardware error, and a bus error is set on the basis of the error detection. FIG. 60 shows the detailed classification of the error by the error level field 576 in FIG. 57 as a combination with the error type. "nnn" in FIG. 60 differs in dependence on the kind of error. "xx" shows the following contents. Namely, when "xx" is equal to "00", it denotes the source is "local". Likewise, "01" indicates the first destination is "home". "10" indicates the second destination is "remote". "11" indicates the mirror unit of the first destination (home). When "r" is equal to 101, it indicates a write. When it is equal to 111, it indicates a read. The broadcast bus command shown in FIG. 56 is used as a bus command for cache invalidation in the writing mode 1 in FIG. 23, the writing mode 2 in FIG. 24, the writing mode 3 in FIG. 25, the writing mode 4 in FIG. 26, and the like.

Figure 58:
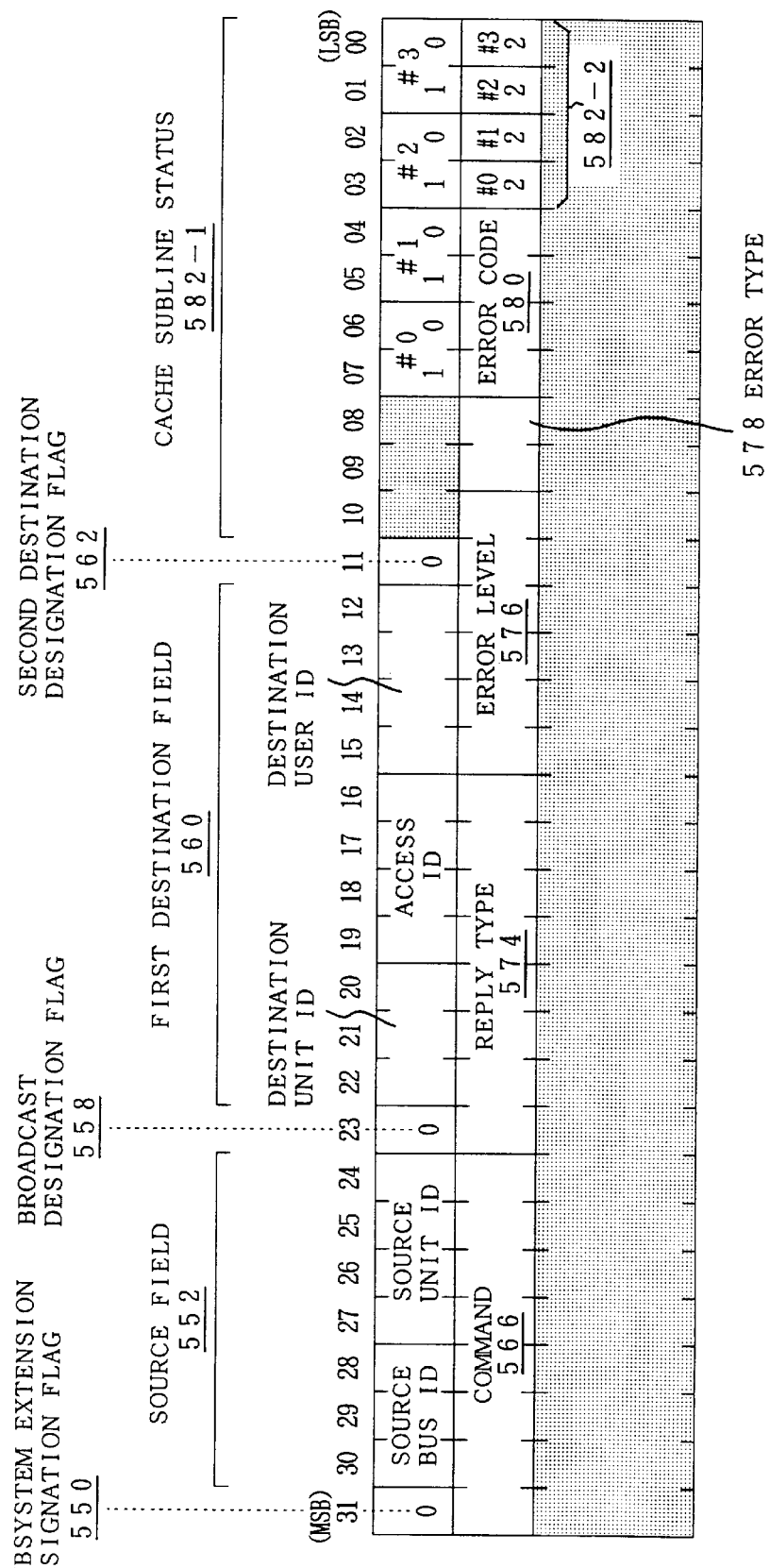
FIG. 58 is an explanatory diagram for a format of a cache status bus command of the system bus in FIG. 39.

FIG. 58 shows a command format of a cache status reply bus command which is used in the system bus of the invention. In the cache status reply bus command, subsequent to the source field 552 and first destination field 560, a cache subline status field 582-1 is provided. Further, a cache subline status field 582-2 is similarly provided for the last four bits of the second line. In the cache coherence apparatus of the invention, the cache line of 64 bytes is divided into cache sublines on a 16-byte unit basis. The cache sublines are shown by #0 to #3. Each subline is allocated every three bits by a combination of the cache subline statuses 582-1 and 582-2. The present state of the cache subline as an access target is displayed by the reply bus command for the cache bus command. Namely, two bits of bit 0 and bit 1 of the subline IDs #0 to #3 are allocated to the cache subline status field 582-1. The third bit of bit 2 is allocated to the last cache subline status field 582-2 of the second line. Cache subline statuses by the cache subline status fields 582-1 and 582-2 are as shown in FIG. 61.

FIG. 62 shows a command format of a subsystem extension bus command which is formed as a second word of the bus command when the subsystem bus extension ID flag 550 in FIG. 55 is set to 1. A source system field 586 is provided for the first line of the subsystem extension bus command. Each field of a source system ID, a source bus ID, and a source unit ID provided with the source unit is designated. with respect to the second line, a subsystem first destination field 588 is provided and each field of a destination system ID, a destination bus ID, and a destination unit ID is provided. Subsequently, a subsystem second destination field 590 is provided and each field of a destination system ID, a destination bus ID, and a destination unit ID is similarly provided. A second destination designation flag 592 is also set. By combining the subsystem extension bus command in FIG. 62 as a second word with the first word of the basic bus command in FIG. 55, the data transfer among the units of a plurality of subsystems shown in FIG. 52 can be performed.

As mentioned above, in a multiprocessor system of the distributed shared memory type according to the directory system, the system bus 12 as a second common bus which is used in the cache coherence apparatus of the invention can provide a common bus to efficiently realize a cache coherence, so that a common bus which doesn't lose an extension performance of the directory system can be provided. A common bus of a high reliability can be provided in consideration of an extension to a large scale multiprocessor system in which a plurality of subsystems which are constructed on a system bus unit basis are integrated. Further, since the connection with different buses is considered, a common bus which enables the effective use of the existing bus resources can be provided.

Second Directory Memory

Figure 63:
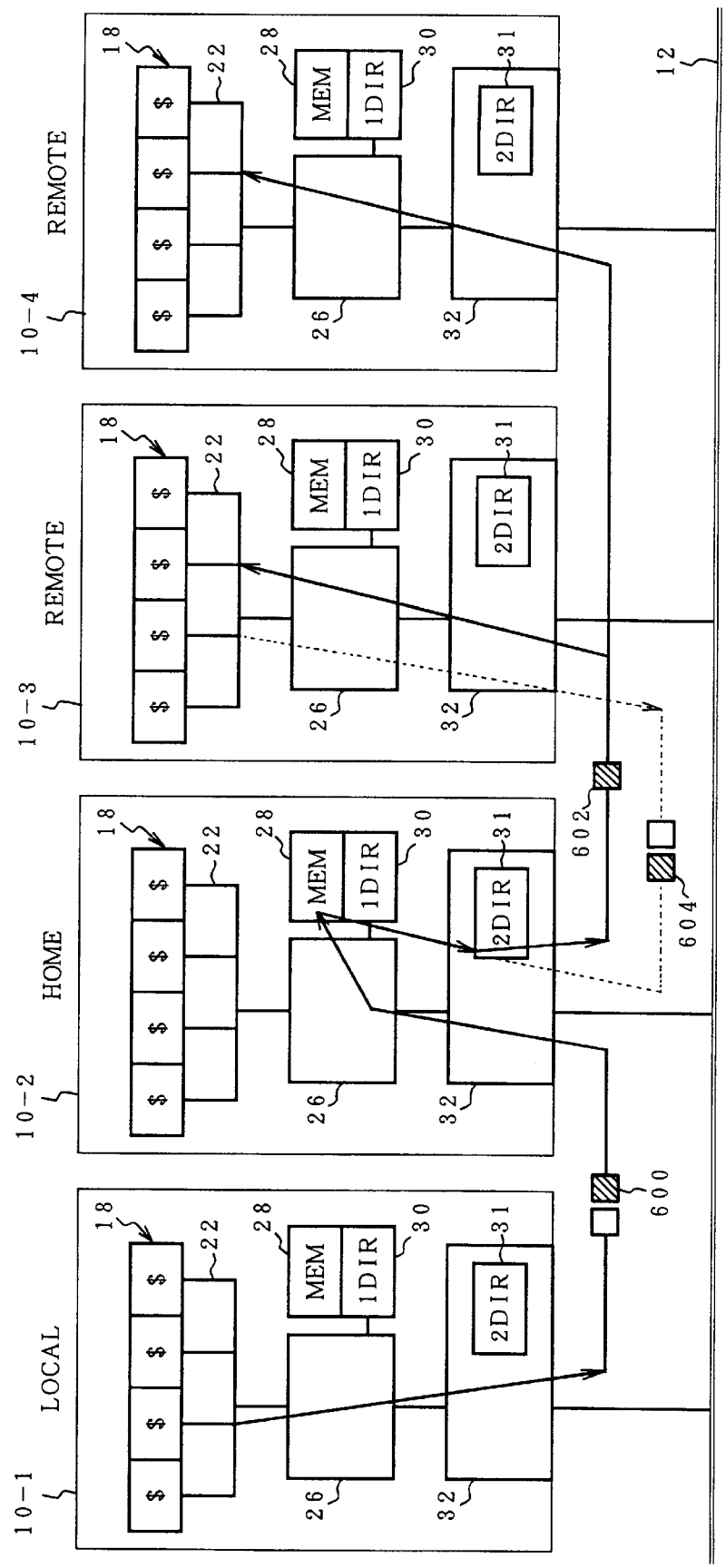
FIG. 63 is an explanatory diagram for a write access of an embodiment in which a second directory memory is provided for the bus connection unit of the present invention.

FIG. 63 shows another embodiment of the invention and is characterized in that a second directory memory is provided for the bus connection unit for the system bus of the processor module. In FIG. 63, the local processor module 10-1 generates a home command 600 to the local storage 28 of the home processor module 10-2 and performs a write access, and a remote command 602 for cache invalidation is generated from the home to the remote processor modules 10-3 and 10-4. In each of the processor modules 10-1 to 10-4, the local storage 28 as a distributed main storage and the directory memory 30 are provided for the memory management unit 26. This construction is the same as that in FIG. 3. In addition to them, a second directory memory 31 is provided for the bus connection unit 32 in FIG. 63. For the second directory memory 31, the directory memory 30 is called a first directory memory. With respect to the data of a cache line unit existing in the local storage 28, a state in which the data is being accessed by another bus command on the system bus is registered in the second directory memory 31. As registration contents, for example, there is a waiting for cache invalidation by a remote command. The processor module 10-2 generates the remote command 602 for cache invalidation to the home processor modules 10-3 and 10-4 and waits for a command response. In this instance, with regard to the relevant cache line of the second directory memory 31 of the processor module 10-2, a response waiting of the cache invalidation from the remote is registered. In this state, it is now assumed that, for example, a home command 608 of the write access was generated from the second cache unit side of the processor module 10-3 to the same cache line as a target. In response to the home command 602, the bus connection unit 32 immediately recognizes that the unit is waiting for the completion of the cache invalidation with reference to the second directory memory 31 without sending to the memory management unit 26 and returns a busy response by a reply command. In this case, since the retry on the system bus 12 is in vain, a busy is notified to the cache unit of the accessing source, thereby executing the retry. As mentioned above, since the access disable state by the remote command can be known by referring to the second directory memory 31, processing speed can be increased as compared to the case of responding to the busy signal by evaluating the access disable state on memory management unit 26. When the reply command is returned after completion of the cache invalidation in the remote processor modules 10-3 and 10-4, the registration of the second directory memory 31 is deleted and the remote command 602 by the retry from the processor module 10-3 is accepted.

Figure 64:
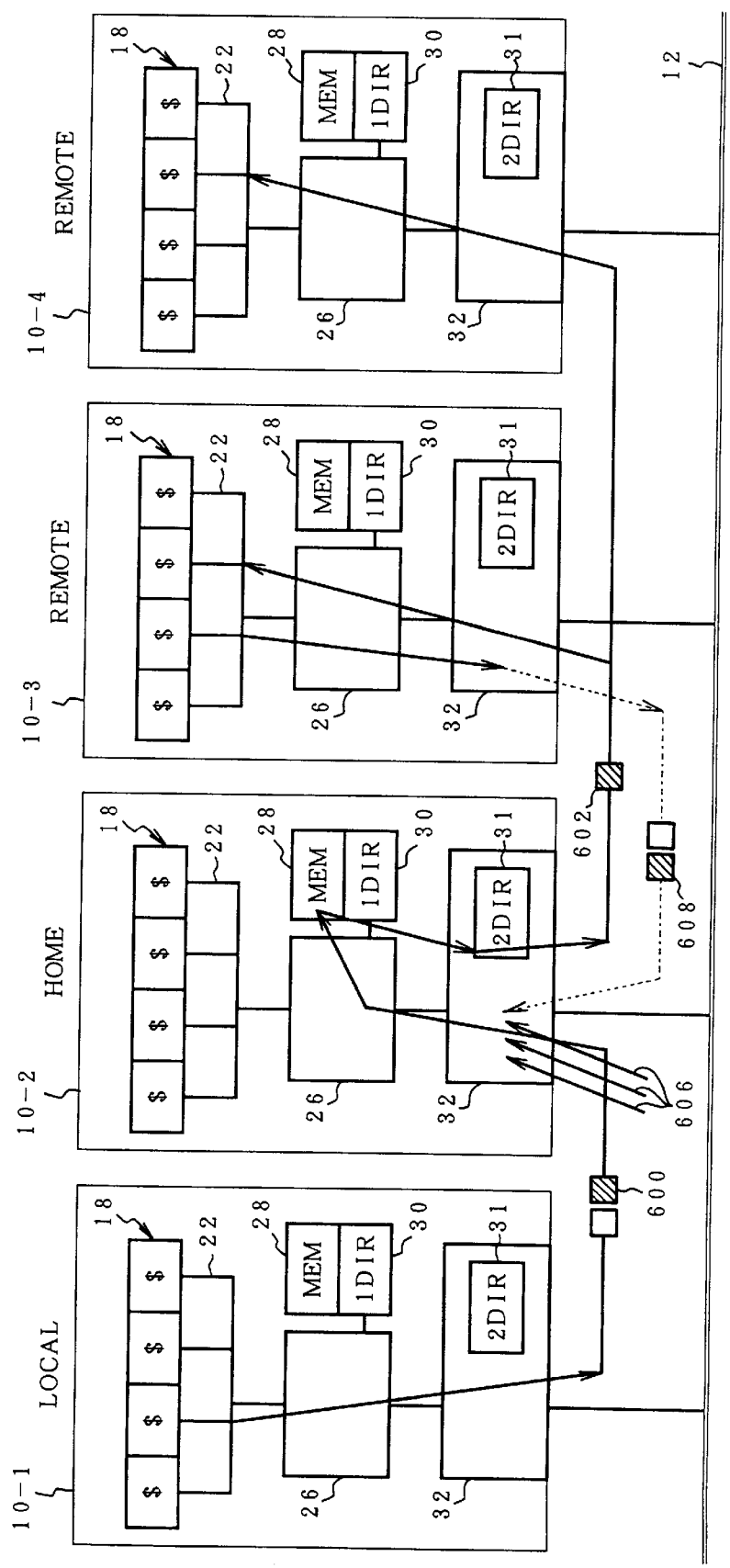
FIG. 64 is an explanatory diagram for an access in the case where an access request to a home becomes buffer full due to the waiting for the completion of a cache invalidation in FIG. 63.

FIG. 64 shows the case where a plurality of home commands 606 are generated from the other processor modules to the home processor module 10-2 in a waiting state of completion of the cache invalidation of the home in FIG. 63 and the buffer of the bus connection unit 32 becomes full. When it is now assumed that the remote command 602 was generated from the processor module 10-3 in the buffer full state, a busy response indicating a buffer full state is immediately returned without referring to the second directory memory 31. In this case, when a busy response of the buffer full is returned until the cache unit of the access requesting source, the snoop bus 22 and the cache unit become busy by the retry operation, so that the remote command is retried on the system bus 12.

Others

The secondary cache control module 35 provided for the processor element 14-1 in FIG. 4 manages the cache data in the secondary cache 38 by an LRU. When the secondary cache 38 overflows due to the writing of new cache data, an LRU sweeping-out process of the cache data is executed. According to the LRU sweeping-out process in the case where the cache line as a target to be swept out is in an "exclusive & dirty" state in which the write privilege is possessed, namely, when the cache line is an owner, a copy back command is generated to the memory module 25 through the snoop bus 22 The cache data which was swept out is stored into the local storage 28 of the home processor module.

On the other hand, when the cache line of "exclusive & dirty" in which the write privilege is possessed is swept out by the LRU, in the case where the cache data exists in a "shared & modified" state on another cache connected through another snoop bus, the cache data which was swept out is deleted. After that, a reply command RP is sent to the other cache unit, the state is switched from "shared & modified" to exclusive & dirty", and the write privilege is shifted. In this case, there is no need to write the cache data which was swept out by the LRU into the local storage 28.

According to the cache coherence apparatus of the present invention as mentioned above, there is a common bus construction of two hierarchies used so that a plurality of processor elements with the cache units are mutually connected by an internal common bus and the memory module having a main storage is connected in each of a plurality of processor modules and, further, the memory module side is mutually connected to the other processor module by an external common bus. Thus, the bus operation of the cache coherence in the processor module and the bus operation of the cache coherence between the processor modules can be separated and the processing performance can be remarkably improved.

As for the internal common bus, it is sufficient to have a bus load corresponding to the access source in which the memory module for accepting the access from the outside is added to the number of processors in the module. The bus load is reduced and the processing performance between the processors can be improved. On the other hand, a bus load of the external system bus is determined by the number of processor modules mutually connected and doesn't depend on the number of processor elements provided in the processor module. Therefore, the bus load of the external common bus can be reduced and the processing performance can be improved.

Since the internal common bus doesn't need to connect to the outside of the processor module, line length can be reduced and electric characteristics can be preferably maintained at optimum levels. Thus, a clock frequency of the bus can be increased and the processing performance of the cache coherence among the processors which are internally connected can be improved so as to have a higher processing speed.

Further, in the cache coherence which is executed among the processor modules using the external common bus, in case of a write access, although the newest data is transferred to the cache of the accessing source, the newest data is not written into the main storage having the write address. A "dirty" state in which the newest data exists in cache memory is set and the processes are completed. Thus, a write access can be finished at a higher speed by an amount corresponding to that the newest data not being written into the main storage.

Further, at the time of the read access of the same address, the reply data from the external common bus is received and written into the main storage which was set to the "dirty" state by the write access. Therefore, simultaneously with the storage to the cache of the accessing source, the main storage can be updated to the newest data. Thereby, writing into the main storage and the transfer to the read accessing source can be simultaneously executed. The cache coherence of the read access, consequently, can be realized at a higher speed.

Although the above embodiment has been shown and described with respect to the case where four processor elements are provided for one processor module as an example, it is sufficient to provide at least one processor element for the processor module. A proper number of processor elements can be provided as necessary. Further, the invention is not limited to the embodiment of the processor modules which are connected by the system bus. An arbitrary number of processor modules can be connected so long as there are two or more processing modules.

What is claimed is:
1. A cache coherence apparatus, comprising:
a main storage;
an external common bus; and
a plurality of processor modules coupled via said external common bus and interfaced to said main storage, further comprising:
  a plurality of processors;
  a cache unit provided for each of said processors coupled via an internal common bus;
  a distributed main storage in which said main storage is distributed and arranged;
  a directory memory storing registration state of data in said distributed main storage for each of said cache units on a cache line unit basis; and
  a memory control module connected to said external common bus and said internal common bus for controlling an access data request of any one of said plurality of processors, in the case where access data is not registered in any one of said plurality of cache units, when recognizing that said access data exists in the distributed main storage of another processor module, an access command is transmitted through said external common bus, and in the case where an access command is received from said another processor module by said external common bus, said directory memory is accessed and, when said access data is not registered yet, the distributed main storage is accessed and a response is made to a transmitting source, and when the access data has already been registered, the cache unit of a registration destination is accessed and a response is made, and after completion of the response of said access data, the registration states in said directory memory are updated.
2. An apparatus according to claim 1, wherein said cache unit divides and manages said cache line into a plurality of sublines, and
  said directory memory is set into a cache state, said cache state being designated a dirty state in which the data on said cache unit has a newest value and the data on said distributed main storage has an old value as stored on a subline unit basis, and said cache state being designated a share state in which the data on said cache unit and the data on said distributed main storage have a same value as stored on said cache line unit basis.
3. An apparatus according to claim 1, wherein said memory control module further comprises:
  a memory management unit managing a local storage and a directory memory;
  an internal common bus connecting said plurality of cache units and said memory management unit;
  a protocol management unit managing a protocol conversion between said internal common bus and said external common bus; and
  a bus connection unit connecting said processor modules by said external common bus.
4. An apparatus according to claim 2, wherein directory entry data stored in said directory memory on the cache line unit basis has a plurality of subline bits indicative of the presence or absence of said dirty state and a shared map bit indicative of said share state for said plurality of processor modules, and
  further, a construction register registering a correspondence relation between a bit position of said shared map bit and the processor module is provided, and the share states of said plurality of processor modules registering into a same map bit by said construction register.

5. An apparatus according to claim 4, wherein in correspondence to the setting of said plurality of subline bits, information of the processor module in which the cache unit having the newest value exists is stored in a specific area in said distributed main storage.

6. An apparatus according to claim 2, wherein in correspondence to the resetting of said subline bit, information of the processor module in which the distributed main storage having the newest value exists is stored in a specific area in the distributed main storage.

7. An apparatus according to claim 1, wherein said processor executes a read access or a write access on a subline unit basis of said cache line.

8. An apparatus according to claim 1, wherein an internal common bus and said external common bus transfer information by a split form in which a command transfer and a response transfer are separated.

9. An apparatus according to claim 1, wherein in the case where for a read access of an arbitrary processor in a first processor module, a mishit occurs in the cache unit of a requesting processor module and the cache units of said plurality of processors connected by an internal common bus, a read address exists in the distributed main storage in said first processor module, and further, the data in said read address exists in a dirty state in which a newest value is possessed in the cache unit in a second processor module, said first processor module generates a command to said external common bus, accesses said second processor module, obtains the newest value from said cache unit in the dirty state through an internal common bus, and thereafter, receives the newest value to said first processor module by said external common bus, and said first processor module stores the newest value derived by said response into said cache unit of said requesting processor module, thereby allowing said cache unit to respond to the read access, and simultaneously writes the newest value into said distributed main storage.

10. An apparatus according to claim 9, wherein when the newest value is written into said distributed main storage, said first processor module updates the dirty state of said directory memory to a share state and updates the cache unit of said accessing source from an invalidation state to the share state.

11. An apparatus according to claim 1, wherein in the case of a read access of an arbitrary processor in a first processor module a mishit occurs in the cache unit of said arbitrary processor and all of the cache units of said plurality of processors connected by an internal common bus, a read address exists in the distributed main storage in a second processor module, and further, a value of said read address exists in a dirty state in which a newest value is possessed in the cache unit in a third processor module, said first processor module generates a command to said external common bus and accesses said second processor module, said second processor module generates a command to said external common bus on the basis of the command received from said external common bus and accesses said third processor module, said third processor module obtains the newest value from said cache unit in the dirty state by an internal common bus and, thereafter, transmits the newest value to said first and second processor modules by said external common bus, said second processor module writes the newest value derived by the reception of said transmission into said distributed main storage, and said first processor module stores the newest value derived by the reception of said transmission into said cache unit of the arbitrary processor, thereby allowing said cache unit to respond to said read access.

12. An apparatus according to claim 11, wherein said second processor module updates the dirty state of said directory memory a share state when the newest value is written into said distributed main storage, and the cache unit of the arbitrary processor of said first processor module changes an invalidation state to the share state.

13. An apparatus according to claim 1, wherein in the case where although a mishit occurs in the cache unit for a read access of an arbitrary processor module, a newest value exists in the cache unit of another processor connected by an internal common bus, a transfer of the newest value is executed between both of said cache units through said internal common bus and the newest value is stored into the cache unit of a processor making the read access, thereby allowing said cache unit to respond to said read access.

14. An apparatus according to claim 13, wherein the transfer of the newest value using said internal common bus is executed on a cache subline unit basis.

15. An apparatus according to claim 1, wherein in the case where for a write access of an arbitrary processor in a first processor module, a copy value is not stored in the cache unit of the arbitrary processor and the cache units of said plurality of processors connected by an internal common bus in a state in which a write privilege is possessed, a mishit occurs, a write address exists in said distributed main storage in said first processor module, and further, a copy value in the write address in said distributed main storage exists in a share state in the cache units of the plurality of processor modules other than the first processor module, said first processor module generates an invalidating command and transmits said invalidating command using the external common bus to the plurality of processor modules in the share state, all of the processor modules in the share state simultaneously receive said invalidating command and, when an invalidation is successful, said processor modules independently respond to the first processor module by using said external common bus, and said first processor module recognizes the success in invalidation by receiving all responses from said external common bus and stores the copy in the write address in said distributed main storage into said cache unit, thereby allowing said copy value to be overwritten by said write access.

16. An apparatus according to claim 1, wherein in the case where for a write access of an arbitrary processor in a first processor module, a copy value is not registered in the cache unit of the arbitrary processor and the cache units of said plurality of processors connected by an internal common bus in a state in which a write privilege is possessed, a mishit occurs, said write address exists in the distributed main storage in said first processor module, and further, the copy value in the write address in said distributed main storage exists in a share state in the cache units of the plurality of processor modules including the first processor module, said first processor module transmits an invalidating command to all of the processor modules in the share state by using said external common bus and simultaneously transmits the invalidating command to the cache unit in the first processor module by using the internal common bus, all of the processor modules in the share state simultaneously receive said invalidating command and independently respond to successful invalidation to the first processor module by using said external common bus, and simultaneously, the cache unit of said first processor module responds to the success in invalidation by using the internal common bus, and the first processor module recognizes the success in invalidation by receiving all of responses from the external common bus and a response from the internal common bus and stores a copy value in the write address in said distributed main storage into said cache unit, thereby allowing said copy value to be overwritten by the write access of said processor.

17. An apparatus according to claim 15, wherein when success in invalidation is recognized and the copy value is copied into the cache unit of the accessing source from said distributed main storage, said first processor module updates the share state of said directory memory to a dirty state in which the data on the cache unit has a newest value and the data on the distributed main storage has an old value.

18. An apparatus according to claim 1, wherein
in the case where for a write access of the processor in a first processor module, a copy value is not registered in the cache unit and the cache units of said plurality of processors connected through an internal common bus in a state in which a write privilege is possessed, a mishit occurs, said write address exists in said distributed main storage in a second processor module, and further, the copy value in the write address in said distributed main storage exists in a share state in the cache units of the plurality of processor modules other than the second processor module, said first processor module transmits a request command of a write ownership to said second processor module by using the external common bus, the second processor module which received the request command of said write ownership transmits an invalidating command to all of the other processor modules in the share state by using the external common bus, all of the processor modules in the share state simultaneously receive said invalidating command and, when an invalidation is successful, said processor modules independently respond to said second processor module by using said external common bus, when recognizing the success in invalidation by receiving all responses of the invalidation, said second processor module responds by moving the write ownership including the copy value in an access address in said distributed main storage to said first processor module by using the external common bus, and said first processor module stores said copy value derived by the reception of the response of said write ownership into said cache unit of an accessing source, thereby allowing said copy value to be overwritten by the write access of said processor.

19. An apparatus according to claim 18, wherein when the success in invalidation is recognized and the write ownership is moved, said second processor module updates the share state of said directory memory to a dirty state in which the data on the cache unit has a newest value and the data on the distributed main storage has an old value.

20. An apparatus according to claim 1, wherein
in the case of a write access of an arbitrary processor in a first processor module, a copy value is not registered in the cache unit of the arbitrary processor and the cache units of said plurality of processors connected through an internal common bus in a state in which a write privilege is possessed, a mishit occurs, said write address exists in the distributed main storage in a second processor module, and further, the copy value in the write address in said distributed main storage exists in a share state in the cache units of the plurality of processor modules including the second processor module, said first processor module generates and transmits a request command of a write ownership to said second processor module, said second processor module which received the request command of said write ownership generates an invalidating command to all of the processor modules in the share state by using the external common bus and simultaneously generates the invalidating command to the cache unit in the share state by using the internal common bus, all of the processor modules in the share state simultaneously receive said invalidating command and independently respond indicating a success in invalidation to said second processor module by using the external common bus, and simultaneously, the cache unit of said second processor modules the success in invalidation by using said internal common bus, said second processor module recognizes the success in invalidation by receiving responses of the success in invalidation from said external common bus and a response of the success in invalidation from said internal common bus and responds by moving the write ownership including the copy value in the write address in said distributed main storage to said first processor module by using said external common bus, and said first processor module stores said copy value derived by the reception of the response of said write ownership into said cache unit of an accessing source, thereby allowing said copy value to be overwritten by the write access of said processor.

21. An apparatus according to claim 20, wherein when the success in invalidation is recognized and the write ownership is moved, said second processor module updates the share state of said directory memory to a dirty state in which the data on the cache unit has a newest value and the data on the distributed main storage has an old value.

22. An apparatus according to claim 16, wherein said invalidating command is generated on a cache subline unit basis.

23. An apparatus according to claim 16, wherein when said invalidating command is responded by returning a state of another subline of the cache line in which a subline to be invalidated is included.

24. An apparatus according to claim 1, wherein
in the case where for a write access of an arbitrary processor in a first processor module, a copy value is not registered in the cache unit and the cache units of said plurality of processors connected by an internal common bus in a state in which a write privilege is possessed, a mishit occurs, said write address exists in the distributed main storage in the first processor module, and further, a newest value in the write address in said distributed main storage exists in the cache unit of a second processor module in a dirty state in which the write privilege is possessed, said first processor module generates and transmits a request command for the write privilege to said second processor module in the dirty state by using the external common bus, said second memory module receives said request command of the write privilege and responds by transmitting the write privilege including the newest value of said cache unit to said first processor module by using said external common bus, and said first processor module stores the newest value derived by said response of the write privilege into said cache unit of an accessing source, thereby allowing said newest value to be overwritten by the write access by said processor.

25. An apparatus according to claim 24, wherein the cache unit of said second processor module updates the dirty state to an invalidation state when the write privilege is moved, and when the write privilege is received, said first processor module updates the dirty state of the directory memory to the dirty state in which information of the memory module in which the newest value exists was changed.

26. An apparatus according to claim 1, wherein in the case of a write access of a processor in a first processor module, a copy value is not registered in the cache unit and the cache units of said plurality of processors connected through an internal common bus in a state in which a write privilege is possessed, a mishit occurs, said write address exists in the distributed main storage in a second processor module, and further, a newest value in a write address in said distributed main storage exists in the cache unit of a third processor module in a dirty state in which the write privilege is possessed, said first processor module generates a request command of the write privilege to said second processor module by using said external common bus, said second processor module which received said request command of the write privilege generates the request command of the write privilege to said third processor module by using the external common bus, said third processor module which received said request command of the write privilege transmits the write privilege including the newest value of said cache unit to said first and second processor modules by using said external common bus, said second processor module receives said response of the write privilege and recognizes a movement of the write privilege, and said first processor module stores the newest value derived by the reception of said write privilege into said cache unit of an accessing source, thereby allowing said newest value to be overwritten by the write access of said processor.

27. An apparatus according to claim 26, wherein the cache unit of said third processor module updates the dirty state to an invalidation state when the write privilege is moved, when the movement of the write privilege is recognized, said second processor module updates the dirty state of said directory memory to the dirty state in which information of the processor module in which the newest value exists was changed, and further, when the newest value is stored, the cache unit of the accessing source of said first processor module updates the invalidation state to the dirty state in which the write privilege exists.

28. An apparatus according to claim 1, wherein in the case of a write access of an arbitrary processor in a first processor module, although a mishit occurs in the cache unit of said arbitrary processor, a newest value in said write address exists in the cache units of said plurality of processors connected through a second common bus in a dirty state in which the write privilege is possessed, a data transfer and a movement of the write privilege are executed between said cache units through an internal common bus and the newest value is stored into the cache unit of an accessing source, thereby allowing said newest value to be overwritten by the write access of said processor.

29. An apparatus according to claim 28, wherein after the write privilege was moved, said cache unit of an accessing destination updates the dirty state to an invalidation state and after the write privilege was obtained, the cache unit of said accessing source updates the invalidation state to the dirty state in which the write privilege exists.

30. An apparatus according to claim 1, wherein for the cache unit of a processor module, in the case where an access command from inside the processor module and an access command from outside of the processor module compete, the module making the access request first is allowed to access said cache unit, the module making the subsequent access request is allowed to issue a retry request, and further, a partner destination module which competed and an access address are stored, and after completion of the access, in the case where an access command is received from the processor module other than a partner destination module which competed for access, the retry request is issued, and the retry request of the competed partner destination is preferentially accepted.

31. An apparatus according to claim 30, wherein in the case in which the cache unit of said processor module, an access from a processor element in the processor module and an access from an external second processor module compete and the processor element obtains said cache unit in advance, said processor element allows said second processor module to issue the retry and, further, the competed second processor module and an access address are stored, and after completion of the access said processor element, in the case where an access command from the processor module other than said processor module which competed is received, the retry is issued, and an access command by the retry of said competed second processor module is preferentially accepted.

32. An apparatus according to claim 30, wherein after completion of the access command, in the case where an access from said processor module of said competition partner destination is not generated for a predetermined time, the processor module which accessed said cache unit initializes memory contents of said competition partner destination and the access address and cancels the preferential acceptance of the competition partner destination.

33. An apparatus according to claim 1, wherein
in the case where a newest data doesn't exist in said distributed main storage but exists in said plurality of cache units and one of said plurality of cache units possesses a write privilege to copy back said newest data into said distributed main storage,
when a replacement of said newest data occurs in the cache unit having said write privilege, said processor module moves said write privilege to the cache unit which possesses said newest data, and until the number of cache units which possess the newest data is equal to 1, said processor module inhibits the copy back of the newest data into said distributed main storage.

34. An apparatus according to claim 33, wherein said plurality of cache units have unique ID numbers and said write privilege is moved in accordance with a predetermined order on the basis of the ID number of the cache unit which replaced said newest data.

35. An apparatus according to claim 33, wherein a memory management unit to manage said distributed main storage has a write privilege indicating that the newest data exists in said cache unit and the data in the distributed main storage is in a dirty state in which the data on the cache unit has a newest value and the data on the distributed main storage has an old value, and even if the write privilege is moved between said cache units the write privilege of said memory management unit is maintained as it is without moving the write privilege to another processor module.

36. An apparatus according to claim 28, wherein a bus connection unit of said plurality modules and a bus arbiter are connected via a second common bus, a bus command is transferred among said plurality of processor modules by a split type packet transfer, and said bus command has three fields such as a source field indicative of an access requesting source, first destination field indicative of a first access requesting destination, and second destination field indicative of a second access requesting destination.

37. An apparatus according to claim 36, wherein in the case wherein target data of a read request exists in the distributed main storage of a second processor module, a first processor module transmits a first bus command in which the first processor module is designated as said source field and said second processor module is designated as said first destination field,
in the case where newest data of a read request doesn't exist in the distributed main storage but exists in the cache unit in a third processor module, the second processor module which received said first bus command transmits a second bus command in which the second processor module is designated as said source field, and said third processor module having newest data is designated as the first destination field and the first processor module of said access requesting source is designated as a second destination field, and
said third processor module which received said second bus command transmits a reply command in which the third processor module is designated as said source field, and said second processor module of said distributed main storage is designated as the first destination field and the first processor module of said read request is designated as the second destination field and simultaneously responds with data to said first and second processor modules.

38. An apparatus according to claim 37, wherein when the second bus command is transmitted from said second processor module to the third processor module, said first processor module is activated by the transmission of said first bus command and changes a set time of a timer to monitor a bus time-out from a first time to a second time longer than said first time.

39. An apparatus according to claim 36, wherein each of said source field, said first destination field, and said second destination field, and said second destination field is expressed by two identifiers comprising a bus identifier indicative of said second common bus and a unit identifier indicative of a unit such as a processor module, and in the case where a plurality of said second common buses are mutually connected through an inter-bus connection unit, a unit in another second common bus can be designated.

40. An apparatus according to claim 36, wherein in the case where a plurality of subsystems in each of which said plurality of processor modules are connected by said second common bus are connected through an inter-subsystem connection unit, a subsystem extension identifier indicative of a transfer among said subsystems is provided for said bus command, and when said subsystem extension identifier is valid, each of said source field, said first destination field, and said second destination field is designated by a command field of each of said subsystems, thereby enabling the unit of the different subsystem to be designated.

41. An apparatus according to claim 36, wherein in the case where a subsystem having a heterosystem bus is connected through a heterobus connection unit to the second common bus to which said plurality of processor modules are connected, said bus command has a command for emulating the heterosystem bus in a part of the command field and can designate a unit on the heterosystem bus.

42. An apparatus according to claim 36, wherein in the case where an abnormality is detected in a second processor module during a transfer of the bus command from a first processor module to said second processor module, said second processor module transmits an error reply bus command and notifies said first processor module of an error.

43. An apparatus according to claim 36, wherein in the case where an abnormality is detected by said bus arbiter during a bus transfer of the bus command from a first processor module to a second processor module, said bus arbiter transmits an error reply bus command and notifies said first processor module of an error.

44. An apparatus according to claim 42, wherein said error reply bus command has a classification field indicative of a factor of the detected abnormality, a field indicative of an access route on which the abnormality occurred in the case where a plurality of access routes exist, and a field indicative of a kind of said detected abnormality.

45. An apparatus according to claim 36, wherein in said bus command, an access identifier field to store an operation identifier of a source unit is provided for each of said first and second destination fields, the bus command is modified by the operation identifier of said access identifier field, and an operating mode of said bus command is changed.

46. An apparatus according to claim 45, wherein
in the case where a first bus command is transmitted from a first processor module serving as an access requesting source to a second processor module having a distributed main storage of an access destination, a second bus command is transmitted from said second processor module to a third processor module in which newest data is possessed in the cache unit, and a reply bus command is finally transmitted from said third processor module,
said first processor module designates a operation identifier for the access identifier field of the first destination field in said second bus command, said second processor module designates the same operation identifier as that of said second bus command for each of the access identifier fields of said first and second destination fields in said second bus command, said third module designates the same operation identifier as that of said second bus command to each of the access identifier fields of said first and second destination fields in said reply bus command, and further, each of said first and second processor modules judges a coincidence between the operation identifier of a destination field of said reply bus command and the operation identifier stored and held upon transmission of the bus command, thereby deciding that the reply is for the bus command.

47. An apparatus according to claim 36, wherein said second common bus has a data bus line for transferring said data and a parity in parallel and a tag information line to specify an operation of a bus sequence independent of said data bus line and continues a plurality of bus cycles by a capture of the bus for one time by a designation of tag information by said tag information line.

48. An apparatus according to claim 47, wherein an invalidation of the bus sequence during the execution is transmitted at an arbitrary timing in said bus cycle by a designation of the retry by said tag information line.

49. An apparatus according to claim 47, wherein as for said bus connection unit and said bus arbiter of the plurality of processor modules mutually connected by a tag control line, in the case where any one of said bus connection unit of said plurality of processor modules doesn't start the bus cycle, a specific bus connection unit which simultaneously received a bus use permission signal which is individually output from said bus arbiter to each of said bus connection units and a bus use start instruction signal which is commonly output from said bus arbiter to all of the bus connection units starts the bus cycle, and in the case where the bus connection unit of said plurality of processor modules has already started the bus sequence, the bus connection unit which received said bus use permission signal detects an end signal of the bus cycle that is output from the other bus connection unit and starts the bus cycle.

50. An apparatus according to claim 49, wherein said bus arbiter reserves a subsequent bus use requesting process until all of the bus use requests from said bus connection units which were received at specific timings are processed.

51. An apparatus according to claim 49, wherein said tag information line has a first bus use request line which is used for an ordinary bus use request signal and a second bus use request line which is used for an emergency bus use request signal for transmitting an abnormality report, and said bus arbiter preferentially gives a bus use permission to the bus connection unit which output the emergency request signal among the bus use request signals received at a specific time.

52. An apparatus according to claim 51, wherein an ordinary bus use request, an emergency bus use request, an absence of a bus use request, and an inoperative state of the bus connection unit are transmitted by a combination of signals on said first bus use request line and said second bus use request line.

53. An apparatus according to claim 3, wherein a second directory memory is provided for said bus connection unit, a response waiting state by an access request for the other processor module is registered in said second directory memory on a cache line unit basis, and in the case where an access of the same cache line is recognized for an access from the other processor module by referring to said second directory memory, a busy signal is transmitted in response.

54. An apparatus according to claim 53, wherein in the case where a second processor module acting as a home processor module receives a write access from a first processor module acting as a remote processor module requesting an invalidation of the same cache line to a third processor module, a state is entered in which the completion of the invalidation request waits and said write access is registered into said second directory memory, and a busy signal is provided for an access request of the same cache line from another processor module.

55. An apparatus according to claim 54, wherein said busy response is transmitted to the cache unit in the processor module of a requesting source, thereby allowing a retry to be performed.

56. An apparatus according to claim 54, wherein in the case where said bus connection unit becomes buffer-full by the access request of the another processor module to said second processor module acting as a home processor module, a busy signal is transmitted to the bus connection unit of the processor module of the access request, thereby allowing a retry to be executed to said second common bus.

57. A cache coherence apparatus comprising:

a plurality of processor groups each consisting of a plurality of processors;

a main storage which is shared for said processor groups;

a cache unit, provided for every said plurality of processors, for performing an access of said main storage;

a directory memory for storing a registration state data of said main storage into said cache units on a cache line unit basis;

an internal common bus for connecting said main storage and said cache units;

an external common bus for connecting said plurality of processor groups; and a memory control module for controlling in the case where access data is not registered in any one of said plurality of cache units for access requests of said plurality of processors, said directory memory is accessed, and when the access data is not registered, said main storage is accessed and a response is issued, and when the access data has been registered, the cache unit of a registration destination is accessed and a response is issued, and after completion of the response of said access data, the registration state in said directory memory is updated.

58. An apparatus according to claim 57, wherein said cache unit divides said cache line into a plurality of sublines and manages said plurality of sublines, and a cache state is defined as a dirty state when data in said cache unit has a newest value and data in said main storage has an old value, said cache state is stored in said directory memory on said subline unit basis, and a said cache state is defined as a share state in which the data in said cache unit and the data in said main storage have a same value, and said cache state is stored in said directory memory on said cache line unit basis.

59. A cache coherence apparatus comprising:

an external common bus; and a plurality of processor groups coupled to said external common bus comprising:

an internal common bus, a plurality of processors coupled via said internal bus, a cache memory coupled to each of said plurality of processors and coupled to said internal common bus, a main storage memory; and a memory control module coupled to said main storage memory, said external common bus, and said internal common bus, and receiving a data read request from any one of said plurality of processors, and if said data is not contained in said processor group, transmitting an access command via said external common bus to another processor group which contains said data, a memory control module of said another processor group retrieving and transmitting said data to said memory control module which transmitting said access command over said external common bus; wherein said memory control module monitors said external common bus for said data, retrieves said data from said external common bus upon detection thereof and updates the cache memory of the requesting processor and the main storage memory in said data read request.

60. A computer apparatus comprising:

a plurality of processor modules interconnected by an external common bus, each processor module having a plurality of processors interconnected by an internal common bus, each processor having a cache and each processor module having a memory control module to control how read requests are handled by the processor module and to monitor traffic on the external bus relating to read requests;

a main storage distributed amongst the processor modules in respective distributed parts of main storage, wherein each of said plurality of processor modules has a directory memory for storing on a cache line basis a registration state for the corresponding data stored in the distributed part of main storage of the processor module concerned;

said memory control module identifying by reference to the directory memory of the processor module concerned whether the newest value of the requested data is stored in a cache of the processor module concerned and, if so, responding to such a read request by placing the newest value of that data on the external common bus for the requesting processor module; and said memory control module identifying whether data placed on the external common bus in response to a read request relates to an address in the distributed part of main storage in the processor module concerned and if said address relates to said distributed part of main storage retrieving said data from the external common bus and updating the data in the corresponding address in the distributed part of main storage, thereby maintaining cache coherence by performing copy-back as a result of read requests.

* * * * *